US012670751B2

(12) United States Patent
Badgery

(10) Patent No.: US 12,670,751 B2
(45) Date of Patent: Jun. 30, 2026

(54) SYSTEMS FOR IDENTIFYING VEHICLE IDLING

(71) Applicant: Geotab Inc., Oakville (CA)

(72) Inventor: Kip Arthur Millar Badgery, Calgary (CA)

(73) Assignee: Geotab Inc., Oakville (CA)

( * ) Notice: Subject to any disclaimer, the term of this patent is extended or adjusted under 35 U.S.C. 154(b) by 0 days.

(21) Appl. No.: 19/360,395

(22) Filed: Oct. 16, 2025

(65) Prior Publication Data

US 2026/0112214 A1 Apr. 23, 2026

Related U.S. Application Data

(60) Provisional application No. 63/862,896, filed on Aug. 13, 2025, provisional application No. 63/710,676, filed on Oct. 23, 2024.

(51) Int. Cl.
*G07C 5/04* (2006.01)
*G07C 5/00* (2006.01)

(52) U.S. Cl.
CPC ............... *G07C 5/04* (2013.01); *G07C 5/008* (2013.01)

(58) Field of Classification Search
CPC ................................. G07C 5/04; G07C 5/008
USPC ......................................................... 701/123
See application file for complete search history.

(56) References Cited

U.S. PATENT DOCUMENTS 5,619,412 A * 4/1997 Hapka .................... B60R 25/04 701/29.3
8,805,639 B1 * 8/2014 Musicant ................. G07C 5/08 702/141
10,861,255 B1 12/2020 Karp et al.
11,354,013 B1 * 6/2022 Nivon ................. G06F 3/04845
2003/0163249 A1 * 8/2003 Kapolka .................. G08G 1/20 340/988
2008/0295586 A1 * 12/2008 Fosseen ................. G07C 5/008 73/114.14
2010/0211260 A1 8/2010 De Sanctis
2010/0242906 A1 * 9/2010 Konezny ................ G07C 5/008 123/339.14

(Continued)

FOREIGN PATENT DOCUMENTS

DE 102014226452 A1 * 7/2015 .......... F02N 11/0814
EP 4163845 A1 4/2023

OTHER PUBLICATIONS

International Search Report and Written Opinion for International Application No. PCT/CA2025/051357, mailed Jan. 19, 2026, 12 pages.

(Continued)

*Primary Examiner* — Hunter B Lonsberry
*Assistant Examiner* — Helen Li
(74) *Attorney, Agent, or Firm* — Mark J. Pringle-Rigby

(57) ABSTRACT

Systems, methods, devices, and models for identifying preventable idling in vehicles are described. Preventable idling events are identified which are outside of acceptability criteria, such as idling duration. Preventable idling events can be associated with drivers and/or vehicles to provide avenues to curb preventable idling. Fuel consumption and/or carbon emissions for preventable idling events are identified to quantify efficacy of curbing preventable idling. Histograms and concentration maps are generated to identify high-concentration idling events, and take targeted action.

20 Claims, 19 Drawing Sheets

(56) References Cited

U.S. PATENT DOCUMENTS

| | | | | |
|---|---|---|---|---|
| 2013/0002456 | A1* | 1/2013 | Fuller | G01C 21/3632 340/990 |
| 2013/0261942 | A1 | 10/2013 | McQuade et al. | |
| 2014/0277839 | A1* | 9/2014 | Flick | F02N 11/0807 701/2 |
| 2015/0081162 | A1* | 3/2015 | Mitchell | G06Q 10/08 701/32.4 |
| 2015/0161827 | A1 | 6/2015 | Getchius | |
| 2015/0178661 | A1* | 6/2015 | Keaveny | G06Q 50/40 705/7.42 |
| 2015/0332409 | A1 | 11/2015 | Menon et al. | |
| 2016/0098869 | A1* | 4/2016 | Rood | G07C 5/0808 701/32.7 |
| 2016/0252381 | A1 | 9/2016 | Kwak et al. | |
| 2017/0103101 | A1* | 4/2017 | Mason | G06F 16/2365 |
| 2017/0151994 | A1* | 6/2017 | Braunberger | G02B 27/01 |
| 2019/0176847 | A1 | 6/2019 | Palmer et al. | |
| 2021/0142595 | A1 | 5/2021 | Siddique et al. | |
| 2023/0360450 | A1 | 11/2023 | Thomas | |
| 2025/0083684 | A1* | 3/2025 | De Felice | B60W 30/18054 |

OTHER PUBLICATIONS

Extended European Search Report for Application No. 25208901.6 dated Mar. 27, 2026.

Extended European Search Report for Application No. 25208903.2 dated Mar. 27, 2026.

* cited by examiner

900

| Tank Volume remaining (L) | Measured Fuel Level (%) | Calibration Factor L / % |
|---|---|---|
| 3.26 | 2.70% | 1.207407407 |
| 18.09 | 22.00% | 0.8222727273 |
| 32.91 | 39.40% | 0.8352791878 |
| 47.74 | 51.80% | 0.9216216216 |
| 62.56 | 71.80% | 0.8713091922 |
| 77.39 | 88.20% | 0.8774376417 |
| 88.81 | 100.00% | 0.8881 |
| 93 | 100.00% | |

Figure 9

1010 1020 1030 1040 1050

| Vehicle | Driver | Number of Excessive Idling Events | Preventable Fuel Consumption | Preventable Emissions ($CO_2$) |
|---|---|---|---|---|
| XXX-XXX | John Smith | 16 | 8 L | 18.4 kg |
| YYY-YYY | Jane Doe | 3 | 1.7 L | 3.91 kg |
| ZZZ-ZZZ | Gary Bear | 0 | 0 L | 0 kg |
| ... | ... | ... | ... | ... |

1060

Total Excessive Idling Events: 19

Total Preventable Fuel Consumption: 9.7 L

Total Preventable Emissions: 22.31 kg

1000

Figure 10

| Idling event Date/Time | Driver | Duration | Preventable Fuel Consumption | Preventable Emissions ($CO_2$) |
|---|---|---|---|---|
| Aug 21, 2024 9:55 AM | John Smith | 25 min | 0.8 L | 1.84 kg |
| Aug 19, 2024 9:30 AM | Jane Doe | 15 min | 0.5 L | 1.15 kg |
| Aug 18, 2024 4:30 PM | John Smith | 12 min | 0 L | 0 kg |
| ... | ... | ... | ... | ... |

1100

| Vehicle (3110) | Driver (3120) | Idling Exceptions (3130) | Preventable Fuel Consumption (3140) | Preventable Emissions ($CO_2$) (3150) | Score Modifier (Points) (3160) | Total Score (Points) (3170) |
|---|---|---|---|---|---|---|
| XXX-XXX | John Smith | 16 | 8 L | 18.4 kg | -11 | -35 |
| YYY-YYY | Jane Doe | 3 | 1.7 L | 3.91 kg | +2 | +14 |
| ZZZ-ZZZ | Gary Bear | 0 | 0 L | 0 kg | +5 | +45 |
| ... | ... | ... | ... | ... | | |

3100

Figure 31

| Vehicle (3210) | Driver (3220) | Idling Exceptions (3230) | Preventable Fuel Consumption (3240) | Preventable Emissions ($CO_2$) (3250) | Reward (Credits) (3260) |
|---|---|---|---|---|---|
| XXX-XXX | John Smith | 16 | 8 L | 18.4 kg | 0 |
| YYY-YYY | Jane Doe | 3 | 1.7 L | 3.91 kg | +5 |
| ZZZ-ZZZ | Gary Bear | 0 | 0 L | 0 kg | +10 |
| ... | ... | ... | ... | ... | |

3200

Figure 32

SYSTEMS FOR IDENTIFYING VEHICLE IDLING

PRIOR APPLICATION DATA

This application claims priority to U.S. Provisional Patent Application No. 63/710,676, titled "Systems and Methods for Identifying Vehicle Idling", filed on Oct. 23, 2024; and to U.S. Provisional Patent Application No. 63/862,896, titled "Systems and Methods for Identifying Vehicle Idling", filed on Aug. 13, 2025, the entirety of which are incorporated by reference herein.

TECHNICAL FIELD

The present disclosure generally relates to systems and methods for reducing fuel consumption in vehicles, and in particular relates to identifying excessive idling.

BACKGROUND

Many types of vehicles consume fuel in order to operate. Such fuels include fossil fuels and derivatives thereof (e.g. gasoline, diesel etc.), but can also include alternative fuels such as biodiesel, ethanol, etc. Such fuel is carried by a tank attached to or integrated with a vehicle, and is consumed as the vehicle is utilized. It is desirable to quantify fuel consumption, and to provide means for minimizing fuel consumption.

SUMMARY

According to a broad aspect, the present disclosure describes a method comprising: identifying a plurality of idling events for a plurality of vehicles, comprising: identifying each idling event of the plurality of idling events as a period of time where an engine of a respective vehicle of the plurality of vehicles is active and the respective vehicle is not in motion; identifying a subset of select idling events of the plurality of idling events comprising, for each idling event of the plurality of idling events: comparing data representing the idling event to acceptability criteria; and identifying the idling event as a select idling event if the data representing the idling event does not satisfy the acceptability criteria; determining a fuel consumption for the subset of select idling events; and output an indication based on the fuel consumption and the subset of select idling events.

Identifying a period of time where an engine of the vehicle is activated and the vehicle is not in motion may comprise: identifying the vehicle as activated when an ignition of the vehicle is on; and identifying the vehicle as not being in motion when operation data for the vehicle indicates a speed of the vehicle is less than a speed threshold. The operation data my comprise at least one of: location data captured by a location sensor at the vehicle, the location data indicative of a speed of the vehicle based on differences between successive points of the location data; and speed data collected via a communication port of the vehicle.

The method may further comprise, for each idling event of the plurality of idling events: determining a duration of the idling event as a difference between a timestamp indicating an end of the idling event and a timestamp indicating a start of the idling event. Comparing data representing the idling event to acceptability criteria may comprise: comparing the duration of the idling event to at least one temporal threshold. Identifying the event as a select idling event if the data representing the idling event does not satisfy the acceptability criteria may comprise identifying the event as a select idling event if the duration of the idling event is outside of the at least one temporal threshold. The method may further comprise identifying the at least one temporal threshold based on a location classification for a zone where the respective vehicle is located during the idling event. The method may further comprise identifying the at least one temporal threshold based on idling data for other vehicles in a region where the respective vehicle is located during the idling event. The method may further comprise identifying the at least one temporal threshold based on a temperature for a location of the respective vehicle for the idling event. The method may further comprise determining the at least one temporal threshold based on a time when the idling event occurs. The method may further comprise receiving an operator input which defines the at least one temporal threshold.

Identifying a plurality of idling events by a plurality of vehicles may comprise identifying, by at least one respective processor at each vehicle of the plurality of vehicles, at least one idling event for each vehicle. The method may further comprise: transmitting, by a respective communication interface at each vehicle of the plurality of vehicles, a respective indication of the at least one idling event at each vehicle; and receiving, by a server communication interface at a server separate from each vehicle of the plurality of vehicles, each respective indication of the at least one idling event at each vehicle.

Identifying a plurality of idling events by a plurality of vehicles may comprise: identifying, by at least one processor at a server separate from each vehicle of the plurality of vehicles, each idling event of the plurality of idling events.

The method may further comprise, for each select idling event of the subset of select idling events: accessing an idle fuel consumption rate corresponding to the vehicle where the select idling event occurs, and determining a fuel consumption for the subset of select idling events may comprise determining the fuel consumption for each select idling event as a product of the duration of each respective select idling event and the idle fuel consumption rate.

The method may further comprise, for each select idling event of the subset of select idling events: accessing fuel data corresponding to the vehicle where the select idling event occurs, and determining a fuel consumption for the subset of select idling events may comprise determining a respective fuel consumption for each select idling event based on the fuel data. For each select idling event of the subset of select idling events: the fuel data may comprise fuel level data which indicates a fuel level of the vehicle where the select idling event occurs; and determining a fuel consumption for the select idling event based on the fuel data may comprise determining the fuel consumption for the select idling event as a difference between an end fuel level for the vehicle at an end of the select idling event and a starting fuel level for the vehicle at the start of the select idling event. For each select idling event of the subset of select idling events: the fuel data may comprise fuel consumption data which indicates a measured fuel consumption rate of the vehicle where the select idling event occurs; and determining a fuel consumption for the select idling event based on the fuel level data may comprise determining the fuel consumption for the select idling event as an accumulation of the measured fuel consumption rate over the select idling event.

Determining a fuel consumption over the subset of select idling events may comprise: determining the fuel consumption of each select idling event; and determining an accumulation of the determined fuel consumption for each select idling event in the subset of select idling events.

The method may further comprise determining a product of a carbon emissions factor and the fuel consumption for the subset of select idling events to determine carbon emissions over the subset of select idling events.

The method may further comprise, for each select idling event of the subset of select idling events: determining a difference between the data representing the idling event and the acceptability criteria; and determining a preventable fuel consumption for the select idling event based on the difference between the data representing the select idling event and the acceptability criteria.

The method may further comprise for each select idling event of the subset of select idling events: determining a driver associated with the vehicle where select idling event occurs; and outputting an indication of the select idling event to the driver associated with the vehicle.

The method may further comprise: determining a respective driver associated with each select idling event of the subset of select idling events; and determining an accumulation of select idling events for each respective driver; and outputting, a respective indication of select idling events associated with each driver to the respective driver.

The method may further comprise: determining a respective driver associated with each select idling event of the subset of select idling events; and determining a respective accumulation of select idling events for each respective driver; comparing the respective accumulation of select idling events for each respective driver to an idling threshold; and outputting, a respective indication of drivers for which the respective accumulation of select idling events exceeds the idling threshold.

The method may further comprise: determining a respective accumulation of select idling events for each respective vehicle; comparing the respective accumulation of select idling events for each respective vehicle to an idling threshold; and outputting, a respective indication of vehicles for which the respective accumulation of select idling events exceeds the idling threshold.

According to another broad aspect, the present disclosure describes a system comprising: at least one processor; at least one output device; and at least one non-transitory processor-readable storage medium communicatively coupled to the at least one processor, the at least one non-transitory processor-readable storage medium storing processor-executable instructions which, when executed by the at least one processor, cause the system to: identify a plurality of idling events for a plurality of vehicles, comprising: identifying, by the at least one processor, each idling event of the plurality of idling events as a period of time where an engine of a respective vehicle of the plurality of vehicles is active and the respective vehicle is not in motion; identify a subset of select idling events of the plurality of idling events comprising, for each idling event of the plurality of idling events: comparing, by the at least one processor, data representing the idling event to acceptability criteria; and identifying, by the at least one processor, the idling event as a select idling event if the data representing the idling event does not satisfy the acceptability criteria; determine, by the at least one processor, a fuel consumption for the subset of select idling events; and output, by the output device, an indication based on the fuel consumption and the subset of select idling events.

The processor-executable instructions which cause the system to identify a period of time where an engine of the vehicle is activated and the vehicle is not in motion may cause the system to: identify the vehicle as activated when an ignition of the vehicle is on; and identify the vehicle as not being in motion when operation data for the vehicle indicates a speed of the vehicle is less than a speed threshold. The operation data may comprise at least one of: location data captured by a location sensor at the vehicle, the location data indicative of a speed of the vehicle based on differences between successive points of the location data; and speed data collected via a communication port of the vehicle.

The processor-executable instructions may further cause the system to, for each idling event of the plurality of idling events: determine a duration of the idling event as a difference between a timestamp indicating an end of the idling event and a timestamp indicating a start of the idling event; comparing data representing the idling event to acceptability criteria may comprise: comparing the duration of the idling event to at least one temporal threshold; and identifying the event as a select idling event if the data representing the idling event does not satisfy the acceptability criteria may comprise identifying the event as a select idling event if the duration of the idling event is outside of the at least one temporal threshold. The processor-executable instructions may further cause the at least one processor to identify the at least one temporal threshold based on a location classification for a zone where the respective vehicle is located during the idling event. The processor-executable instructions may further cause the at least one processor to identify the at least one temporal threshold based on idling data for other vehicles in a region where the respective vehicle is located during the idling event. 107. The processor-executable instructions may further cause the at least one processor to identify the at least one temporal threshold based on a temperature for a location of the respective vehicle for the idling event. The processor-executable instructions may further cause the system to determine the at least one temporal threshold based on a time when the idling event occurs. The system may further comprise an operator device; the processor-executable instructions may further cause the system to receive, via the operator device, an operator input which defines the at least one temporal threshold.

The processor-executable instructions which cause the system to identify a plurality of idling events by a plurality of vehicles may cause the system to identify, by at least one respective processor at each vehicle of the plurality of vehicles, at least one idling event for each vehicle; and the processor-executable instructions may further cause the system to: transmit, by a respective communication interface at each vehicle of the plurality of vehicles, a respective indication of the at least one idling event at each vehicle; and receive, by a server communication interface at a server separate from each vehicle of the plurality of vehicles, each respective indication of the at least one idling event at each vehicle.

The processor-executable instructions which cause the system to identify a plurality of idling events by a plurality of vehicles may cause the system to: identify, by at least one processor at a server separate from each vehicle of the plurality of vehicles, each idling event of the plurality of idling events.

The processor-executable instructions may further cause the system to, for each select idling event of the subset of select idling events, access an idle fuel consumption rate corresponding to the vehicle where the select idling event occurs; and the processor executable instructions which cause the system to determine a fuel consumption for the subset of select idling events may cause the at least one processor to determine the fuel consumption of each select idling event, comprising determining a product of a duration of each respective select idling event and the idle fuel consumption rate.

The processor-executable instructions may further cause the system to, for each select idling event of the subset of select idling events: access fuel data corresponding to the vehicle where the select idling event occurs; and the processor executable instructions which cause the system to determine a fuel consumption for the subset of select idling events may cause the at least one processor to determine a respective fuel consumption for each select idling event based on the fuel data. For each select idling event of the subset of select idling events: the fuel data may comprise fuel level data which indicates a fuel level of the vehicle where the select idling event occurs; and the processor-executable instructions which cause the at least one processor to determine a fuel consumption for the select idling event based on the fuel data may cause the at least one processor to determine the fuel consumption for the select idling event as a difference between an end fuel level for the vehicle at an end of the select idling event and a starting fuel level for the vehicle at the start of the select idling event. For each select idling event of the subset of select idling events: the fuel data may comprise fuel consumption data which indicates a measured fuel consumption rate of the vehicle where the select idling event occurs; and the processor executable instructions which cause the at least one processor to determine a fuel consumption for the select idling event based on the fuel data may cause the at least one processor to determine the fuel consumption for the select idling event as an accumulation of the measured fuel consumption rate over the select idling event.

The processor-executable instructions which cause the system to determine a fuel consumption over the subset of select idling events may cause the system to: determine the fuel consumption of each select idling event; and determine an accumulation of the determined fuel consumption over each select idling event in the subset of select idling events.

The processor-executable instructions may further cause the system to determine a product of a carbon emissions factor and the fuel consumption over the subset of select idling events to determine carbon emissions over the subset of select idling events.

The processor-executable instructions may further cause the system to, for each select idling event of the subset of select idling events: determine a difference between the data representing the idling event and the acceptability criteria; and determine a preventable fuel consumption for the select idling event based on the difference between the data representing the select idling event and the acceptability criteria.

The processor-executable instructions may further cause the system to, for each select idling event of the subset of select idling events: determine a driver associated with the vehicle where select idling event occurs; and output an indication of the select idling event to the driver associated with the vehicle.

The processor-executable instructions may further cause the system to: determine a respective driver associated with each select idling event of the subset of select idling events; and determine an accumulation of select idling events for each respective driver; and output, a respective indication of select idling events associated with each driver to the respective driver.

The processor-executable instructions may further cause the system to: determine a respective driver associated with each select idling event of the subset of select idling events; and determine a respective accumulation of select idling events for each respective driver; compare the respective accumulation of select idling events for each respective driver to an idling threshold; and output, a respective indication of drivers for which the respective accumulation of select idling events exceeds the idling threshold.

The processor executable instructions may further cause the system to determine a respective accumulation of select idling events for each respective vehicle; compare the respective accumulation of select idling events for each respective vehicle to an idling threshold; and output, a respective indication of vehicles for which the respective accumulation of select idling events exceeds the idling threshold.

According to another broad aspect, the present disclosure describes a method for identifying vehicle idling behaviors, the method comprising: accessing vehicle data for a plurality of vehicles; identifying, by at least one processor, idling events based on the vehicle data, wherein an idling event comprises a vehicle being active but not moving for an idling threshold; generating, by the at least one processor, a histogram of the identified idling events, wherein the histogram correlates at least idling duration and idling time of the idling events; generating, by the at least one processor, a concentration map based on the histogram of identified idling events, wherein the concentration map identifies concentrated idling scenarios within the fleet based on a number of detected idling events exceeding a concentration threshold; and outputting, by an output device, an indication based on the concentration map.

The idling threshold may comprise a duration between 3 to 120 minutes.

Generating the histogram may further comprise correlating geographical location of the idling events. Generating the histogram may further comprises binning the identified idling events within predefined time buckets. The predefined time buckets may be 15-minute buckets.

Generating the concentration map may comprise: identifying at least one group of idling events in the histogram of identified idling events; identifying edges of each group in the at least one group of idling events; and defining the concentration map as including at least one region, each region of the at least one region encompassing the edges of a respective group of the at least one group of idling events.

The method may further comprise receiving a user input via an input device to adjust the concentration threshold. Receiving the user input via the input device may comprise receiving the user input via a slider interface.

The method may further comprise: accessing land-use data from land database; and generating at least one histogram and at least one concentration map which correlate idling events with a respective type of land use.

The method may further comprise: accessing zone data representing a plurality of geographic zones; and generating at least one histogram and at least one concentration map which correlate idling events with a respective type of zone.

The method may further comprise: accessing vehicle type or vehicle vocation data; and generating at least one histogram and at least one concentration map which correlate idling events with a respective type of vehicle or vehicle vocation.

The method may further comprise accessing temperature data representing outside temperature at each vehicle of the plurality of vehicles, wherein the idling threshold is based on the temperature data. The temperature data may be captured by a respective temperature sensor at each vehicle of the plurality of vehicles, and the idling threshold may be determined on a per-vehicle basis based on the respective temperature data for each vehicle.

The method may further comprise: accessing temperature data representing outside temperature at each vehicle of the plurality of vehicles; and generating at least one histogram and at least one concentration map which correlate idling events with a respective temperature range in the temperature data.

The method may further comprise defining a trigger condition based on the concentration map. The method may further comprise receiving, by a user interface device, a user input to manually define the trigger condition based on the concentration map. The method may further comprise automatically defining the trigger condition based on the concentration map. The method may further comprise detecting an exception for a particular vehicle when operation of the particular vehicle meets the trigger condition. The method may further comprising transmitting, by a communication interface, a notification to a driver of the particular vehicle in response to the detected exception. The method may further comprise inputting driver performance of detected exceptions into a driver analysis, coaching, or incentive module. The method may further comprise: allocating a score for each driver, where score is increased in absence of detected exceptions, score is decreased in presence of detected exceptions, or score is increased based on a reduction in detected exceptions over time; and allocating a reward to at least one driver based on the score for the at least one driver. The method may further comprise transmitting a turn-off instruction to an idling vehicle of the plurality of vehicles to automatically turn the idling vehicle off when operation meets criteria defined by the trigger condition.

The accessed vehicle data may include at least one of location data, speed data, acceleration data, engine activation data, or ignition data. Identifying idling events based on the vehicle data may comprise: identifying each idling event as an event where the engine activation data or ignition data is indicative of a vehicle being active, and the location data, speed data, or acceleration data is indicative of the vehicle being stationary, for the idling threshold.

Accessing the vehicle data may comprise capturing the vehicle data by at least one respective sensor at each vehicle of the plurality of vehicles.

According to yet another broad aspect, the present disclosure describes a system comprising: at least one processor; an output device; and at least one non-transitory processor-readable storage medium communicatively coupled to the at least one processor, the at least one non-transitory processor-readable storage medium storing processor-executable instructions which when executed by the at least one processor cause the system to: access vehicle data for a plurality of vehicles; identify, by the at least one processor, idling events based on the vehicle data, wherein an idling event comprises a vehicle being active but not moving for an idling threshold; generate, by the at least one processor, a histogram of the identified idling events, wherein the histogram correlates at least idling duration and idling time of the idling events; generate, by the at least one processor, a concentration map based on the histogram of identified idling events, wherein the concentration map identifies concentrated idling scenarios within the fleet based on a number of detected idling events exceeding a concentration threshold; and output, by the output device, an indication based on the concentration map.

The idling threshold may comprise a duration between 3 to 120 minutes.

The processor-executable instructions which cause the system to generate the histogram may further cause the system to correlate geographical location of the idling events.

The processor-executable instructions which cause the system to generate the histogram may further cause the system to bin the identified idling events within predefined time buckets. The predefined time buckets may be 15-minute buckets.

The processor-executable instructions which cause the system to generate the concentration map may further cause the system to: identify at least one group of idling events in the histogram of identified idling events; identify edges of each group in the at least one group of idling events; and define the concentration map as including at least one region, each region of the at least one region encompassing the edges of a respective group of the at least one group of idling events.

The system may further comprise an input device to receive a user input to adjust the concentration threshold. The input device may presents a slider interface for receiving the user input.

The processor-executable instructions may further cause the system to: access land-use data from a land database; and generate at least one histogram and at least one concentration map which correlate idling events with a respective type of land use.

The processor-executable instructions may further cause the system to: access zone data representing a plurality of geographic zones; and generate at least one histogram and at least one concentration map which correlate idling events with a respective type of zone.

The processor-executable instructions may further cause the system to: access vehicle type or vehicle vocation data; and generate at least one histogram and at least one concentration map which correlate idling events with a respective type of vehicle or vehicle vocation.

The processor-executable instructions may further cause the system to access temperature data representing outside temperature at each vehicle of the plurality of vehicles, wherein the idling threshold is based on the temperature data. The system may further comprise a plurality of temperature sensors at the plurality of vehicles, each temperature sensor to capture temperature data for a respective vehicle, and the idling threshold may be determined on a per-vehicle basis based on the temperature data for the respective vehicle.

The processor-executable instructions may further cause the system to: access temperature data representing outside temperature at each vehicle of the plurality of vehicles; and generate at least one histogram and at least one concentration map which correlate idling events with a respective temperature range in the temperature data. The processor-executable instructions may further cause the system to define a trigger condition based on the concentration map. The system may further comprise a user interface device to receive a user input to manually define the trigger condition based on the concentration map. The processor-executable instructions may further cause the system to automatically define the trigger condition based on the concentration map. The processor-executable instructions may further cause the system to detect an exception for a particular vehicle when operation of the particular vehicle meets the trigger condition. The system may further comprise a communication interface, wherein the processor-executable instructions further cause the system to transmit, by the communication interface, a notification to a driver of the particular vehicle in response to the detected exception. The processor-executable instructions may further cause the system to input driver performance of detected exceptions into a driver analysis, coaching, or incentive module. The processor-executable instructions may further cause the system to: allocate a score for each driver, where score is increased in absence of detected exceptions, score is decreased in presence of detected exceptions, or score is increased based on a reduction in detected exceptions over time; and allocate a reward to at least one driver based on the score for the at least one driver. The processor-executable instructions may further cause the system to transmit a turn-off instruction to an idling vehicle of the plurality of vehicles to automatically turn the idling vehicle off when operation meets criteria defined by the trigger condition.

The accessed vehicle data may include at least one of location data, speed data, acceleration data, engine activation data, or ignition data. The processor-executable instructions which cause the system to identify idling events based on the vehicle data may further cause the system to: identify each idling event as an event where the engine activation data or ignition data is indicative of a vehicle being active, and the location data, speed data, or acceleration data is indicative of the vehicle being stationary, for the idling threshold.

The system may further comprise at least one respective sensor at each vehicle of the plurality of vehicles to capture the vehicle data.

BRIEF DESCRIPTION OF THE DRAWINGS

Exemplary non-limiting embodiments are described with reference to the accompanying drawings in which:

FIG. 9 is a table showing calibration factors for measured fuel level of a vehicle.

FIGS. 10, 11, and 12 illustrate exemplary user interfaces for presenting fuel level information, in accordance with at least three illustrated implementations.

FIG. 31 illustrates an exemplary driver analysis table.

FIG. 32 illustrates an exemplary driver analysis and rewards table.

DETAILED DESCRIPTION

The present disclosure details systems and methods for identifying idling of vehicles, and in particular preventable idling and associated fuel consumption. The primary functionality of a vehicle engine is generally to cause motion of the vehicle; when a vehicle engine is active but is not causing motion of the vehicle, this is considered as "idling". Idling of a vehicle engine consumes fuel and creates carbon emissions, and thus it is generally desirable to reduce idling as much as possible. Throughout this disclosure, reference to "preventable idling" refers to non-essential or non-productive idling, whereby a vehicle engine is active (and consuming fuel), but useful vehicle functionality is not being achieved. In addition to imparting motion to the vehicle, there are other legitimate cases where a vehicle engine is active, and thus there are legitimate cases where idling is useful or productive. For example, a vehicle can be idled to generate heat to "warm-up" the engine or vehicle cabin prior to driving, which improves operation of the vehicle and comfort of the driver. Similarly, a vehicle engine can be idled to enable a cabin climate control system of the vehicle (whether by cooling or warming), to improve driver comfort (such as when a driver is resting in a sleeper unit of the vehicle). As another example, a vehicle engine can be idled to enable other auxiliary systems associated with a vehicle. It is desirable to identify select idling events which are not directed to productive or legitimate uses, to curb or reduce these "preventable idling events", reduce fuel consumption, and reduce carbon emissions.

Figure 1:
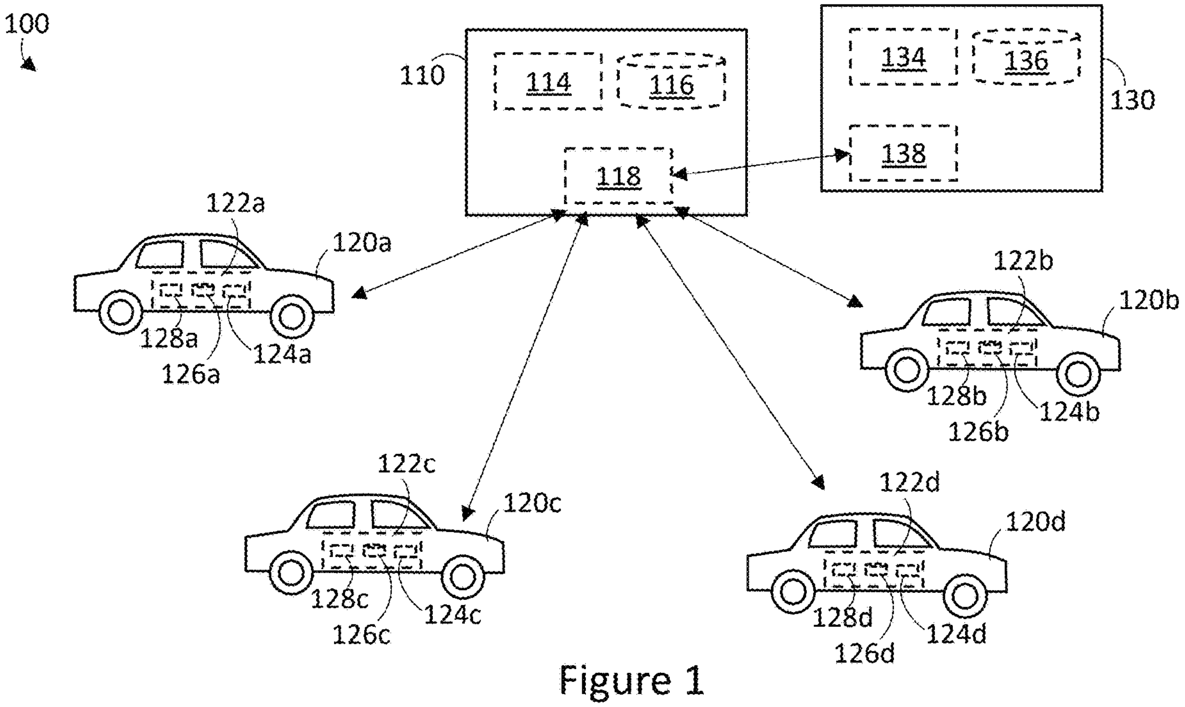
FIG. 1 is a schematic view of a system for managing data for a plurality of vehicles.

FIG. 1 is a schematic view of a system 100 for managing data for a plurality of vehicles. FIG. 1 shows a management device 110, which includes at least one processor 114, at least one non-transitory processor-readable storage medium 116, and a communication interface 118. Although illustrated as one device, management device 110 can include a plurality of devices, a plurality of processors 114, a plurality of non-transitory processor-readable storage mediums 116, and/or a plurality of communication interfaces 118. Further, such a plurality of management devices can be in close proximity (e.g. in a central server location), or can be distributed across different locations (e.g. as remote devices). Communication interface 118 can be a wired or wireless interface, through which management device 110 communicates with other devices, such as a plurality of vehicles, vehicle devices, or user devices.

In the illustrated example, management device 110 is shown as communicating with vehicle devices in four vehicles 120*a*, 120*b*, 120*c*, and 120*d* (collectively referred to as vehicles 120). However, management device 110 could communicate with vehicle devices in any appropriate number of vehicles, such as one vehicle, dozens of vehicles, hundreds of vehicles, thousands of vehicles, or even more vehicles. In some exemplary implementations, management device 110 is a telematics server, which collects and stores telematics data for a fleet of vehicles. In other exemplary implementations, management device 110 is a location-specific device, which manages vehicles for a particular location (or vehicles for a plurality of locations). In any of these examples, management device 110 can be used to monitor fuel level and/or fuel consumption for vehicles.

Vehicle 120*a* includes at least one processor 124*a*, at least one non-transitory processor-readable storage medium 126*a*, and a communication interface 128*a*. Together, the at least one processor 124*a*, the at least one non-transitory processor-readable storage medium 126*a*, and the communication interface 128*a* can be referred to as "vehicle device" 122*a*.

Vehicle 120*b* includes at least one processor 124*b*, at least one non-transitory processor-readable storage medium 126*b*, and a communication interface 128*b*. Together, the at least one processor 124*b*, the at least one non-transitory processor-readable storage medium 126*b*, and the communication interface 128*b* can be referred to as "vehicle device" 122*b*.

Vehicle 120*c* includes at least one processor 124*c*, at least one non-transitory processor-readable storage medium 126*c*, and a communication interface 128*c*. Together, the at least one processor 124*c*, the at least one non-transitory processor-readable storage medium 126*c*, and the communication interface 128*c* can be referred to as "vehicle device" 122*c*.

Vehicle 120*d* includes at least one processor 124*d*, at least one non-transitory processor-readable storage medium 126*d*, and a communication interface 128*d*. Together, the at least one processor 124*d*, the at least one non-transitory processor-readable storage medium 126*d*, and the communication interface 128*d* can be referred to as "vehicle device" 122*d*.

Collectively, vehicle 120*a*, vehicle 120*b*, vehicle 120*c*, and vehicle 120*d* can be referred to as "vehicles 120". Collectively, the at least one processor 124*a*, the at least one processor 124*b*, the at least one processor 124*c*, and the at least one processor 124*d* can be referred to as "processors 124". Collectively, the at least one non-transitory processor-readable storage medium 126*a*, the at least one non-transitory processor-readable storage medium 126*b*, the at least one non-transitory processor-readable storage medium 126*c*, and the at least one non-transitory processor-readable storage medium 126*d* can be referred to as "non-transitory processor-readable storage mediums 126". Collectively, communication interface 128*a*, communication interface 128*b*, communication interface 128*c*, and communication interface 128*d* can be referred to as "communication interfaces 128". Collectively, vehicle device 122*a*, vehicle device 122*b*, vehicle device 122*c*, and vehicle device 122*d* can be referred to as "vehicle devices 122".

Any of the communication interfaces 128 can be a wired interface or a wireless interface, or a vehicle device can include both a wired communication interface and a wireless communication interface.

Each of vehicle devices 122 can be a monolithically packaged device (i.e. a device contained in a single housing) which is installed in a respective vehicle. For example, any of vehicle devices 122 could be a telematics device, which plugs into the respective vehicle (e.g. at the OBDII port). Such telematics devices can gather vehicle information from the vehicle, from sensors built into the telematics device itself, and communicate said information to management devices such as management device 110. An exemplary telematics device is discussed later with reference to FIG. 2. In some implementations, each vehicle device 122 can instead refer to the collection of components installed in a vehicle (i.e. they do not have to be packaged in a single housing). As an example, a vehicle manufacturer could install processing, storage, and communication equipment in vehicles for the purpose of collecting, processing, and transmitting data. Further, components of any of the vehicle devices 122 can be multi-purpose components which serve other functions within the vehicle.

Management device 110 can communicate with vehicle devices 122 over a communication network, which may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. The communication network may operate according to one or more communication protocols, such as, General Packet Radio Service (GPRS), Universal Mobile Telecommunications Service (UMTS), GSM, Enhanced Data Rates for GSM Evolution (EDGE), LTE, CDMA, LPWAN, Wi-Fi™, Bluetooth®, Ethernet, HTTP/S, TCP, and CoAP/DTLS, or other suitable protocol. The communication network may take other forms as well.

FIG. 1 also shows an optional device 130, which includes at least one processor 134, at least one non-transitory processor-readable storage medium 136, and a communication interface 138. Although illustrated as one device, device 130 can include a plurality of devices, a plurality of processors 134, a plurality of non-transitory processor-readable storage mediums 136, and/or a plurality of communication interfaces 138. Further, such a plurality of devices can be in close proximity (e.g. in a central server location), or can be distributed across different locations (e.g. as remote devices). Communication interface 138 can be a wired or wireless interface, through which device 130 communicates with other devices.

In the illustrated example, device 130 communicates with management device 110 via communication interfaces 118 and 138. Such communication can be direct or indirect (e.g. over the internet or any other network). Device 130 can perform processing and provide data to management device 110, which management device 110 in turn uses to manage at least one fleet or group of vehicles (e.g. vehicles 120). As an example, management device 110 may be owned by one entity, which manages a fleet of vehicles. Device 130 may belong to another entity, which provides services to many fleets of vehicles. As a result, device 130 may have access to more vehicle data (i.e. data from a larger quantity of vehicles) compared to management device 110. In an exemplary use case, device 130 may generate metrics, models, or profiles for at least one plurality of vehicles, based on a large amount of vehicle data available to device 130. In this exemplary use case, device 130 communicates such metrics, models, or profiles to management device 110, which management device 110 then uses to perform analysis, assessment, or prediction for similar vehicles in a fleet managed by management device 110 (e.g. vehicles 120). In this way, management device 110 can assess models for vehicles based on a large amount of statistical data that management device 110 itself does not have access to. As another example, management device 110 may be a management device for a specific location (e.g. vehicle lot, warehouse, or hub), such that management device 110 manages vehicles which operate out of said location. In such an example, device 130 may be a fleet management device, which manages vehicles in a fleet across multiple locations (e.g. all locations, or a subset of locations).

Figure 2:
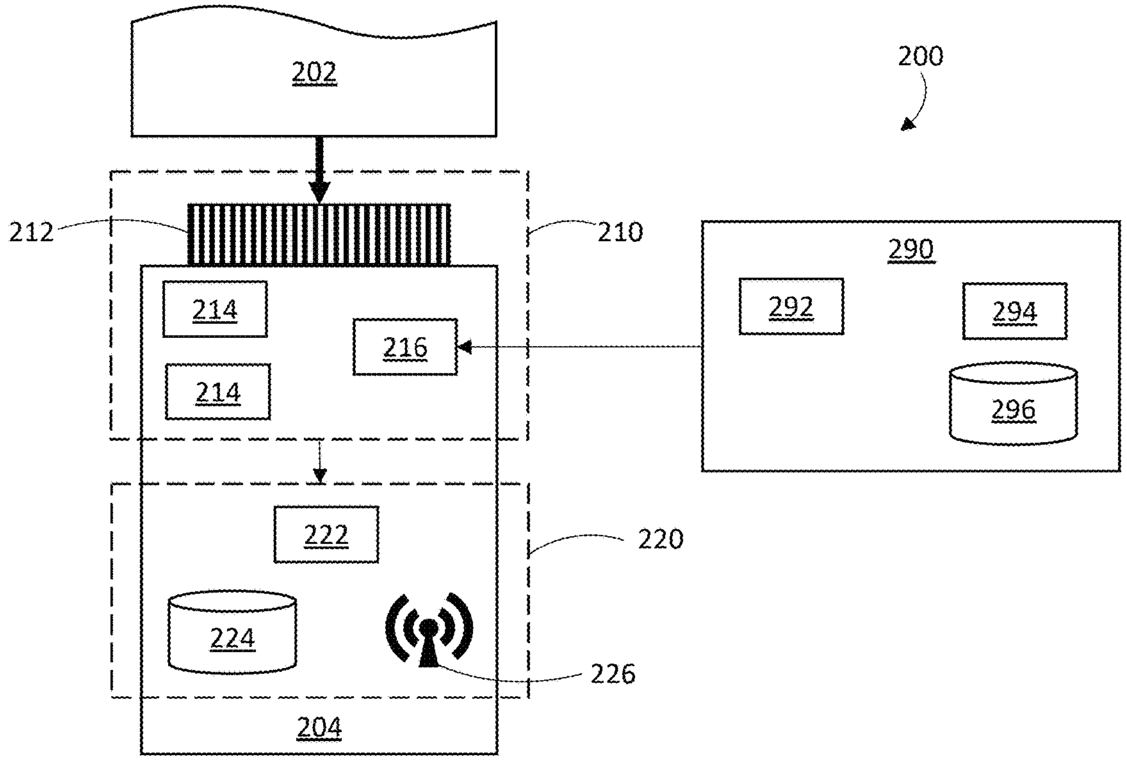
FIG. 2 is a schematic diagram of a system including a vehicle device, in accordance with at least one illustrated implementation.

FIG. 2 is a schematic diagram of a system 200, including a telematic device 204 which communicatively couples to a vehicle by a port 202 of the vehicle. Telematic device 204 is one exemplary implementation of a vehicle device, such as vehicle devices 122 discussed earlier with reference to FIG. 1. Telematic device 204 includes components which are, in the illustration of FIG. 2, grouped logically into sensor interface components 210 and control components 220. No physical or spatial grouping of these components is necessary, but rather the grouping discussed herein is a logical delineation for ease of discussion.

Control components 220 include at least one processor 222, at least one non-transitory processor readable storage medium 224, and at least one communication interface 226. The at least one non-transitory processor-readable storage medium 224 can store processor-executable instructions which when executed by the at least one processor 220 control operation of telematics device 204. The at least one communication interface can include a short or long-range communication hardware, which enable telematics device to transmit telematics data (e.g. over a cellular network).

Sensor interface 210 is shown as including a communication interface 212 configured to interface with matching port 202 in a vehicle (such as any of vehicles 120 in FIG. 1). In an exemplary implementation, port 202 is a diagnostic port (such as an OBDII port) of the vehicle, and communication interface 212 is a matching diagnostic port plug (such as a plug which fits in an OBDII port). Other forms and standards of ports and communication interfaces are possible, as appropriate for a given application. Data from the vehicle (such as sensor data from one or more sensors of the vehicle) is provided to sensor interface 210 of telematic device 204 via port 202 and communication interface 212. Vehicle sensors can include, as non-limiting examples, a speed sensor, an inertial sensor, an RPM sensor, a fuel level sensor, a fuel consumption sensor, a battery temperature sensor, an ambient temperature sensor, a battery voltage sensor, a battery charge sensor, a location sensor, and any other appropriate sensors which collect vehicle-related data.

Sensor interface 210 is also shown as including at least one sensor 214. In the illustrated example, two sensors 214 are illustrated, but any appropriate number of sensors could be included as appropriate for a given application. Data pertinent to the vehicle can be collected by sensors such as sensor 214. In this way, data can be collected which is not collected by sensors in the vehicle, or is not reported over an accessible port such as port 202. Sensors 214 could include, as non-limiting examples, a speed sensor, an inertial sensor, an ambient temperature sensor, a location sensor, an image sensor (e.g. camera), and any other appropriate sensors which collect vehicle-related data.

Sensor interface 210 is also shown as including a communication interface 216, which communicates with an optional peripheral device 290. Peripheral device 290 includes at least one sensor 292, and can provide data collected by the at least one sensor 292 to telematics device 204 via communication interface 216. In this way, data can be collected which is not collected by sensors in the vehicle, is not reported over an accessible port such as port 202, or is not collected by sensors in telematic device 204. The at least one sensor 292 could include, as non-limiting examples, a speed sensor, an inertial sensor, an ambient temperature sensor, a location sensor, an image sensor (e.g. camera), a fuel level sensor, and any other appropriate sensors which collect vehicle-related data.

Optionally, peripheral device 290 can also include at least one processor 294 and at least one non-transitory processor-readable storage medium 296. Peripheral device 290 can thus be used to perform acts of the methods discussed herein (by the at least one processor 294 executing processor-executable instructions stored at the at least one non-transitory processor-readable storage medium 296).

Communication interface 212 (and port 202), sensors 214, and communication interface 216 (and sensor 292) show multiple means by which telematics device 204 can collect sensor data. However, each of these components is not necessarily required. For example, any of communication interface 212, sensors 214, or communication interface 216 can be omitted, as long as one means of collecting sensor data remains.

Telematic device 204 (optionally in combination with peripheral device 290) can be implemented, for example, as any of vehicle devices 122 in FIG. 1. Telematic device 204 (optionally in combination with peripheral device 290) can also be used in the context of any of the methods discussed herein (in particular, method 300 in FIG. 3).

As mentioned earlier, telematics device 204, in the form illustrated in FIG. 2, is not strictly required to implement the systems, methods, devices, and models discussed herein. In alternative implementations, the components of telematic device 204 can be integrated within a vehicle (namely, any appropriate sensors, processors, non-transitory processor-readable storage mediums, communication interfaces, etc. can be components integrated in a vehicle, which serve similar functionality to telematic device 204.

As it regards particular sensor types and sensor data, several exemplary sensor types are of particular interest in this disclosure, and are discussed in detail below. The present disclosure is not limited to using data from these particular sensors (and several other sensor types are discussed above), nor is each of the particular sensors required in every implementation, but these particular sensors are called out as being especially valuable for the purposes discussed herein.

Any of the above discussed sensors or sensing modules (whether integrated in a vehicle or as part of a vehicle device or telematic device) can include a sensing module for determining vehicle location (also referred to as a location sensor). For instance, the sensing module may utilize Global Positioning System (GPS) technology (e.g., GPS receiver) for determining the geographic location (Lat/Long coordinates) of a vehicle. Alternatively, the sensing module utilizes another a global navigation satellite system (GNSS) technology, such as, GLONASS or BeiDou. Alternatively, the sensing module may further utilize another kind of technology for determining geographic location.

Alternatively, vehicle position information may be provided according to another geographic coordinate system, such as, Universal Transverse Mercator, Military Grid Reference System, or United States National Grid.

Any of the above discussed sensors or sensing modules can include a sensing module for determining an engine rotation speed for a vehicle (e.g. a tachometer). Engine rotation speed is typically expressed in revolutions per minute (RPM).

Any of the above discussed sensors or sensing modules can include a sensing module for determining movement speed for a vehicle. Vehicle movement speed can be expressed in any appropriate units, but is commonly expressed in miles per hour (mph), kilometers per hour (km/h), or meters per second (m/s). The speed sensor may be a sensor which measures data which is not directly movement speed of the vehicle, but is data from which movement speed of the vehicle can be derived. In some implementations, movement speed can be derived from location data measured by a location sensor (by determining change in location over time). In some implementations, movement speed can be derived from engine rotation speed data (based on a correlation in engine rotation speed and corresponding movement speed of the vehicle), or can be derived based on wheel rotation speed of the vehicle (which can itself be based on engine or axle rotation speed, or measured by a specific wheel rotation speed sensor). For example, if wheels of a vehicle are of a known size, then distance travelled by the vehicle per wheel rotation (wheel circumference) is also known, such that a correlation can be established between time per wheel rotation and distance travelled per wheel rotation.

Any of the above discussed sensors or sensing modules can include a sensing module for determining acceleration of a vehicle, such as an accelerometer or IMU (inertial measurement unit).

Any of the above discussed sensors or sensing modules can include a fuel level sensor or plurality of fuel level sensors. Fuel level sensors can be implemented and integrated within a vehicle. As a specific example, a fuel level sensor can comprise a series of optical sensors positioned within a fuel tank of a vehicle. These optical sensors can detect the presence of fluid in front of the respective optical sensor. By positioning these optical sensors at specific heights in the fuel tank, fuel level can be measured by identifying which of the optical sensors have fluid in front, and which optical sensors do not. As another specific example, a float sensor could be integrated within a fuel tank of a vehicle. As yet another specific example, an ultrasonic fuel level sensor can be positioned within a fuel tank of a vehicle. Fuel level as measured by such sensors can be reported to a vehicle control unit, and is used to inform a position of a fuel level reading on a dashboard display of the vehicle. Further, such fuel level data can also be reported over a diagnostic or communication interface of the vehicle (such as an OBDII port). A vehicle device (such as any of vehicle devices 122 or telematic device 204) can receive the fuel level data over the communication interface of the vehicle.

In other implementations, a fuel level sensor could be implemented which is not integrated with the vehicle. For example, a fuel level sensor could be implemented which communicates wirelessly with a vehicle device (e.g. as a peripheral device which communicates with telematic device 204). Such a fuel level sensor could be an optical or float sensor which is inserted into a vehicle fuel tank, as examples.

In some implementations, a vehicle can collect or determine fuel consumption data, and output this fuel consumption data. Many modern vehicles generate and output a fuel consumption signal including fuel consumption data, and this fuel consumption signal can be collected by a telematics device (e.g. telematics device 204 in FIG. 2 can read the fuel consumption signal from the vehicle via communication interface 212).

In an example, the fuel consumption signal is provided as a measure of fuel consumed correlated with time, such as liters consumed per minute, or any other appropriate volume or time units. Further, a fuel consumption signal can be output regularly (e.g. every second, or any other appropriate interval). A plurality of instants of the fuel consumption signal can be collectively referred to as fuel consumption data, and fuel consumed between a first time and a second time (fuel consumed over a time period can be determined by at least one processor (e.g. any of processor 114, 124, 134, 222, or 294) accumulating the fuel consumption data between first time and the second time. In this example, accumulating the fuel consumption data between the first time and the second time can comprise integrating the fuel consumption data over the time span between the first time and the second time, which results in a total volume of fuel consumed between the first time and the second time.

In another example, the fuel consumption signal is provided as a measure of fuel consumed correlated with distance travelled, such as liters consumed per 100 km (L/100 km) or miles travelled per gallon (MPG). As in the above example, a fuel consumption signal can be output regularly (e.g. every second, or any other appropriate interval). A plurality of instants of the fuel consumption signal can be collectively referred to as fuel consumption data, and fuel consumed between a first time and a second time can be determined by any of the at least one processors accumulating the fuel consumption data between the first time and the second time. In this example, because fuel consumption is correlated to distance (as opposed to time), accumulating the fuel consumption data between the first time and the second time can comprise evaluating the fuel consumption data over distance travelled in the time span between the first time and the second time. In this regard, location data can be accessed for the time period between the first time and the second time. For example the location data can be collected by a location sensor at the vehicle or in telematics device 204, and transmitted to management server 110 via communication interfaces 128 and 118, or the location data could be accessed from storage at a non-transitory processor-readable storage medium such as medium 116. Any of the at least one processors can correlate data points of fuel consumption data with data points of the location data, to determine distance travelled corresponding to data points of fuel consumption data. The distance travelled and corresponding fuel consumption data can be evaluated to determine volume of fuel consumed (e.g. L/100 km values can be multiplied by km values travelled and divided by 100 to determine Liters consumed; miles travelled can be divided by MPG values to determine Gallons consumed). Alternatively, any of the at least one processors can determine total distance travelled in the time period between the first time and the second time, and can determine an average fuel consumption rate in the time period between the first time and the second time. The average fuel consumption rate can be weighted, to account for differing fuel consumption rates for different quantities of time between the first time and the second time. The total distance travelled can then be evaluated with the average fuel consumption rate to determine volume of fuel consumed (e.g. an average L/100 km value can be multiplied by total km travelled value and divided by 100 to determine Liters consumed; total miles travelled can be divided by average MPG value to determine Gallons consumed).

In some implementations, at least one processor at the vehicle determines the fuel consumption rate, for output as the fuel consumption signal, based on sensor data such as manifold pressure, mass airflow, fuel injection quantity, etc. for an engine of the vehicle. The at least one processor at the vehicle can derive fuel consumption rate or volume from any or all (or some combination) of these signals.

In other implementations, a fuel consumption rate signal is not output by the vehicle. In such a case, alternative signals may be output, such as intake manifold pressure, mass airflow, fuel injection quantity, etc., and collected by a device such as telematics device 204. A fuel consumption rate or volume can be derived from these signals (e.g. by at least one processor 222 of telematics device 204, or at least one processor 114 of management device 110).

In yet other implementations, a fuel consumption rate signal is not output by the vehicle. Instead, a nominal fuel consumption rate can be used where fuel consumption rate is desired. For example, vehicles can be distributed with or advertised with expected fuel consumption rates (which can be referred to as fuel efficiency values).

Figure 3:
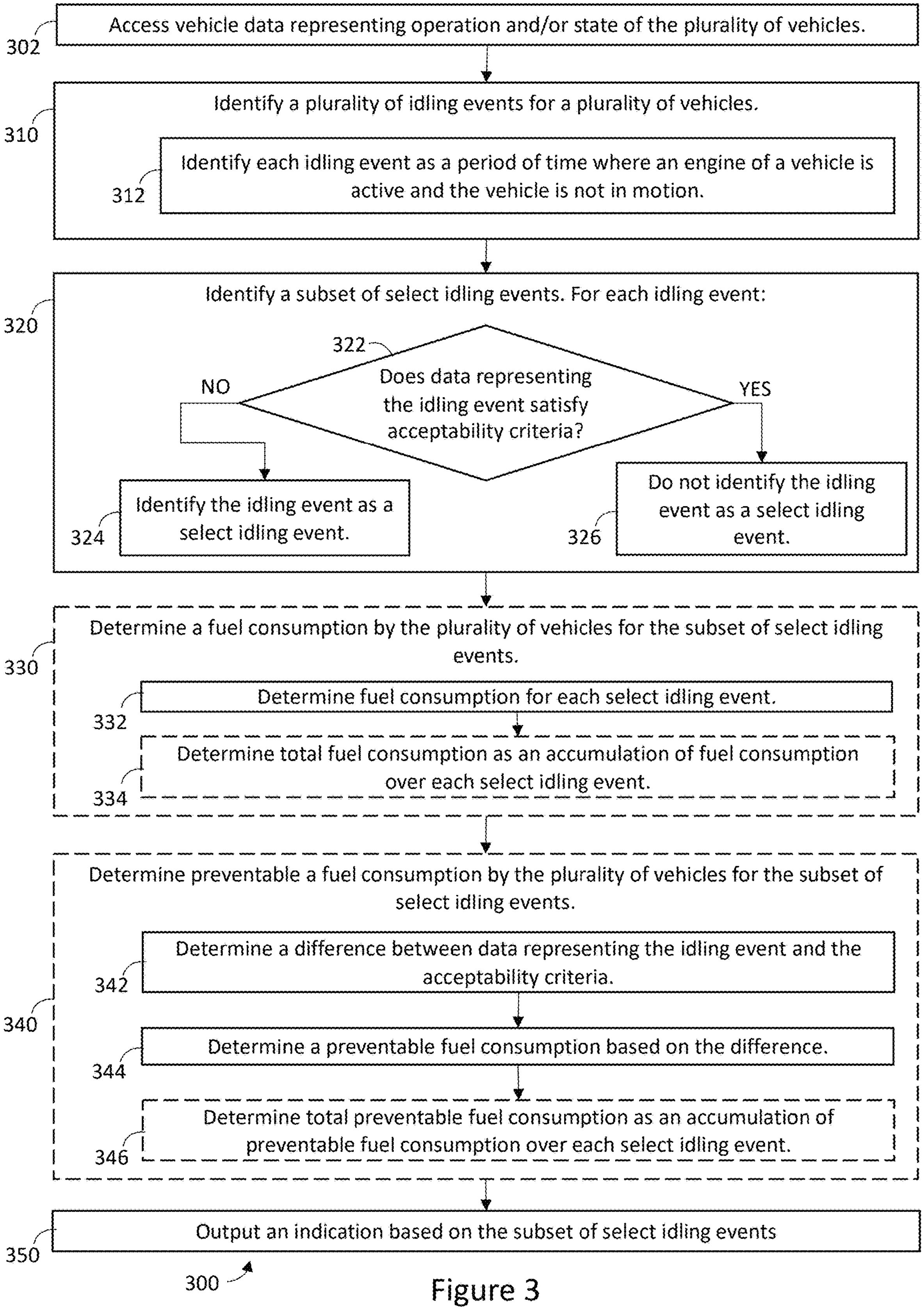
FIG. 3 is a flowchart diagram which illustrates an exemplary method for determining select idling events and fuel consumption.

FIG. 3 is a flowchart diagram which illustrates an exemplary method 300 for determining fuel level of a vehicle. Method 300 as illustrated includes acts 302, 310 (including act 312), 320 (including acts 322, 324, and 326), 330 (including acts 332 and 334), 340 (including acts 342, 344, and 346), and 350. One skilled in the art will appreciate that additional acts could be added, acts could be removed, or acts could be reordered as appropriate for a given application. For example, acts 330, 334, 340, and 346 are shown in dashed lines, to emphasize that these acts are optional. With reference to the example illustrated in FIG. 1, acts can be performed by appropriate components of management device 110, vehicle devices 122, or optional device 130. For example, acts of identification, determination, generation, or general data manipulation can be performed by at least one appropriate processor (e.g. processors 114, 124, 134, 222, or 294). Further, any of the at least one non-transitory processor-readable storage mediums 116, 126, or 136 could have instructions stored thereon, which when executed by a respective at least one processor (processors 114, 124, 134, 222, or 294) cause the respective management device 110, vehicle device 122, or optional device 130 to perform a given act of method 300. An act being performed by at least one processor 124 refers to the act being performed by any of processors 124*a*, 124*b*, 124*c*, or 124*d*. An act being performed by at least one non-transitory processor-readable storage medium 126 refers to the act being performed by any of non-transitory processor-readable storage mediums 126*a*, 126*b*, 126*c*, or 126*d*. An act being performed by communication interface 128 refers to the act being performed by any of communication interfaces 128*a*, 128*b*, 128*c*, or 128*d*. Typically, for a combination of acts performed by a combination of at least one processor, at least one non-transitory processor-readable storage medium, and a communication interface of a vehicle device, the combination of acts are performed by at least one processor, at least one non-transitory processor-readable storage medium, and a communication interface common to one of vehicle devices 122*a*, 122*b*, 122*c*, or 122*d* (or any other similar vehicle device). Generally speaking, in the context of method 300 acts of identification and determination are performed by at least one processor (e.g. any of processors 114, 124, 134, 222, or 294). Thus, reference to an act of identifying or determining being performed by a particular device generally refers to the act being performed by at least one processor of the device.

At 302, vehicle data is accessed. The vehicle data represents operation and/or state of the plurality of vehicles. For example, the vehicle data can include any data (such as telematics data) captured at the plurality of vehicles as discussed earlier with reference to FIGS. 1 and 2. As non-limiting examples, the vehicle data can include location data, speed data, acceleration data, engine data, ignition data, fuel consumption data, and/or fuel level data for each vehicle of the plurality of vehicles.

In some implementations, accessing the vehicle data comprises capturing, by at least one sensor at each vehicle (e.g. movement speed sensor, location sensor, engine rotation speed sensor, accelerometer, IMU, or any other appropriate sensor), the vehicle data. That is, in some implementations the at least one sensor itself is included in the scope of method 300 (or the system which performs method 300). The at least one sensor can be integrated within a vehicle, or can be included in a vehicle device which couples to a vehicle (as discussed earlier with reference to vehicle devices 122 and telematic device 204). In other implementations, accessing the vehicle data comprises receiving the vehicle data as captured by at least one sensor (that is, the at least one sensor itself is outside of the scope of method 300, or the system which performs method 300). Such receiving of the vehicle data can occur for example over a communication interface between respective vehicles and vehicle devices (such as communication interface 212 in FIG. 2, which connects a vehicle port 202 to a telematic device 204), or over a communication interface between vehicles and a server (such as communication interfaces 118 and 128 in FIG. 1, which connects a management device 110 to vehicles 120). Generally throughout this disclosure, "receiving" of data can refer to any appropriate actions by which data is taken in and handled, such as routing, processing, decompressing, decrypting, decoding, formatting, or any other appropriate action.

At 310, at least one processor (e.g. the at least one processor 114 in management device 110 in FIG. 1) identifies a plurality of idling events for a plurality of vehicles. Act 310 includes act 312, where each idling event is identified as a period of time where an engine of a vehicle is active and the vehicle is not in motion. That is, in act 312, an idling event is identified as a period of time which exceeds an idling threshold, where the engine of the vehicle is active, and where the vehicle is not in motion.

Identifying whether the engine of the vehicle is active can be performed based on the vehicle data, and in particular operation data indicative of the engine status, or from which engine status can be determined. For example, some vehicles may output an ignition status signal, which can be received by a vehicle device (e.g. devices 122 in FIG. 1 or device 204 in FIG. 2) and transmitted to a management device or server (e.g. management device 110 in FIG. 1). When the ignition signal indicates the ignition of the vehicle being on (e.g. activation of ignition of the vehicle), the engine of the vehicle can be identified as being active. As another example, some vehicles may output at least one engine signal such as engine rotation speed (RPM), intake manifold pressure, or any other appropriate engine signal. When the engine signal indicates use of the engine (e.g. engine rotation speed is above zero, engine manifold pressure is elevated), the engine of the vehicle can be identified as being active. In some cases, an ignition signal or an engine signal may not be available, and the engine is assumed to be active when the vehicle is in motion (that is, in such examples the engine being active and the vehicle being in motion are effectively the same condition).

Identifying whether the vehicle is in motion can also be performed based on the vehicle data, and in particular operation data representing operation of the vehicle. For example, the vehicle can be determined as not being in motion if a speed of the vehicle is below a speed threshold. In some cases, the speed threshold can be 0 km/h (i.e. the vehicle is expressly not moving at all according to the speed data). However, operation data is not always completely accurate, and even a non-zero speed value can be reported for a vehicle which is not moving. To this end, in some cases the speed threshold can have a magnitude greater than 0 (e.g. 2 km/h, or any other appropriate value). In this way, the vehicle can still be determined as not being in motion even if the operation data indicates a non-zero speed.

In one example, the vehicle data/operation data includes speed data, such as data received by a vehicle device (e.g. devices 122 or 204 in FIGS. 1 and 2) from a vehicle (e.g. over port 202 in FIG. 2). Such speed data could be derived, for example from wheel or axle rotation data indicating a wheel or axle rotation frequency of the vehicle, accounting for vehicle wheel diameter/circumference (i.e. one complete axle rotation corresponds to distance travelled equal to a circumference of a vehicle wheel).

In another example, the operation data includes location data captured by a location sensor at the vehicle. For example, the vehicle could include a location sensor, and captured location data can be received by a vehicle device (e.g. devices 122 or 204 in FIGS. 1 and 2) from the vehicle (e.g. over port 202 in FIG. 2). As another example, the vehicle device can include a location sensor which captures the location data (e.g. sensor 214), or can be coupled to a peripheral device which includes the location sensor which captures the location data (e.g. sensor 292). Each point of location data can indicate a geographic location, and a timestamp indicating when the point of location data was captured. The location data can thus be indicative of vehicle speed (or vehicle speed can be derived from the location data), as a difference between geographic location indicated by successive data points, divided by the time difference between the timestamps between points. Alternatively, vehicle trajectory and speed over time can be modeled based on the location data (instead of determining speed per pair of points), to reduce discrepancies caused by location data error (e.g. inaccurate location indications, which is not uncommon).

At 312, each idling event can be identified where the engine of the vehicle is active and the vehicle is not in motion, for at least a threshold period of time. For example, an idling threshold can be set at 200 seconds (or any other appropriate amount of time), such that if the engine of the vehicle is active and the vehicle is not in motion for 200 seconds, an idling event is identified.

In some implementations, each idling event can be identified by at least one processor at a vehicle where the idling event occurs (e.g. processor 124, 222, or 294). That is, for each vehicle of the plurality of vehicles, a respective processor at the vehicle can identify at least one idling event for the respective vehicle. An indication of each idling event can then be transmitted (e.g. by communication interfaces 128 or 226), to be received at a management device separate from the vehicles (e.g. management device 110 by communication interface 118), for aggregated analysis of the plurality of idling events. In other implementations, each idling event can be identified at a server or management device (e.g. management device 110), based on vehicle data received from the plurality of vehicles. That is, act 310 (including act 312) can be performed based on vehicle data from each vehicle of the plurality of vehicles, by at least one processor of the management device (e.g. management device 110).

At 320, a subset of select idling events is identified by the at least one processor. Act 320 as illustrated comprises acts 322, 324, and 326 performed for each idling event of the plurality of idling events. At 322, data representing the idling event is compared to acceptability criteria. If the idling event satisfies the acceptability criteria, method 300 proceeds to act 326 where the idling event is NOT identified as a select idling event. If the idling event does not satisfy the acceptability criteria, method 300 proceeds to act 324 where the idling event is identified as a select idling event. In this way, act 320 entails identifying a subset of select idling events which are outside of acceptability criteria. Generally, a select idling event outside of acceptability criteria can be considered as "unacceptable" or "preventable", and thus represents an idling event where fuel is "wasted" and carbon emissions are generated needlessly.

Figure 4:
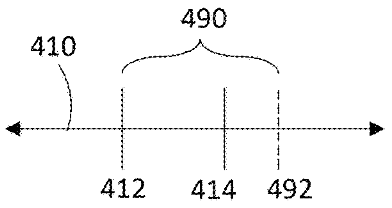
FIGS. 4, 5, and 6 illustrate exemplary temporal thresholds, in accordance with at least three illustrated implementations.
Figure 5:
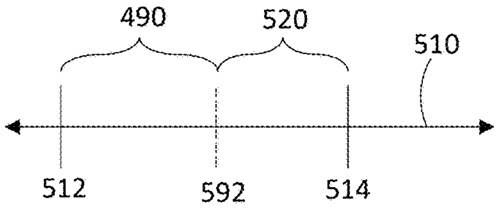

In some implementations, act 322 comprises comparing data representing the idling event to a temporal threshold. FIGS. 4 and 5 discussed below illustrate exemplary scenarios in such implementations.

FIG. 4 illustrates a timeline 410, and FIG. 5 illustrates a timeline 510. In these exemplary scenarios, method 300 can further comprise, for each idling event of the plurality of idling events, determining a duration of the idling event as a difference between a timestamp indicating an end of the idling event and a timestamp indicating a start of the idling event. The start and end of the idling event can be determined in several different ways, as appropriate for a given application. In a first case, the start and end of the idling event can be determined by extracting this information from the indication of each idling event. For example, where the indication of each idling event is transmitted to and received by a management device (e.g. after being identified by at least one processor at a vehicle or at another device), the indication of each idling event can include a respective start time and a respective end time of each idling event. In a second case, where method 300 includes identifying idling events from the vehicle data, the start of the idling event can be determined as the time at which the idling event is identified as an idling event. For example, where an idling event is identified when the engine is active and the vehicle has not been in motion for 200 seconds, the "start" of the idling event can be determined at the 200 second mark. The end of the idling event can be determined as the time where the vehicle engages in motion (moves), or the engine of the vehicle is deactivated. In a third case, where method 300 includes identifying idling events from the vehicle data, the start of the idling event can be determined as the time at which the vehicle data begins to show signs of idling. For example, where an idling event is identified when the engine is active and the vehicle has not been in motion for 200 seconds, the "start" of the idling event can be determined as the beginning of the 200 second time period. That is, the start of the idling event can be determined by subtracting 200 seconds (or whatever duration is set as an idling threshold) from the time at which the idling event is identified. Alternatively, the start of the idling event can be determined as the time of the first data point which shows signs of idling (e.g. the first data point where the engine is active and the vehicle is not in motion). The end of the idling event can be determined as the time where the vehicle engages in motion (moves), or the engine of the vehicle is deactivated.

FIG. 4 illustrates a timestamp 412 indicating a start of an idling event, and a timestamp 414 indicating an end of the idling event. FIG. 4 also shows a temporal threshold 490, which extends from timestamp 412 to timestamp 492. Temporal threshold 490 represents temporal acceptability criteria. If the temporal acceptability criteria are satisfied (if an idling event is within the temporal threshold), the idling event is not identified as a select idling event as in act 326. If the temporal acceptability criteria are not satisfied (if an idling event exceeds the temporal threshold), the idling event is identified as a select idling event as in act 324. In the example of FIG. 4, the timestamp 414 indicating the end of the idling event precedes the timestamp 492 indicating the temporal threshold, and thus the idling event in FIG. 4 is within the temporal acceptability criteria. Consequently, the idling event in FIG. 4 is not identified as a select idling event per act 326 in FIG. 3.

FIG. 5 illustrates a timestamp 512 indicating a start of another idling event, and a timestamp 514 indicating an end of the idling event. FIG. 5 also shows temporal threshold 490, which extends from timestamp 512 to timestamp 592. Temporal threshold 490 represents temporal acceptability criteria similarly to as discussed with reference to FIG. 4. In the example of FIG. 5, the timestamp 514 indicating the end of the idling event is after the timestamp 592 indicating the temporal threshold, and thus the idling event in FIG. 5 exceeds the temporal acceptability criteria (by a duration shown as 520). Consequently, the idling event in FIG. 5 is identified as a select idling event per act 324 in FIG. 3.

The temporal threshold can be any appropriate value. As one example, the temporal threshold can be 10 minutes, such that idling events which exceed 10 minutes in length are identified as select idling events. As another example, the temporal threshold could be 3 minutes, such that idling events which excess 3 minutes in length are identified as idling events. Further, the temporal threshold can be dynamic and/or variable based on other factors, as discussed later with reference to FIG. 8.

Figure 6:
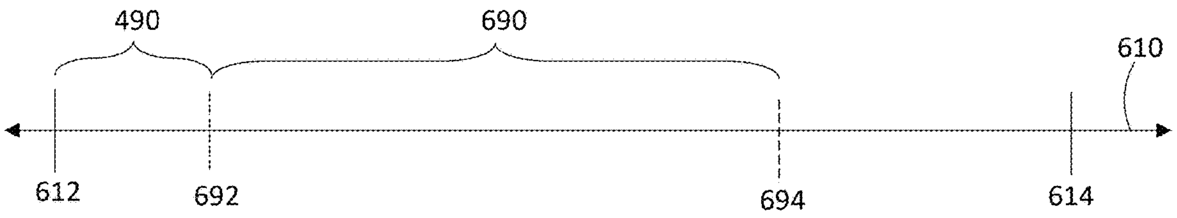

Optionally, in some implementations, an upper limit can be set for temporal acceptability criteria, as is shown in an exemplary scenario in FIG. 6. FIG. 6 illustrates a timeline 610, a timestamp 612 indicating a start of another idling event, and a timestamp 614 indicating an end of the idling event. FIG. 6 also shows a first temporal threshold 490, which extends from timestamp 612 to timestamp 692. FIG. 6 also shows a second temporal threshold 690, extending from timestamp 692 to timestamp 694. Temporal thresholds 490 and 690 together represent temporal acceptability criteria similarly to as discussed with reference to FIG. 4. In the example of FIG. 6, the timestamp 614 indicating the end of the idling event is after the timestamp 692 indicating the first temporal threshold, and is after the timestamp 694 indicating the second temporal threshold. If the end of the idling event (timestamp 614) were within the second temporal threshold 690, the idling event in FIG. 6 would be outside of the temporal acceptability criteria, and would be identified as a select idling event per act 324 of method 300. However, because the end of the idling event (timestamp 614) is outside of the second temporal threshold 690, the idling event in FIG. 6 is within the temporal acceptability criteria, and is thus identified as a select idling event per act 326 of method 300.

In an exemplary scenario, first temporal threshold 490 can be 10 minutes, and second temporal threshold 690 can be 50 minutes. In this way, an idling event which is between 10 and 60 minutes long will be identified as a select idling event. In an alternative exemplary scenario, first temporal threshold 490 can be 3 minutes, and second temporal threshold 690 can be 117 minutes. In this way, an idling event which is between 3 and 120 minutes long will be identified as a select idling event. These durations are merely exemplary, and any appropriate duration can be implemented for a given application.

Having an upper limit for the acceptability criteria as in FIG. 6 prevents legitimate extended idling events as being identified. For example, an extended idling event could be to maintain climate control in a sleeper unit of a truck, while the driver of the truck is resting. As another example, an extended idling event could be to provide power to auxiliary devices even while the vehicle is not moving.

Figure 7:
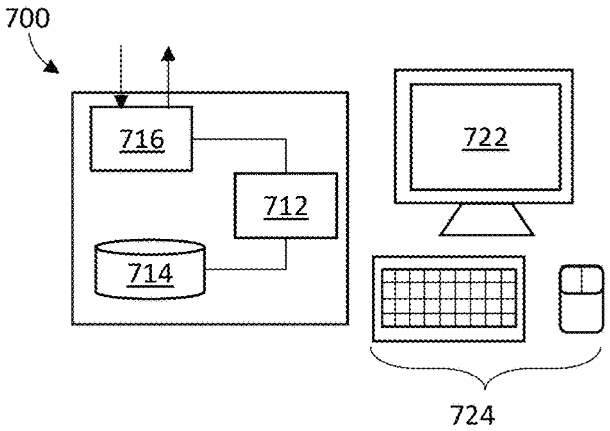
FIG. 7 is a schematic diagram showing an exemplary device.

In some implementations, the acceptability criteria can be defined by an operator input which specifies the acceptability criteria (e.g. a fleet operator or manager can input the at least one temporal threshold via a user interface). FIG. 7 is a schematic view of an exemplary operator device 700, which could be used in any of the implementations discussed herein. For example, device 700 could be used as management device 110 in FIG. 1, or as a user interface device which communicates with management device 110. Device 700 includes at least one processor 712, at least one non-transitory processor readable medium 714, and a communication interface 716. The non-transitory processor-readable storage medium 714 can have processor-readable instructions stored thereon which, when executed by the at least one processor 712 cause the traffic analysis system to perform any of the operations or methods described herein (such as method 300, for example). Communication interface 716 can be a wired or wireless interface, through which data and inputs can be provided to device 700, and through which data and outputs can be provided by device 700. For example, vehicle data for a plurality of vehicles can be received from a telematics by communication interface 716, for processing and analysis by the at least one processor 712. Resulting analysis can also be output by communication interface 716.

FIG. 7 also illustrates exemplary input and output devices through which a user or operator can interact with device 700. In particular, FIG. 7 shows a display 722, which can display outputs from device 700 (like the user interfaces shown in FIGS. 10, 11, and 12 for example). Other output devices could be provided such as speakers, or any other appropriate output device. FIG. 7 also shows a keyboard and mouse 724, which can be used to provide inputs to the device 700, such as selection or indication of regions, or any other appropriate input. Other input devices could also be used, such as a touchscreen, microphone, trackpad, or any other appropriate input device. Although the input and output devices illustrated in FIG. 7 appear in the form of those used with a desktop computer, other forms of devices could also be used, such as portable devices like a laptop, smartphone, PDA, tablet, or any other appropriate device. Further, a device to which a user provides input and receives output can be remote from the device 700. For example, the device which includes the at least one processor 712, the at least one non-transitory processor-readable storage medium 714, and the communication interface 716 can be a server, which is remote from a workstation or device with which the user interacts.

In some implementations, acceptability criteria can be determined, accessed, adjusted, changed, or customized (e.g. by at least one device or processor performing acts of method 300) based on additional data pertinent to a vehicle (e.g. location, time, or temperature data), with several examples being discussed below. In some cases, acceptability criteria can be accessed or retrieved which corresponds to certain other data (e.g. a database of certain acceptability criteria can be stored for certain ranges of additional data, such as in the form of a look-up table, and appropriate acceptability criteria can be accessed as needed). In other cases, default acceptability criteria can be accessed, which is updated or adjusted as needed based on the additional data (e.g. adjustment factors or weights can be accessed corresponding to the additional data, and applied to base acceptability criteria).

Figure 8:
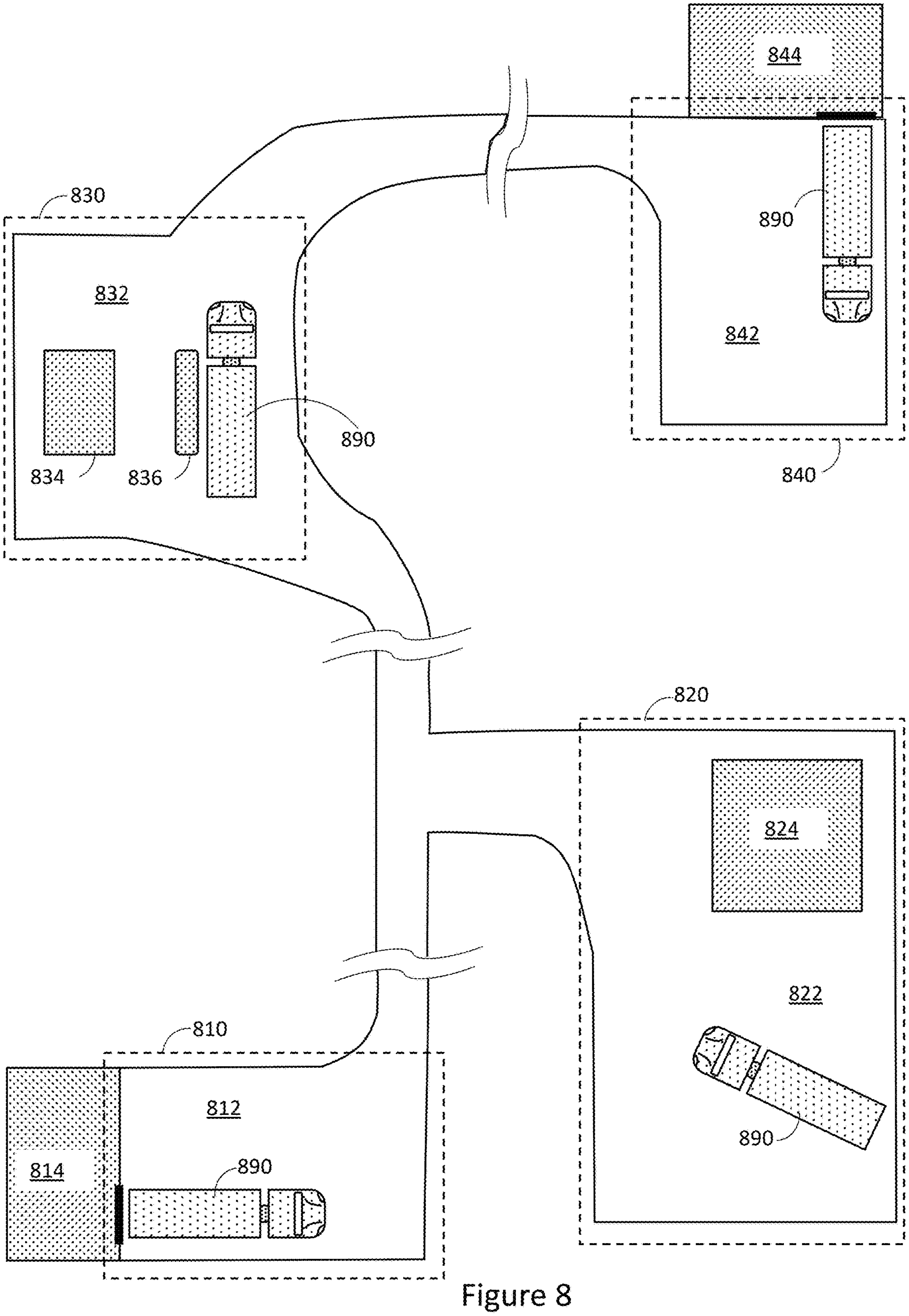
FIG. 8 is a top view of a vehicle stopping at a plurality of locations.

In some implementations, acceptability criteria can be based on a location of a particular vehicle during an idling event (e.g. based on location data for the vehicle corresponding to the idling event). FIG. 8 is a top view representing a vehicle journey by a truck 890, which illustrates this concept. FIG. 8 shows a plurality of regions 810, 820, 830, and 840 where rest periods take place (where the truck 890 is stationary). At region 810, truck 890 is parked in lot 812 of a warehouse 814, being loaded with cargo.

After being loaded, truck 890 drives for a time, until taking a rest period in region 820. Region 820 encompasses a truck stop having a lot 822 and a building 824. In this example, the driver of truck 890 takes a rest period here to sleep.

After sleeping, truck 890 drives for a time, until stopping in region 830 to refuel. Region 830 encompasses a gas station having a lot 832, convenience store 834, and fuel pumps 836.

After refueling, truck 890 drives for a time, until stopping in region 840. Region 840 includes a warehouse having a lot 842 and a warehouse building 844. Truck 890 is unloaded in region 840.

Based on location classification, a device (e.g. management device 110) performing idling event analysis can determine select (or not select) idling events per acts 322, 324, and 326 in method 300, based at least in part on location classifications for locations where truck 890 stops. For example, because region 820 encompasses a truck stop (a common resting place for trucks), acceptability criteria may be more lax for vehicles stopped in region 820. With reference to the temporal criteria discussed earlier, the upper temporal criteria may be more lax compared to other locations (e.g. timestamp 694 may be closer to timestamp 692, such that second temporal threshold 690 is shorter), because a truck stop is commonly a place where drivers stop to rest, and often need to utilize the climate control and/or auxiliary functions provided by their vehicle.

As another example, because region 830 encompasses a gas station, acceptability criteria may be more stringent than for other types of regions. For example, temporal threshold 490 in FIGS. 4, 5, and 6 could be shorter, because there may not be a reasonable cause for idling at a gas station. In particular, there is generally less need to warm up a vehicle at a gas station (the vehicle is normally already warmed up by driving to the gas station), and a vehicle engine should not be active when refueling the vehicle.

As other examples, because regions 810 and 840 encompass warehouse regions where truck 890 is loaded or unloaded, acceptability criteria may be different. For example, temporal threshold 490 in FIGS. 4, 5, and 6 could be shorter, so as to identify (and subsequently discourage) idling when workers are proximate the vehicle 890 performing loading or unloading, and thus reduce their exposure to engine fumes. Conversely, temporal threshold 490 in FIGS. 4, 5, and 6 could be longer, to allow for idling to warm up the vehicle 890 at common endpoints of the journey.

Truck stops, gas stations, and warehouse are examples of location classifications where adjustments to acceptability criteria can be implemented. However, acceptability criteria can be adjusted for any appropriate location classifications, such as weigh-stations, hotels, railroad crossing, or any other location classification.

FIG. 8 illustrates regions encompassing certain locations as being square, but this is not necessarily the case. Regions can be any appropriate shape.

In some implementations, regions for location classification could be manually defined, for example by an operator or administrator of a traffic analysis system drawing or selecting regions on map. In other implementations, regions could be automatically defined. For example, based on map data or labelling, locations such as "gas station", "restaurant", or "truck-stop" could automatically have encompassing regions delineated using an automated algorithm or AI, such as by image processing satellite images to delineate parking or road areas near the location. As another example, locations with appropriate labels could have a circular region defined therearound with a specific radius.

Further, acceptability criteria based on location classification can be changed or customized on a per-fleet, per-vehicle, per-vocation, or per-journey basis. As one example, a fleet may be responsible for delivering fuel to gas stations. For such a fleet, acceptability criteria for idling at gas stations can be adjusted. Other changes and customizations can be made as appropriate for a given application.

In addition to or as an alternative to the above, acceptability criteria can be changed, adjusted, or customized based on location more broadly. For example, acceptability criteria can be based on geographic region, for example as a representation of typical temperature. Generally, a vehicle performs best, and is most comfortable to drive (which in turn improves safe operation), at optimal temperature. In particularly cold environments or regions, idling a vehicle for a brief period warms the vehicle engine and fluids, and in turn enables in-cabin heating; thus idling prior to driving can improve vehicle operation and driver comfort. Similarly, in particularly hot environments, idling a vehicle for a brief period enables an air conditioning unit of the vehicle to cool the vehicle cabin, thus improving driver comfort and safe operation of the vehicle.

To this end, acceptability criteria for idling can be adjusted to be more lax in regions of extreme temperature. For example, regions closer to the poles of the earth (extreme northern or extreme southern regions), and regions with mountainous terrain or at high altitude tend to be colder. In contrast, regions closer to the equator tend to be hotter, and regions close to large bodies of water (namely the Ocean or large lakes) tend to be more humid. When location data for a vehicle indicates that the vehicle is in an appropriate region (e.g. within specified latitude bands, within certain distance to bodies of water, within certain mountain ranges, or any other appropriate regions), acceptability criteria can be adjusted accordingly to allow for longer or shorter idling before an idling event is identified as a select idling event.

In some implementations, acceptability criteria can be directly based on temperature of a location of the vehicle for the idling event. For example, based on location data for the vehicle, weather or temperature information can be accessed, such as from a weather service or database. If the temperature where the vehicle is located is outside of temperature thresholds (e.g. if the temperature is below a low temperature threshold, and/or if the temperature is above a high temperature threshold) acceptability criteria can be adjusted (e.g. the temporal thresholds discussed with reference to FIGS. 4 5, and 6 can be lengthened to allow for longer idling before identifying an idling event as a select idling event). Alternatively, some vehicles or vehicle devices include a temperature sensor (e.g. as one of sensors 214 or 292 in FIG. 2) which collects temperature data. Based on a temperature at the vehicle as indicated in this temperature data, acceptability criteria can be adjusted similarly to as discussed above.

In some implementations, acceptability criteria can be based on a time when the idling event being analyzed occurs. In an exemplary implementation, idling events which occur during certain time periods of the day may be subject to more lax acceptability criteria, whereas idling events which occur during other time periods of the day may be subject to more stringent acceptability criteria. For example, a particular or vehicles could have established or set "start times", where the vehicle is first activated for the day, or where the vehicle is activated after a rest period (e.g. after a lunch break). During such "start times", acceptability criteria can be more lax, to allow for the vehicle or vehicles to warm-up by idling. In contrast, outside of such "start times" acceptability can be more stringent, to prevent idling during time periods where warming up is not necessary. In another exemplary implementation, idling events which occur during certain time periods of the year (e.g. seasons) may be subject to more lax acceptability criteria, whereas idling events which occur during other time periods of the year may be subject to more stringent acceptability criteria. For example, idling events which occur during the winter may be subject to more lax acceptability criteria compared to idling events which occur in the spring or autumn.

In some implementations, acceptability criteria can be determined dynamically (e.g. by the management device 110) based on idling data for other vehicles in a region where a vehicle is located. That is, vehicle data and/or idling data from a library of vehicles can be accessed (captured, collected, or accessed from storage, as appropriate for a given application). The data for the library of vehicles can be identified for example as data captured by vehicles within a certain distance, or within a same or proximate "zone" as a vehicle of interest, based on location data from the vehicle of interest and location data for vehicles of the library of vehicles. Further, the library of vehicles can be limited to vehicles of similar vocation, class, make, or model as the vehicle of interest. Based on the data for the library of vehicles, a common idling duration can be determined or identified, and acceptability criteria can be set based thereon. For example, an average or median idling duration for the library of vehicles can be determined, and acceptability criteria including a temporal threshold for idling can be set based thereon (e.g., the temporal threshold can be set as a standard deviation or factor of a standard deviation above the average or median threshold).

Returning to method 300 in FIG. 3, at 330 a fuel consumption by the plurality of vehicles for the subset of select idling events is determined (for example by the at least one processor 114). Act 330 includes act 332, which comprises determining a fuel consumption by the respective vehicle for each select idling event of the subset of select idling events. Several different implementations of act 332 are discussed below. Act 330 can optionally include act 334 as discussed in detail later. Act 330 itself is also optional, and method 300 could include act 340 instead (or in addition to act 330), as discussed later.

In a first exemplary implementation, to determine fuel consumption for each select idling event of the subset of select idling events as in act 332, an idle fuel consumption rate corresponding to the vehicle where the select idling event occurs is accessed. The idle fuel consumption rate can be stored at in a database accessible to the device performing act 330 (e.g. at non-transitory processor-readable storage medium 116, or a non-transitory processor-readable storage medium at another device in communication with the device performing act 330, such as medium 136 of device 130). The idle fuel consumption rate represents fuel consumed when idling by the vehicle, and can be stored at any appropriate level of specificity. For example, an idle fuel consumption rate can be determined (e.g. via empirical tests) for a make, model, year number, or any other appropriate identifier or combination of identifiers for a type of vehicle. When accessing idle fuel consumption rate for a particular vehicle (of a particular make, model, year, and/or other appropriate identifier) to determine fuel consumption, an idle fuel consumption rate which matches the vehicle type (make, model, year, and/or other appropriate identifier) is accessed. As another example, the idle fuel consumption rate can be provided by a vehicle manufacturer for a particular make, model, year number, or any other appropriate identifier or combination of identifiers for a type of vehicle.

Based on the idle fuel consumption rate, the at least one processor of the device performing act 332 determines fuel consumption for the select idling event. This is achieved by determining a product of the duration of the select idling event and the idle fuel consumption rate. In some cases, the "product" is a literal multiplication. For example, the idle fuel consumption rate can be expressed as a fuel volume consumed per unit of time while the vehicle is idling, such as L/h (liters per hour) or gal/h (gallons per hour), or any other appropriate units. Such an idle fuel consumption rate can be multiplied by the number of units of time of the select idling event to determine total fuel consumed for the select idling event. For example, if the idle fuel consumption rate is 2 L/h, and a select idling event is 15 minutes (0.25 h), the fuel consumed during the select idling event is (2*0.25)=0.5 L. In some cases, conversion is performed to adjust for difference in units between the idle fuel consumption rate and the duration of the select idling event.

In a second exemplary implementation, to determine fuel consumption for each select idling event of the subset of select idling events in act 332, fuel data corresponding to the vehicle where the select idling event occurs is accessed by the device performing act 332 (e.g. management device 110). Based on the fuel data, a fuel consumption for the select idling event is determined.

In some cases, the fuel data comprises fuel level data which indicates a fuel level of the vehicle where the select idling event occurs. In such implementations, determining a fuel consumption for the select idling event based on the fuel data comprises determining the fuel consumption for the select idling event as a difference between an end fuel level for the vehicle and a starting fuel level for the vehicle. In particular, the fuel level data can indicate the end fuel level as an amount of fuel in the vehicle at an end of the select idling event (e.g. by correlating a timestamp representing the start of the idling event with a timestamp for a data point for the fuel level data), and can indicate the start fuel level as an amount of fuel in the vehicle at a start of the select idling event (e.g. by correlating a timestamp representing the end of the idling event with a timestamp for a data point for the fuel level data).

In many cases, fuel level data represents a proportion (e.g. percentage) of fuel remaining at the vehicle based on a fuel capacity of the vehicle, instead of a volume of available fuel. In such cases, fuel level as indicated in the fuel level data can be correlated to fuel volume using a look-up table, conversion factors, or similar. An example is discussed below with reference to FIG. 9. Additionally, fuel level data can be prone to significant inaccuracies, for example due to movement or sloshing of the fuel caused by movement or vibration of the vehicle. Even when the vehicle is idling (and is stationary), variance in fuel level data readings of several percent is still possible, typically due to vibrations of the vehicle and/or environment where the vehicle is positioned. As such, some form of fuel level smoothing and/or data filtering can be performed. The fuel level data accessed and/or utilized in the context of act 330 can be such smoothed or filtered fuel level data. Exemplary systems and methods for improving fuel level data accuracy are described in at least U.S. Provisional Patent Application No. 63/598,755 and U.S. Non-provisional patents application Ser. Nos. 18/815,344 and 18/815,371, the entirety of each of which are incorporated by reference herein.

FIG. 9 shows a table 900 which illustrates exemplary fuel amounts and calibration factors for a particular vehicle model. The left column shows amount of fuel volume remaining in a fuel tank of the vehicle. That is, the left column shows an actual amount of fuel in the fuel tank, expressed by volume. In this example, volume is expressed in liters (L), but volume could be expressed in any appropriate unit, such as gallons (gal). The middle column of table 900 shows measured fuel level for the vehicle, as measured by a fuel level sensor at a vehicle, and expressed as a percentage. The right column of table 900 shows a calibration factor, used for converting measured fuel level (in %) to fuel volume (in L in the example, but other units are possible). That is, by multiplying the measured fuel level by a corresponding calibration factor, a volume of fuel remaining can be determined, as shown in Equation (1) below. Such multiplication can be performed by at least one processor of the device which performs method 300 (e.g. the at least one processor 114).

$$V = f_l * c_f(f_l) \tag{1}$$

In Equation (1), V represents volume of fuel, $f_l$ represents measured fuel level, and $c_r(f_l)$ represents calibration factor corresponding to the measured fuel level.

Table 900 illustrates a limited number of rows (and thus a limited granularity of volume, fuel level, and calibration factors). In practice, more rows can be available for a given vehicle model to improve granularity of calibration factors. Alternatively or additionally, for a measured fuel level between the percentages shown, a calibration factor between those shown can be determined, as shown in Equation (2) below.

$$c_f(f_l) = c_f(f_l^-) + \frac{f_l - f_l^-}{f_l^+ - f_l^-} * (c_f(f_l^+) - c_f(f_l^-)) \tag{2}$$

In Equation (2), $f_l$ represents measured fuel level, $f_l^+$ represents a next represented fuel level above $f_l$, and $$f_l^-$$

represents a next represented fuel level below $f_l$. Further $c_f(f_l)$ represents calibration factor corresponding to the measured fuel level, $$c_f(f_l^+)$$

represents calibration factor corresponding to $$f_l^+, c_f(f_l^-)$$

represents calibration factor corresponding to $$f_l^-.$$

That is, in Equation (2) a proportional ratio is determined between the closest (above and below) represented fuel levels, and this proportional ratio is multiplied by the difference between the closest (above and below) calibration factors, and added to the next lowest calibration factor. The result is an intermediate calibration factor which approximately corresponds to the measured fuel level.

In some implementations, alternate methodologies for determining an intermediate calibration factor could be applied. In some implementations, calibration factor can be modeled as an equation or fit trend. In other implementations, the nearest represented calibration factor could be applied, without determining an intermediate calibration factor.

However, Equations (1) and (2) above are limited to when measured fuel level is less than 100%. Commonly, a vehicle fuel tank can hold more fuel than a corresponding fuel level sensor can read. In the example of table 900, the fuel level sensor reports 100% fuel level when fuel volume is at 88.81 L. However, the fuel tank can actually hold up to 93 L. As a result, when a fuel sensor measure fuel level is at 100%, the actual volume of fuel in the vehicle is uncertain. This region of fuel volume at and above 100% can be referred to as the "saturation region", where the fuel level sensor value is saturated and cannot measure higher values.

Table 900 illustrates one exemplary vehicle model, but fuel tank capacity in the saturation region can vary widely for other vehicle models. For example, some vehicle models have been measured to have at least 9 L of capacity in the saturation region.

In view of the above, relying on fuel level data to determine idling fuel consumption is not always accurate.

As an alternative, the fuel data used to determine idling fuel consumption in method 300 can comprise fuel consumption data which indicates a fuel consumption rate of the vehicle where the select idling event occurs. In particular, many modern vehicles generate and output a fuel consumption signal, and this fuel consumption signal can be collected by a vehicle device (e.g. vehicle device 122 in FIG. 1, or telematics device 204 in FIG. 2 can read the fuel consumption signal from the vehicle via communication interface 212).

In an example, the fuel consumption signal is provided as a measure of fuel consumed correlated with time, such as liters consumed per hour, or any other appropriate volume or time units. Further, a fuel consumption signal can be output regularly (e.g. every second, or any other appropriate interval). A plurality of instants of the fuel consumption signal can be collectively referred to as fuel consumption data, and fuel consumed between a start of an idling event and an end of the idling event can be determined by the at least one processor accumulating the fuel consumption data between the start and end of the idling event. In this example, accumulating the fuel consumption data between the start and end of the idling event can comprise integrating the fuel consumption data over the time span of the idling event, which results in a total volume of fuel consumed between the start and end of the idling event.

In some cases, a fuel consumption rate signal is not output by the vehicle. In such a case, alternative signals may be output, such as intake manifold pressure, mass airflow, fuel injection quantity, etc. A fuel consumption rate or volume can be derived from these signals (e.g. by at least one processor 222 of telematics device 204, or at least one processor 114 of management device 110). Such a derived fuel consumption rate can be utilized in the context of method 300 to determine idling fuel consumption.

As another alternative, the fuel data used to determine idling fuel consumption in method 300 can comprise lifetime fuel consumption data for the vehicle where the select idling event occurs. In particular, for some vehicles a lifetime fuel consumption accumulator is maintained for the respective vehicle. That is, fuel consumption by the vehicle over time is aggregated and stored, much like how an odometer is aggregated indicating lifetime distance travelled by the vehicle. In some cases, the vehicle itself maintains this accumulator; in other cases based on fuel consumption data an external device (such as vehicle device 122, telematics device 204, or management server 110) can aggregate fuel consumption data over time for the vehicle to store a lifetime fuel consumption value, trend, or dataset. In implementations where data indicating lifetime fuel consumption $f_{lifetime}(t)$ by the vehicle is available, the fuel consumption for a select idling event can be determined by subtracting the lifetime fuel consumed value at the start time ($t_{start}$) of the select idling event from lifetime fuel consumed at an end time ($t_{end}$) of the select idling event. This is shown in Equation (3) below:

$$\text{fuel consumption} = f_{lifetime}(t_{end}) - f_{lifetime}(t_{start}) \quad (3)$$

By determining fuel consumption for each of the select idling events of the subset of select idling events, "wasted" fuel quantity is determined. That is, because the select idling events are generally considered preventable or non-optimal operation of the respective vehicles, fuel consumed during these select idling events can be considered as wasteful. By determining fuel consumption for each of the select idling events, action can be taken to identify and correct prominent issues of fuel wastage.

In some implementations, where an idle fuel consumption rate is utilized in act 332, the idle fuel consumption rate can be pre-determined on a per-vehicle basis, based on historical idling periods of the vehicle. In particular, based on previous periods where the vehicle is idling (identified for example as discussed with reference to act 310 in method 300), fuel consumption can be determined (either per idling event or over a plurality or span of idling events), such as discussed above using a fuel consumption signal, fuel level data, or a lifetime fuel accumulator. Idle fuel consumption rate (per time) can be determined by dividing the determined fuel consumption by the duration of the idling event (or plurality or span of idling events). Optionally, this can be performed over time for many idling events, and a plurality of determined idling fuel consumption rates can be averaged or otherwise combined to determine a general idling fuel consumption rate for the vehicle. The determined fuel consumption rate for the vehicle can be stored for future access as in act 330 discussed earlier.

Optionally in some implementations, determining the fuel consumption over the subset of select idling events in act 330 of method 300 comprises act 334 of determining an accumulation of the determined fuel consumption over each select idling event in the subset of select idling events. That is, any of the above discussed techniques can be used to determine fuel consumption for each select idling event in the subject of select idling events per act 332. The fuel consumption for each select idling event can then be accumulated (e.g. summed), to determine a total fuel consumption for the subset of select idling events. Determining the total fuel consumption for the subset of select idling events is generally indicative of a total "wasted" fuel quantity, similar to as discussed above. By determining this total, it can be determined at a high level whether the plurality of vehicles is being operated relatively efficiently (with minimal waste) or not (e.g. relative to other fleets, groups, or pluralities of vehicles).

Optionally, at 340 in method 300 of FIG. 3, "preventable" fuel consumption by the plurality of vehicle for the subset of select idling events is determined. Act 340 can be performed instead of or in addition to act 330 discussed above. Act 340 comprises acts 342 and 344 performed for each select idling event in the subset of select idling events. Act 340 can optionally comprise act 346.

At 342, a difference between data representing a particular select idling event and the acceptability criteria is determined. In the example of FIG. 5 where the acceptability criteria is a temporal threshold 490, a duration of the select idling event exceeds the temporal threshold 490 by a time span 520. That is, a difference between the data representing the select idling event (the corresponding vehicle data) and the acceptability criteria, is the time span 520.

At 344, a preventable fuel consumption for the select idling event is determined, based on the difference between the data representing the select idling event and the acceptability criteria. In the example of FIG. 5 where the difference between the data representing the select idling event (the corresponding vehicle data) and the acceptability criteria is the time span 520, preventable fuel consumption is determined for the time span 520. Any of the techniques for determining fuel consumption discussed above with reference to act 332 are fully applicable to act 344. One difference between act 332 and act 344 is that in act 332 the determined fuel consumption is for the entire select idling event, whereas in act 344 the determined fuel consumption is only for a portion of the select idling event which is outside of the acceptability criteria.

Optionally in some implementations, determining the preventable fuel consumption over the subset of select idling events in act 340 of method 300 comprises act 346 of determining an accumulation of the determined preventable fuel consumption over each select idling event in the subset of select idling events. That is, any of the above discussed techniques can be used to determine preventable fuel consumption for each select idling event in the subject of select idling events as in act 344. The preventable fuel consumption for each select idling event can then be accumulated (e.g. summed), to determine a total preventable fuel consumption for the subset of select idling events. Determining the total preventable fuel consumption for the subset of select idling events is generally indicative of a total "wasted" fuel quantity, similar to as discussed above. By determining this total, it can be determined at a high level whether the plurality of vehicles is being operated relatively efficiently (with minimal waste) or not (e.g. relative to other fleets, groups, or pluralities of vehicles).

In some circumstances, act 340 can be a more accurate way of determining achievable fuel savings than act 330. As one example scenario, it may be acceptable for a driver to idle their vehicle for up to 10 minutes to warm it up. However, a driver may idle the vehicle for longer (e.g. 15 minutes) for any number of reasons. In this scenario, the entire idling event is not necessarily "preventable", in that the driver will warm up the vehicle for some amount of time. But rather, the excessive amount of idling (5 minutes) can be considered as "preventable", because this idling is not necessary and can be avoided.

However, in some circumstances, act 330 can be a more accurate way of determining achievable fuel savings than act 340. As one example scenario, a driver may leave their vehicle idling while they are absent (e.g. while they purchase supplies at a store). Such an idling event may be considered as entirely "preventable", in that the driver should have deactivated the vehicle before leaving the vehicle.

Which of acts 330 or 340 will be more accurate is highly dependent on a particular fleet, type of vehicle, and driver base, and thus should be chosen as appropriate for a given application. Act 330 will tend to over-estimate potential fuel savings (because entire idling events are determined as "preventable"), whereas act 340 will tend to under-estimate potential fuel savings (because only idling fuel consumption explicitly in excess of acceptability criteria is identified as "preventable"). In some implementations, both acts 330 and 340 can be performed. In one example, act 330 can be performed as a "high" potential fuel savings estimate, and act 340 can be performed as a "low" potential fuel savings estimate, thereby resulting in a potential fuel savings range. In another example, acts 330 can 340 can both be performed, and a result can be combined (e.g. average, weighted average, or other combination).

Optionally, fuel consumption (whether total, per-idling event, or preventable) can be used to determine carbon emissions over the subset of select idling events. As one example, for each idling event of the select idling event, the fuel consumption (determined at 332 or 344) can be multiplied by a carbon emissions factor, to determine an amount of carbon emissions caused by the select idling event. Similarly, the total fuel consumption for the subset of select idling events can be multiplied by the carbon emissions factor, to determine an amount of carbon emissions caused by the subset of select idling events. In this regard, "preventable" carbon emissions can be identified, which can be saved or reduced by preventing unnecessary idling. Emissions can be determined specifically for each type of emission (e.g. $CO_2$, CO, $N_2O$, or any other pertinent compounds) by multiplying the fuel consumption by a corresponding carbon emissions factor. Alternatively or additionally, multiple carbon emission compounds can be determined together or as a group by multiplying by an appropriate emissions factor.

At 350, at least one indication is output based on the determined fuel consumption and the subset of select idling events. Exemplary user interfaces for providing this output are described below with reference to FIGS. 10, 11, 12, 13, and 14.

FIG. 10 illustrates a user interface 1000, which includes a table having at least columns 1010, 1020, 1030, 1040, and 1050 and indications 1060 in the illustrated example. User interface 1000 is intended to be presented to a manager of a plurality of drivers and/or plurality of vehicles, and could be presented for example by management device 110 or optional device 130 in FIG. 1, or by a device communicatively coupled thereto (e.g. such as by display 722 in FIG. 7).

In column 1010, a plurality of vehicle identifiers are listed. While three vehicles are illustrated, any appropriate number of vehicles can be listed. Further, any appropriate vehicle identifiers can be used, such as license plate numbers, VINs, vehicle make, vehicle model, vehicle name or nickname, or any other identifier.

In column 1020, a plurality of driver identifiers are listed. While three drivers are illustrated, any appropriate number of drivers can be listed. Further, any appropriate driver identifiers can be used, such as name, nickname, employee ID number, or any other identifier.

In the example of FIG. 10, each driver is associated with a corresponding vehicle. This is suitable for fleets where each driver has a dedicated vehicle which is not normally used by other drivers. In other scenarios, however, vehicles may not be tightly associated with drivers; that is, in some implementations drivers may change which vehicles they use. In such implementations, column 1010 or column 1020 could be omitted.

In the above discussed implementations for identifying a subset of select idling events, the vehicle data used is associated with the vehicle from which it originates, and thus presenting the information of user interface 1000 per-vehicle, and not per-driver, is a matter of omitting column 1020.

On the other hand, if user interface 1000 is desired showing the information on a per-driver basis (whether column 1010 is omitted or not), a driver associated with each vehicle (for each select idling event in the subset of select idling events) can be determined. In some exemplary implementations, each vehicle in the plurality of vehicles can be equipped with a driver identification device. For example, drivers may be required to authenticate or identify themselves before using a vehicle. Exemplary means of authentication can include identification cards and readers (e.g. NFC or RFID identification cards which a driver taps against a card reader), username/password input, biometric input or scanning (e.g. a fingerprint scanner or facial recognition imaging system), or any other appropriate means of identification/authentication. In such examples, a driver associated with each select idling event can be determined by accessing driver data which indicates when each driver uses each vehicle (e.g. stored at the management device 110, or provided with the vehicle data such as collected by telematics device 204). In other exemplary implementations, driver data can be maintained at a server (such as management device 110) which indicates associations between drivers and vehicles (e.g. an employee and vehicle schedule).

Associating vehicles and drivers for each select idling event of the subset of select idling events can be performed as discussed above for any other user interfaces or outputs provided by the systems discussed herein, including for example those discussed with reference to FIGS. 13 and 14.

For each vehicle and/or driver, associated select idling events can be accumulated. As one example, a quantity of select idling events can be summed and output, as is shown in column 1030 of user interface 1000. As another example, preventable fuel consumption (as determined in acts 330 or 340) over all of the select idling events associated with a vehicle or user can be summed and output, as shown in column 1040 of user interface 1000. Further, optionally preventable emissions can be determined (as discussed earlier) for each vehicle and/or driver and presented, as shown in column 1050 of user interface 1000.

In addition to accumulating select idling event information for each vehicle and/or driver, total select idling event information (such as determined earlier as discussed with reference to acts 334 and 346 in method 300) can also be presented, as shown in indication 1060 in user interface 1000. In particular, indication 1060 shows a total number of excessive idling events (i.e. the number of idling events in the subset of select idling events), total preventable fuel consumption (e.g. as determined in acts 330 or 340), and total preventable emissions (e.g. determined as discussed earlier).

Figures 11, 12:
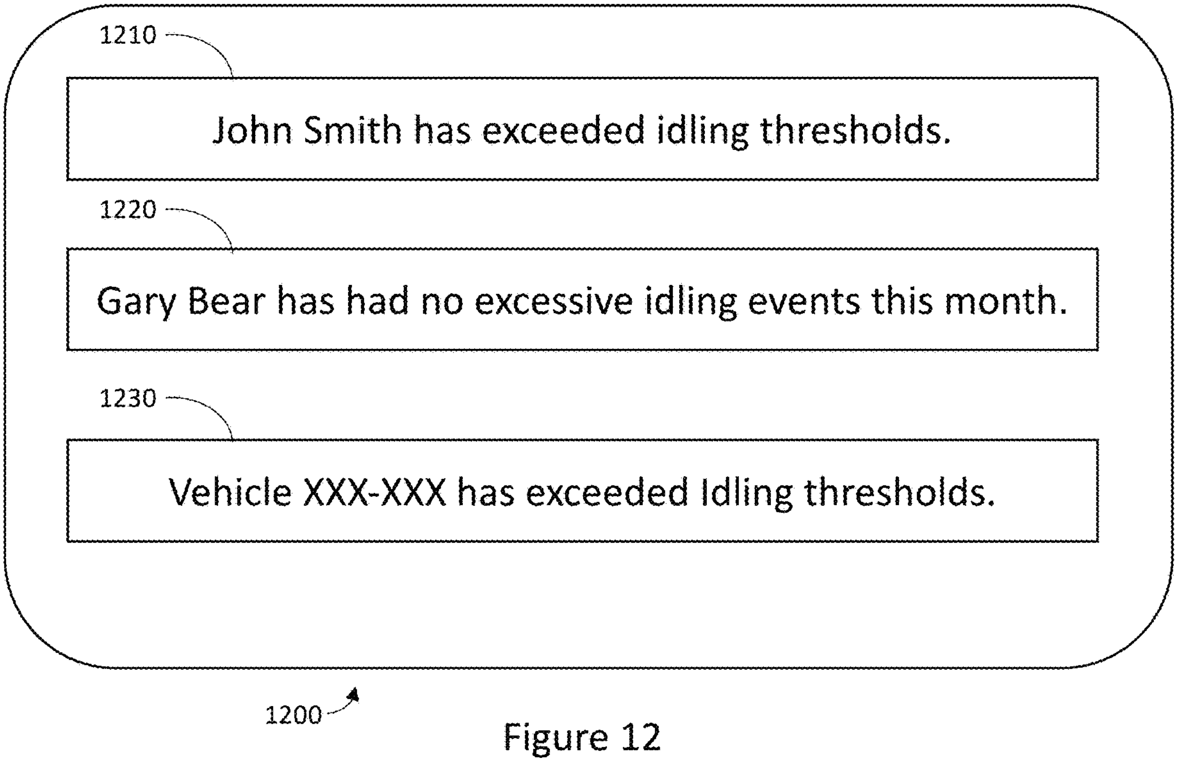

FIG. 11 illustrates a user interface 1100, which includes a table having at least columns 1110, 1120, 1130, 1140, and 1150 in the illustrated example. Like user interface 1000 in FIG. 10, user interface 1100 is intended to be presented to a manager of a plurality of drivers and/or plurality of vehicles, and could be presented for example by management device 110 or optional device 130 in FIG. 1, or by a device communicatively coupled thereto (e.g. such as by display 722 in FIG. 7).

User interface 1100 provides a breakdown per select idling event, where each row corresponds to a particular select idling event.

Column 1110 shows a date and time where each select idling event occurred (e.g. a start time or end time of the select idling event).

In column 1020, a plurality of driver identifiers are listed, corresponding to the respective driver responsible for the vehicle where the select idling event occurred. Any appropriate driver identifiers can be used, such as name, nickname, employee ID number, or any other identifier. Further, while not explicitly illustrated, a vehicle identifier for the vehicle where each select idling event occurs could be shown in addition to or instead of the Driver identifiers shown in column 1120. A driver responsible for each select idling event (a driver associated with a vehicle where each select idling event occurs) can be determined using any appropriate means, such as those discussed above with reference to FIG. 10.

In column 1130, a duration of each select idling event is shown (for example determined as a difference between a start time and an end time of the select idling event).

In column 1140, preventable fuel consumption (as determined in acts 330 or 340) for each select idling event is shown. Optionally, preventable emissions can be determined (as discussed earlier) for each select idling event, as shown in column 1150 of user interface 1100.

In some implementations, alerts or notification prompting operator action can be presented, as shown in FIG. 12. FIG. 12 illustrates an exemplary user interface 1200, including three alerts 1210, 1220, and 1230. User interface 1200 is intended to be presented to a manager of a plurality of drivers and/or plurality of vehicles, and could be presented for example by management device 110 or optional device 130 in FIG. 1, or by a device communicatively coupled thereto (e.g. such as by display 722 in FIG. 7).

In some implementations, an accumulation of select idling events for drivers is compared to an exception threshold. For example, the exception threshold could be a threshold number of select idling events, before action needs to be taken. As another example, the exception threshold could be a threshold quantity of fuel consumption or emissions. As yet another example, the exception threshold could be a threshold total duration for select idling events. By using exception thresholds, drivers are given some amount of leeway, and/or provides flexibility in the case of false positive identification of select idling events per method 300 in FIG. 3. For drivers where the select number of idling events exceeds the exception threshold, an indication of such can be output. Such an indication is shown in alert 1210 in FIG. 12. In this case, John Smith has exceeded exception thresholds (e.g. he has a high number of select idling events and/or a high quantity of idling fuel consumption or emissions, per FIG. 10), and his manager is alerted, such that the manager can take appropriate action (e.g. training, coaching, or disciplinary action).

In some implementations, exceptional drivers can be noted (e.g. drivers who are within idling thresholds, or are well below idling thresholds) and a manager alerted. In FIG. 12, alert 1220 indicates that driver Gary Bear has had no excessive idling event in a month. Based on such an alert, Gary Bear's manager can take appropriate action (e.g. providing Gary Bear with perks or bonuses for exceptional performance).

In some implementations, an accumulation of select idling events is determined per-vehicle (as discussed earlier with reference to FIG. 10). Such accumulations can then be compared to an exception threshold (such as the exception thresholds discussed above). For vehicles where the select number of idling events exceeds the idling threshold, an indication of such can be output. Such an indication is shown in alert 1230 in FIG. 12. In this case, vehicle XXX-XXX has exceeded exception thresholds (e.g. he has a high number of select idling events and/or a high quantity of idling fuel consumption or emissions, per FIG. 10), and the manager is alerted, such that the manager can take appropriate action (e.g. assessing whether maintenance needs to be performed to prevent idling, such as such as addressing a low-performing vehicle battery or alternator which creates an excessive need for charging).

In some implementations, drivers can be alerted directly regarding identified select idling events. FIGS. 13 and 14 illustrate exemplary user interfaces and alerts in this regard. FIGS. 13 and 14 show user interfaces presented on respective smartphones belonging to drivers. However, alternative devices could be used instead. As examples, a driver PDA, tablet, computer, an in-vehicle infotainment system, or any other appropriate device could be used to present the alerts as suitable in a given scenario. The alerts presented in FIGS. 13 and 14 can be sent to the respective devices from a server, such as management device 110 or optional device 130 in FIG. 1.

Figure 13:
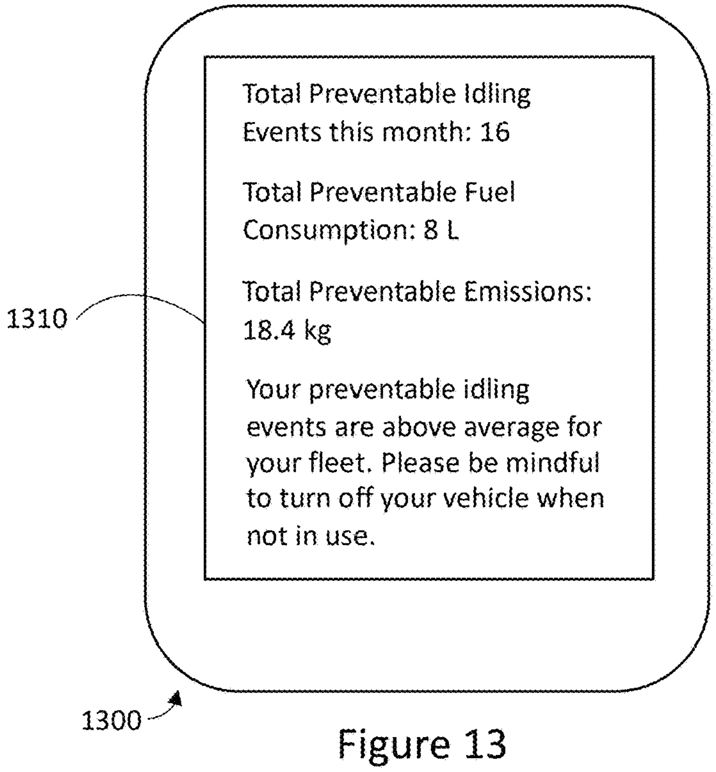
FIGS. 13 and 14 illustrate exemplary driver devices which present user interfaces, in accordance with at least two illustrated implementations.

FIG. 13 shows a user device 1300, which includes a display 1310. In the example of FIG. 13, an alert is received by the device 1300 which includes information for the driver's performance for the past month, though any other alert frequency could be implemented. Display 1310 presents important information in this regard, including total preventable idling events by the driver, total preventable fuel consumption, total preventable emissions, and commentary asking for improvement from the driver. Based on this information, the driver can seek to improve and reduce future occurrences of preventable idling.

Figure 14:
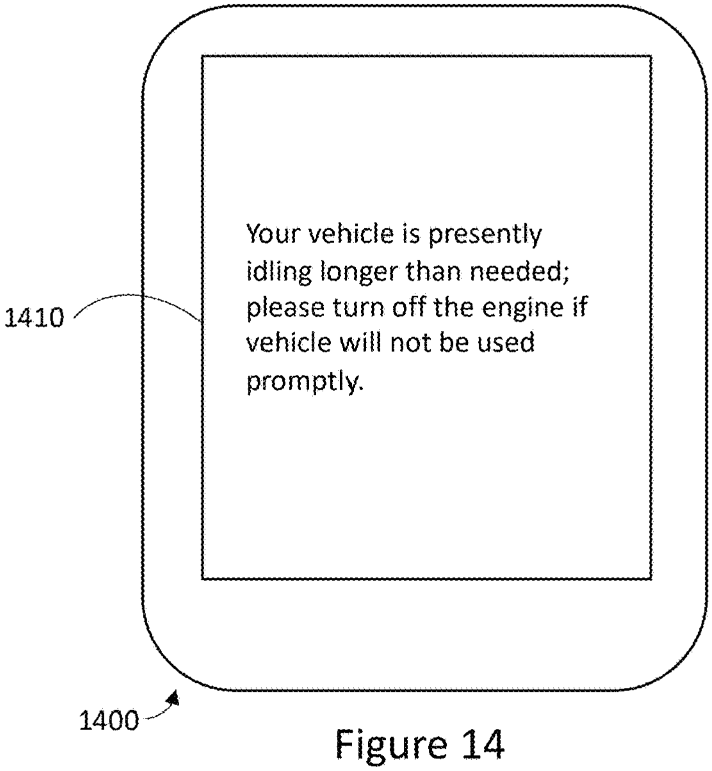

FIG. 14 shows a user device 1400, which includes a display 1410. In the example of FIG. 14, an alert is received by the device 1400 which indicates a real-time select idling event. That is, when a select idling event is identified (as in act 320 of method 300), an alert can promptly be transmitted to a device at the vehicle (device 1400 in this example). The device presents the alert to the driver, such that the driver is reminded to take action. This can result in a prompt end to the select idling event, and thus the prevention of further needless fuel consumption and emissions generation.

Several notifications are discussed in the exemplary user interfaces of FIGS. 12, 13, and 14. Such notifications can take any appropriate form, including a visual or text box presented via a display, and audio alert, an email to a pertinent email address or email distribution list, a message to another device or party, or any other appropriate communication method.

In some implementations, when a select idling event is identified, a turn-off instruction can be sent to the vehicle to cause the vehicle ignition to turn off, as discussed later with reference to FIG. 34.

Figure 15:
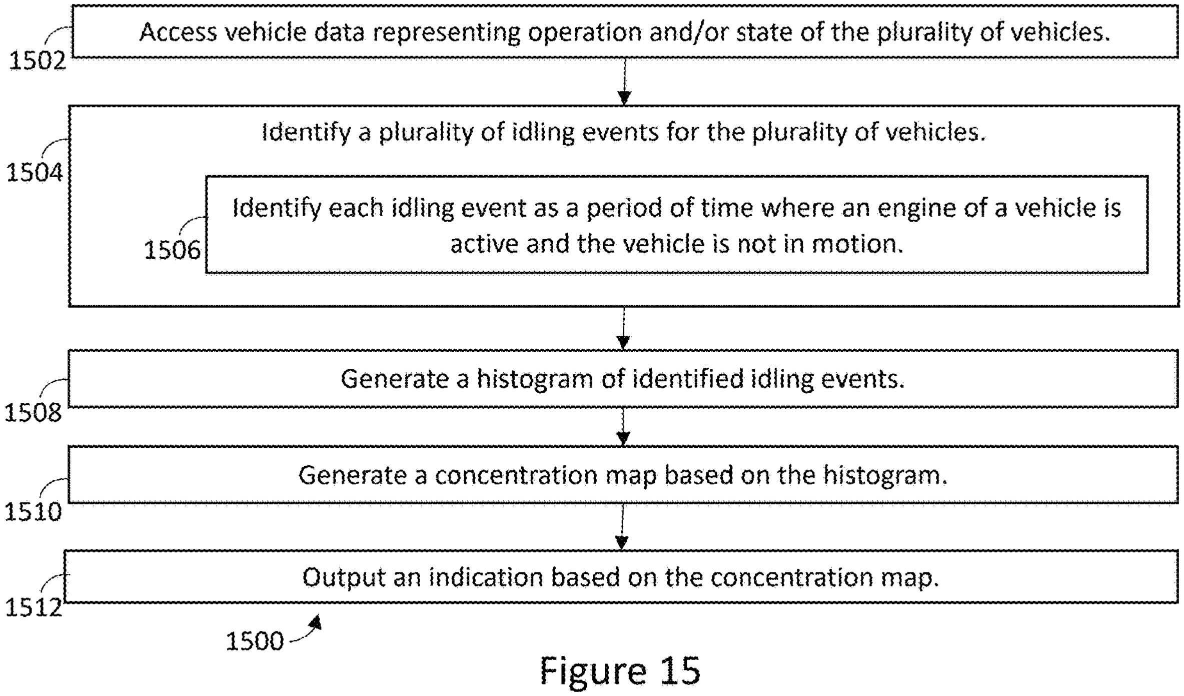
FIG. 15 is a flowchart diagram which illustrates an exemplary method for identifying vehicle idling behaviors.

FIG. 15 illustrates an exemplary method 1500 for identifying vehicle idling behaviors. The method 1500 can be performed by a system such as system 100 or system 200, and its acts can be implemented as processor-executable instructions or data (e.g. a computer program product) stored on at least one non-transitory processor-readable storage medium (e.g. the at least one non-transitory processor-readable storage medium 116, 126, 136, 224, or 296). These instructions, when executed by at least one processor (e.g., at least one processor 114 of management device 110, at least one processor 124 of vehicle device 122, at least one processor 134 of optional device 130, at least one processor 222 of telematics device 204, or at least one processor 294 of peripheral device 290), cause the system to perform the described acts.

At act 1502, vehicle data for a plurality of vehicles is accessed. This vehicle data represents the operation and/or state of the plurality of vehicles. For example, the vehicle data can include telematics data, such as location data, speed data, acceleration data, engine activation data, or ignition data. In some implementations, accessing this data can involve capturing the vehicle data by at least one respective sensor (e.g., a speed sensor, an inertial sensor, an RPM sensor, a fuel level sensor, a fuel consumption sensor, a location sensor, or any other appropriate sensor) at each vehicle of the plurality of vehicles. Such sensors can be integrated within a vehicle, included in a vehicle device, or included in a peripheral device (e.g., vehicle devices 122, telematics device 204, or peripheral device 290) that couples to a vehicle. Example sensors are shown as sensors 214 and 292, but other sensors could be implemented as appropriate. Alternatively, in some implementations to the scope of the method 1500 can exclude the actual capturing of the vehicle data, and instead accessing the vehicle data can involve receiving the vehicle data as captured by at least one sensor, for instance, via a communication interface (e.g., communication interface 212 of telematics device 204) between respective vehicles and vehicle devices, or over a communication interface (e.g., communication interfaces 118 and 128) between vehicles (e.g., vehicles 120) and a server (e.g., management device 110).

At act 1504, at least one processor (e.g., processor 114, processor 124, processor 134, processor 222, and/or processor 294) identifies a plurality of idling events for a plurality of vehicles based on the accessed vehicle data. In some implementations, idling events can be identified by devices at each vehicle (e.g. processors 124, 222, or 294), and detected idling events can be reported to management device 110 and/or optional device 130 (e.g. via communication interfaces 216, 226, 126, 118, and/or 138, as appropriate). In other implementations, idling events can be detected remotely from the vehicle (e.g. at management device 110 or optional device 130) based on the vehicle data as transmitted from vehicles.

Act 1506 is a sub-act of 1504, where each idling event is identified as a period of time where an engine of a respective vehicle is active and the respective vehicle is not in motion. The engine of the vehicle can be identified as active when engine activation data or ignition data (e.g., an ignition status signal or engine signals like RPM or battery voltage curves) indicates the vehicle's ignition is on or engine is in use. The vehicle is identified as not being in motion when operation data (e.g., location data, speed data, or acceleration data) indicates the vehicle's speed is less than a speed threshold. Similar to as discussed earlier, an idling event is specifically identified if this state (engine active, vehicle not in motion) persists for an idling threshold duration, which can be set, for example, between 3 to 120 minutes. The exact idling threshold can be user-configurable, and/or can be preset as an idling rule. This identification can be performed by at least one processor at the vehicle where the idling event occurs (e.g., processor 124, processor 222, or processor 294), with indications transmitted to a management device (e.g., management device 110) for aggregated analysis. Alternatively, the identification of each idling event can be performed by at least one processor at a server separate from the vehicles (e.g., processor 114 of management device 110) based on vehicle data received from the vehicles.

In some implementations, the idling threshold for an idling event to be identified can be variable, and could for example be based on temperature data for an environment where the vehicle is positioned. Such temperature data could be captured by a temperature sensor at the vehicle (e.g. built into the vehicle and communicated to device 204 over port 202, or included in sensor 292 of peripheral device 290). Alternatively, such temperature data could be accessed from a database for a region in which the vehicle is positioned (e.g. from a weather reporting database). The idling threshold can be increased for cold temperatures, to allow a reasonable idling time for vehicles to come to operating temperature. Conversely, the idling threshold can be decreased for high temperatures, since the vehicle will already be closer to operating temperature.

Further, idling threshold can be determined on a per-vehicle basis, based on temperature data specific to each vehicle or specific to an area where the vehicle is positioned.

At act 1508, using the identified idling events, the at least one processor (e.g., processor 114, processor 134, or processor 712) generates a histogram, also referred to as a heatmap. This histogram correlates at least the idling duration and the time of day when the idling events occurred. The identified idling events may be binned into predefined time buckets, such as 15-minute intervals, for this generation. Optionally, the histogram can further correlate the geographical location of the idling events, land-use type, type of geographic zone, vehicle type or vocation, temperature range, or other appropriate aspects.

At act 1510, the at least one processor (e.g., processor 114, processor 134, or processor 712) generates a concentration map based on the histogram. This involves applying a threshold filter to the histogram, where concentrated idling scenarios within the fleet are identified if the number of detected idling events in a particular bucket exceeds a defined concentration threshold. The concentration map may identify groups of idling events and define regions encompassing their edges. A user input via an input device (e.g., keyboard and mouse 724 or a slider interface) can be received to adjust this concentration threshold.

At act 1512, an output device (e.g., a display 722 of operator device 700, or any output device communicatively coupled to management device 110) outputs an indication based on the generated concentration map. This output allows fleet managers to review and understand the most significant forms of idling within their fleet, enabling them to inform and enact targeted policies or management strategies to reduce problematic idling. In some scenarios, the indication can include an indication output to a device at a vehicle, such as to provide a driver with information or an instruction. Exemplary outputs are discussed later with reference to FIGS. 22, 23, 26, 27, 28, 30, 31, and 32.

Figure 16:
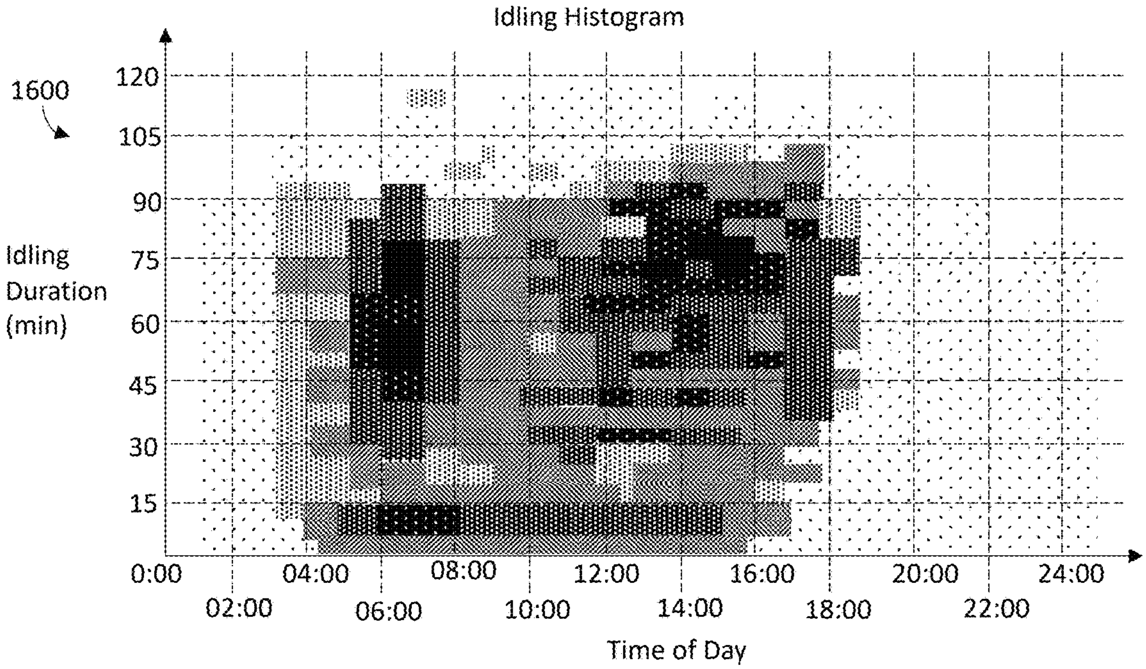
FIG. 16 illustrates an exemplary histogram correlating idling duration and time of day.

FIG. 16 illustrates an exemplary histogram 1600, also referred to as a heatmap. This histogram 1600 is generated from identified idling events, as part of act 1508 of method 1500 for identifying vehicle idling behaviors. Histogram 1600 is a hypothetical illustration which is representative of trends seen in certain real idling event data.

The histogram 1600 correlates at least the idling duration and the time of day when the idling events occurred. Specifically, the vertical axis represents "Idling Duration (min)", ranging from 0 to 120 minutes (in the example), and the horizontal axis represents "Time of Day", spanning a 24-hour period from 0:00 to 24:00 (in the example).

In the illustrated example, identified idling events are binned into buckets based on these two parameters (in other examples, additional parameters can be used, as discussed later). For example, these might be predefined time buckets, such as 15-minute intervals (or any other appropriate interval). The visual representation uses varying shades, where darker regions of the histogram 1600 indicate times of day and idling durations where there are a greater number or higher concentration of detected idling events. This allows a fleet manager to visually identify patterns and trends in idling behaviors across their fleet.

This histogram serves as a foundational step for further analysis, particularly for generating a concentration map (Act 1510) to pinpoint the most significant idling scenarios.

FIGS. 17, 18, 19, 20, and 21 each illustrate the exemplary histogram 1600 from FIG. 16, with a respective region superimposed thereon. These figures collectively demonstrate a process for generating concentration maps as in act 1510 of method 1500 for identifying vehicle idling behaviors.

Recall that histogram 1600 correlates idling duration and time of day. Darker regions within the histogram 1600 indicate times of day and idling durations where there are a greater number or higher concentration of detected idling events. This histogram serves as a basis for pinpointing significant idling scenarios.

The generation of a concentration map in the examples depicted in these figures involves applying a threshold filter to the histogram 1600 to identify concentrated idling scenarios. Specifically, a concentrated scenario is identified if the number of detected idling events in a particular bucket exceeds a defined concentration threshold. In this implementation, this process includes: identifying at least one group of idling events in the histogram of identified idling events, identifying the edges of each group in the at least one group of idling events, and defining the concentration map as including at least one region, where each region encompasses the edges of a respective group.

For each of FIGS. 17-21, a different concentration threshold is utilized for grouping the idling events. In the illustrated examples, the concentration thresholds visually correspond to the different darkness scales of the histogram (though this is not strictly required).

Figure 17:
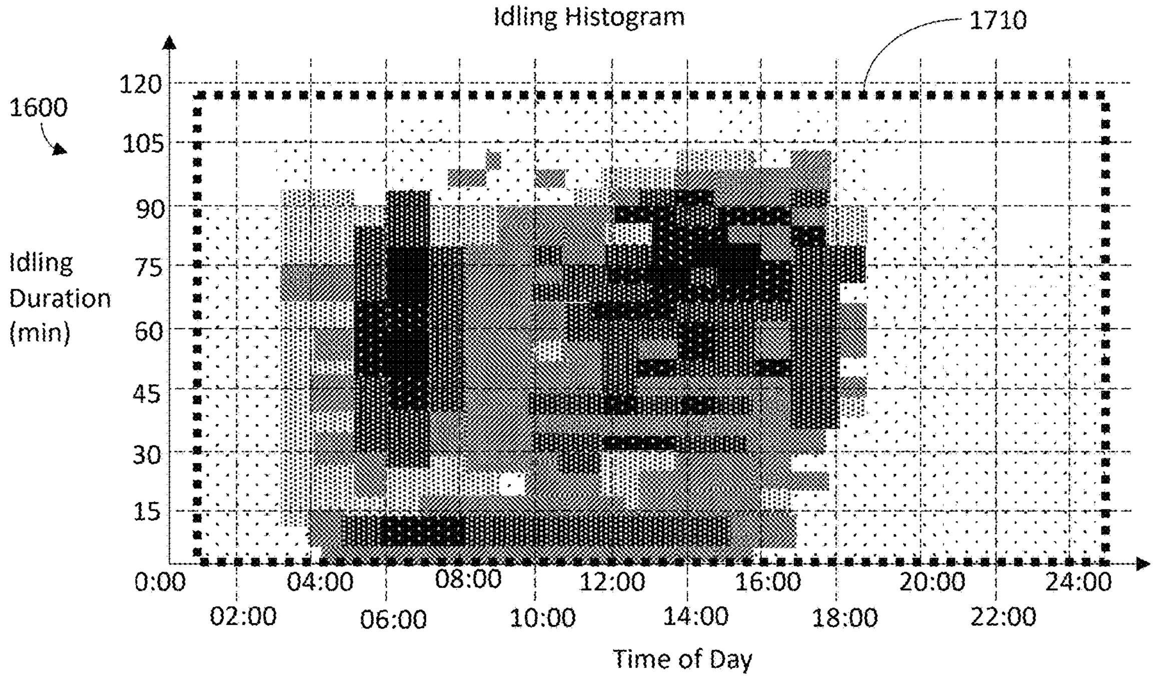
FIGS. 17, 18, 19, 20, and 21 illustrate regions for concentration maps applied to an idling histogram.

FIG. 17 shows the histogram 1600 with a region 1710 superimposed. In this example, the idling events are grouped for any concentration above the lightest color of shading. The boundary of the lightest color of shading is considered the edge of the group, and region 1710 surrounds this edge, highlighting the broadest areas of idling activity. The edges of the group can have an intricate or complicated shape (following the boundary between the lightest shading and no shading in the Figure), but the region 1710 is shown as a rectangle which encompasses these edges. This simplification can make a resulting concentration map more readily understandable and actionable to a fleet manager or user.

Figure 18:
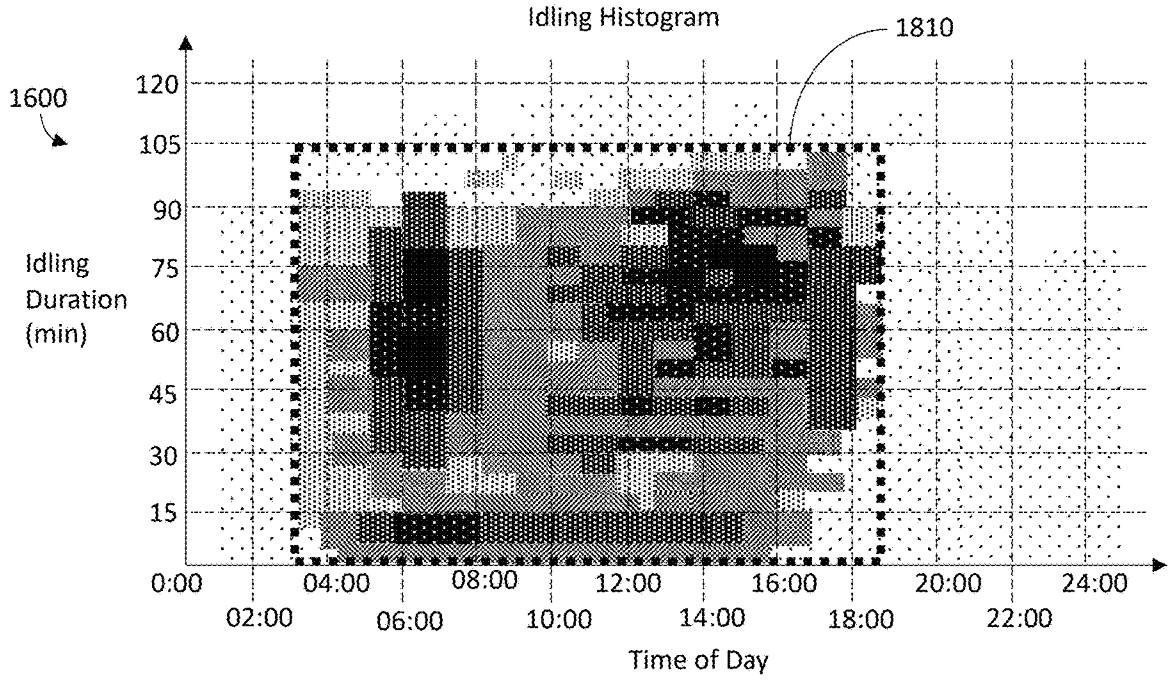

FIG. 18 displays the histogram 1600 with a different region 1810 superimposed. Here, the concentration threshold has been adjusted to be higher, such that grouping is performed for idling event concentrations at the second-lightest shading or darker. This results in a more focused view of areas with a higher density of idling events.

Figure 19:
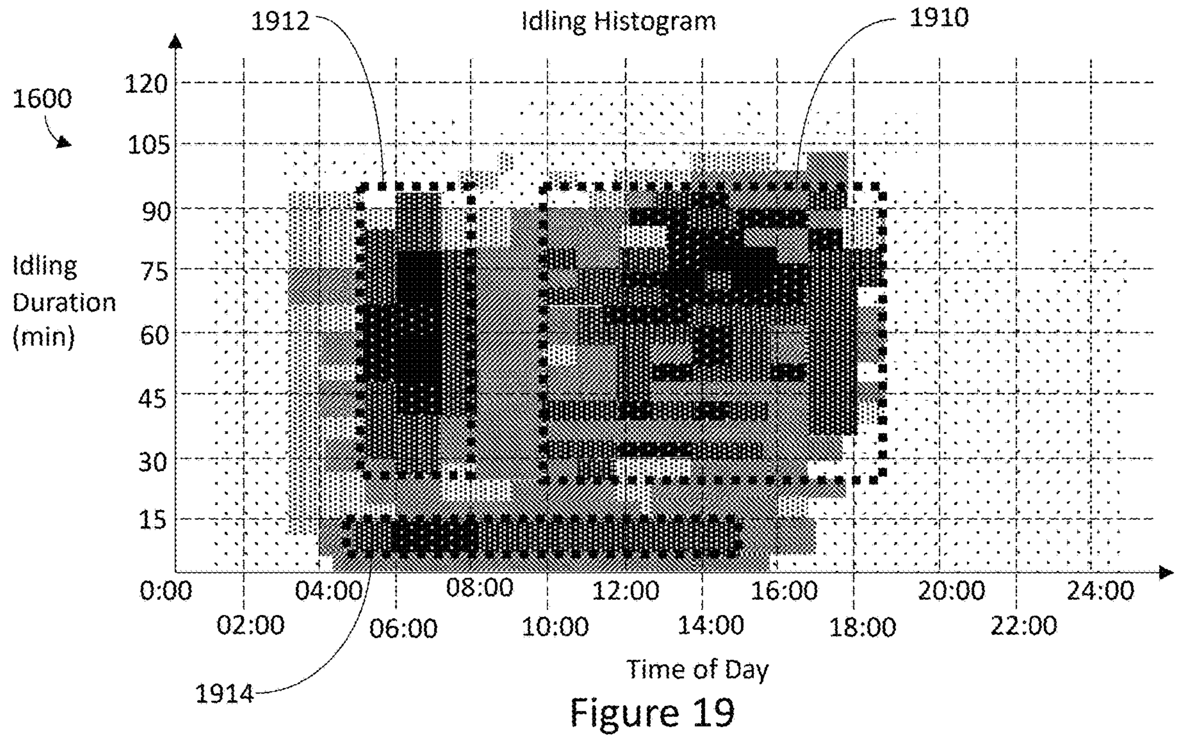
Figure 20:
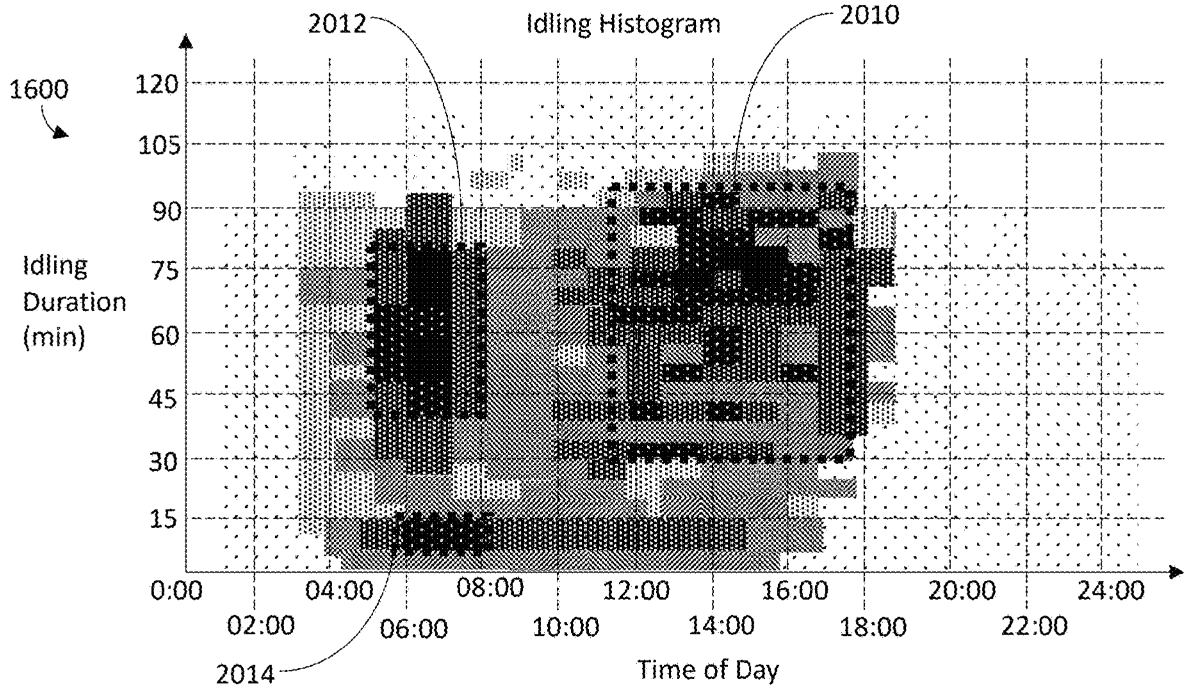
Figure 21:
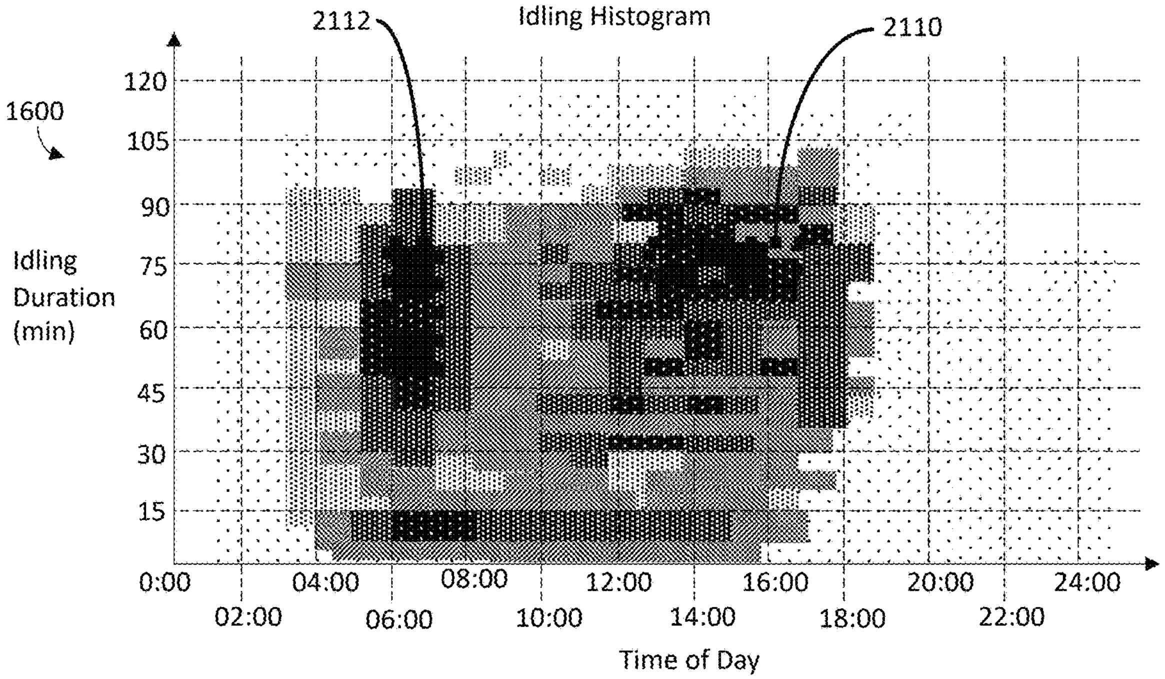

FIGS. 19, 20, and 21 also illustrate the histogram 1600, where respective concentration thresholds are applied, which correspond to increasingly darker shaded regions of the histogram 1600 in the illustrated examples. As the threshold becomes stricter (requiring higher concentrations of idling events), the grouping becomes strict enough that separate and distinct groups of idling events are identified, with corresponding different regions determined for the concentration map.

In particular, FIG. 19 presents multiple regions (1910, 1912, and 1914) superimposed, indicating the identification of several distinct clusters of concentrated idling.

Similarly, FIG. 20 shows additional regions (2010, 2012, and 2014) superimposed, further emphasizing the system's capability to pinpoint various significant, concentrated idling scenarios as the threshold tightens.

Similarly, FIG. 21 displays regions 2110 and 2112 superimposed, delineating other specific, high-concentration idling groups. Some previous groups (e.g. region 2014 in FIG. 20) are excluded from the regions shown in FIG. 21, because the idling events in region 2014 do not meet the strict concentration threshold for FIG. 21.

The visual progression of FIGS. 17-21 demonstrates how adjusting the concentration threshold allows a fleet manager to review and understand the most significant forms of idling within their fleet, enabling them to enact targeted policies to reduce problematic idling. The system can optionally allow for user input via an input device, such as a slider interface, to adjust this concentration threshold, as shown in FIGS. 22, 23, 26, 27, 28, and 29.

In FIGS. 17-21, the concentration thresholds match the different shades shown in the histogram 1600 for convenience, but this is not necessarily the case. In some cases, concentration threshold could be more granular or less granular than different shades shown in a histogram. Further, the shades of a histogram do not necessarily define the exact concentration thresholds; for example concentration threshold could be specified numerically (e.g. idling event density greater than 10 idling events per 15 minutes), with no explicit relationship to how idling densities are shown visually in a histogram.

Figure 22:
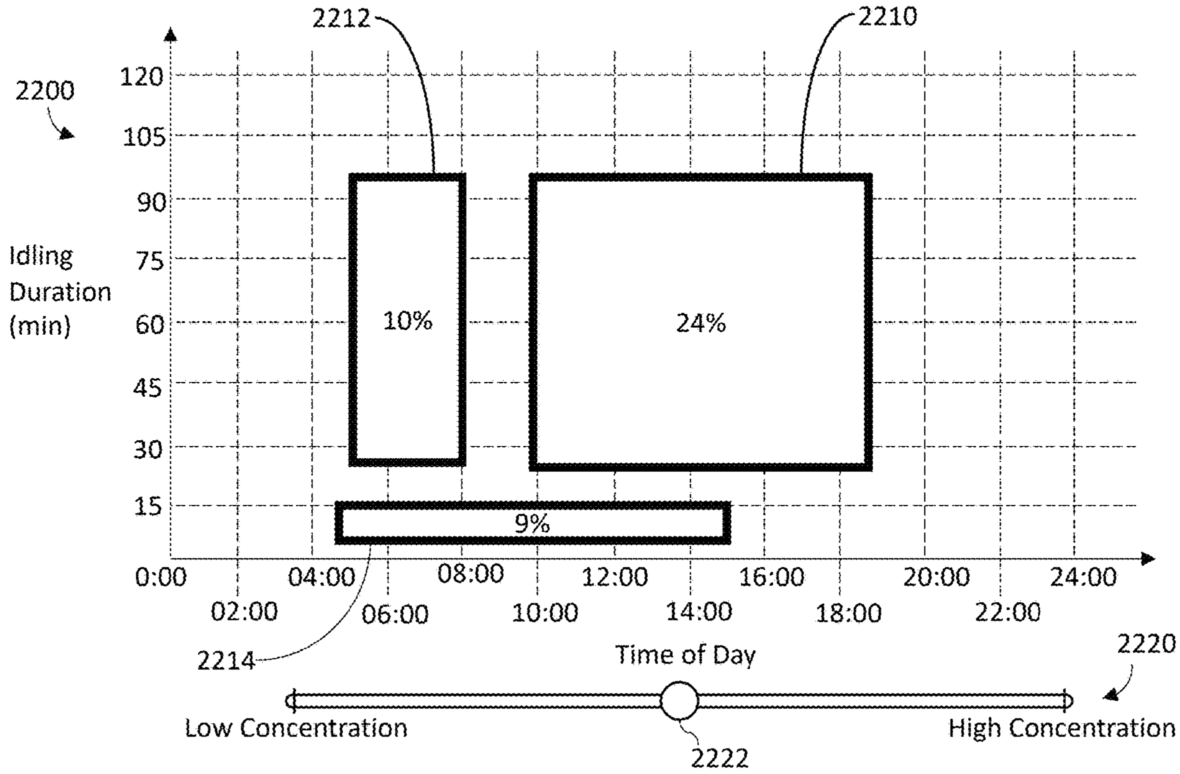
FIGS. 22 and 23 illustrate an exemplary interface for presenting concentration maps to a fleet manager, including an interface to adjust the concentration threshold.
Figure 23:
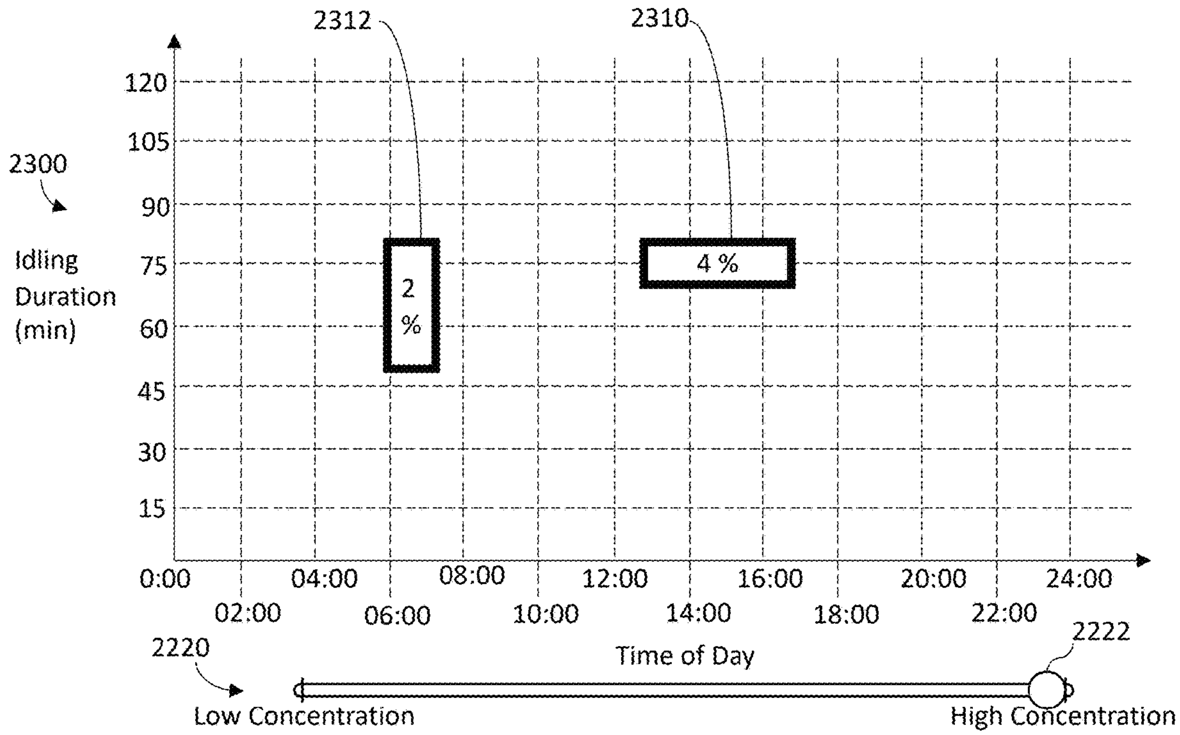

FIGS. 22 and 23 illustrate an exemplary interface for presenting respective concentration maps to a fleet manager or user, where the concentration maps are based on the exemplary histogram 1600 from FIG. 16. The concentration maps can be presented as part of act 1512 of method 1500 for identifying vehicle idling behaviors.

Concentration map 2200 in FIG. 22 corresponds to the example regions shown in FIG. 19. That is, concentration map 2200 in FIG. 22 shows a region 2210 which corresponds to region 1910, a region 2212 which corresponds to region 1912, and a region 2214 which corresponds to region

1914. FIG. 22 does not show the histogram 1600 underlying the regions 2210, 2212, and 2214, because this provides a cleaner user interface. Further, in the exemplary implementation, each region includes a percentage, which indicates the number of idling events represented by the specific region. For example, region 2210 includes the label "24%", which means that 24% of the idling events detected fall within the Idling Duration and Time of Day encompassed by region 2210. Region 2212 includes the label "10%", which means that 10% of the idling events detected fall within the Idling Duration and Time of Day encompassed by region 2212. Region 2214 includes the label "9%", which means that 9% of the idling events detected fall within the Idling Duration and Time of Day encompassed by region 2214. The at least one processor which generates the concentration map can determine the displayed percentages by dividing a number of idling events within a region, by a total number of idling events for the plurality of vehicles (or for a subset of the plurality of vehicles of interest, e.g. vehicles of a certain type or classification), and multiplying the result by 100.

A feature demonstrated by FIGS. 22 and 23 is the inclusion of a slider 2220 with a slider knob 2222. This slider allows the user to adjust the concentration threshold. When the number of detected idling events in a particular bucket of the histogram exceeds this defined concentration threshold, it is identified as a concentrated idling scenario and included in the concentration map. While the illustrated slider is a convenient mechanism for user input, other user input mechanisms for controlling the concentration threshold could also be implemented, as appropriate for a given application.

FIG. 23 demonstrates the effect of moving the slider knob 2222 to a different position, thereby utilizing a stricter (higher) concentration threshold than in FIG. 22. This stricter threshold results in a more refined view, where fewer, but more intensely concentrated, regions are displayed. In particular, regions 2310 and 2312 are displayed, which correspond to regions 2110 and 2112, respectively, in FIG. 21. Region 2310 includes the label "4%", which means that 4% of the idling events detected fall within the Idling Duration and Time of Day encompassed by region 2310. Region 2312 includes the label "2%", which means that 2% of the idling events detected fall within the Idling Duration and Time of Day encompassed by region 2312.

The ability to adjust the concentration threshold is helpful for a fleet manager to hone in more specifically on highly concentrated idling scenarios, or to zoom out for a broader understanding of idling. It enables them to enact targeted policies to reduce problematic idling by focusing on the most significant areas of fuel waste and carbon emissions. In some cases, an overly strict concentration threshold may be so restrictive that the amount of identified idling is low and thus not suitable for making significant changes (e.g. FIG. 23 only captures 6% of idling events). Conversely, a non-strict concentration threshold may not identify meaningful boundaries on which to focus idling reduction efforts (for example, region 1710 in FIG. 17 encompasses virtually the entire day, and virtually all tested idling durations). For this reason, enabling the user or fleet manager to adjust the concentration threshold allows for meaningful insights to be identified in many different scenarios (such as the targeted regions shown in FIG. 22).

In some implementations, histograms and concentration maps can be generated for specific criteria or which correlate idling events to specific criteria. For example, land-use data can be accessed (e.g. from a land-use database) which specifies a zoning type or land-use type for geographic areas. Common land-use types can include commercial, industrial, retail, and residential. When generating a histogram in act 1508 of method 1500, the histogram can be generated based on idling events which match specified criteria (e.g. land-use). That is, the idling events can be filtered based on the criteria, and heatmaps can be generated based on the filtered data.

Figure 24:
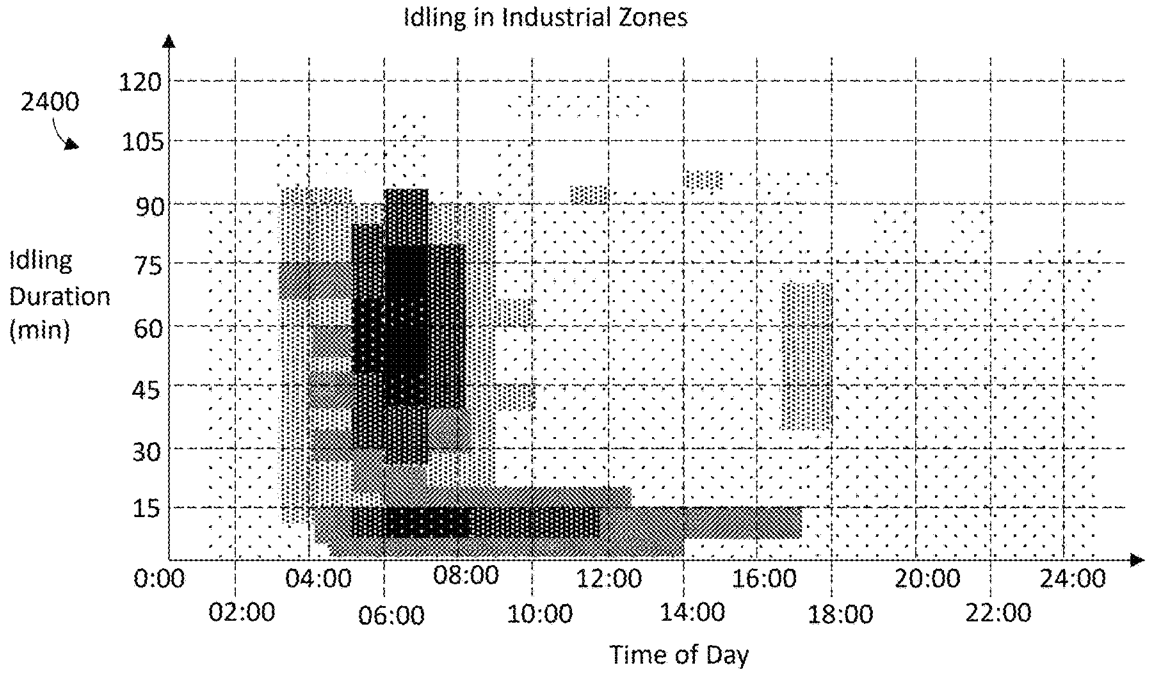
FIGS. 24 and 25 illustrate exemplary histograms generated based on land-use.
Figure 25:
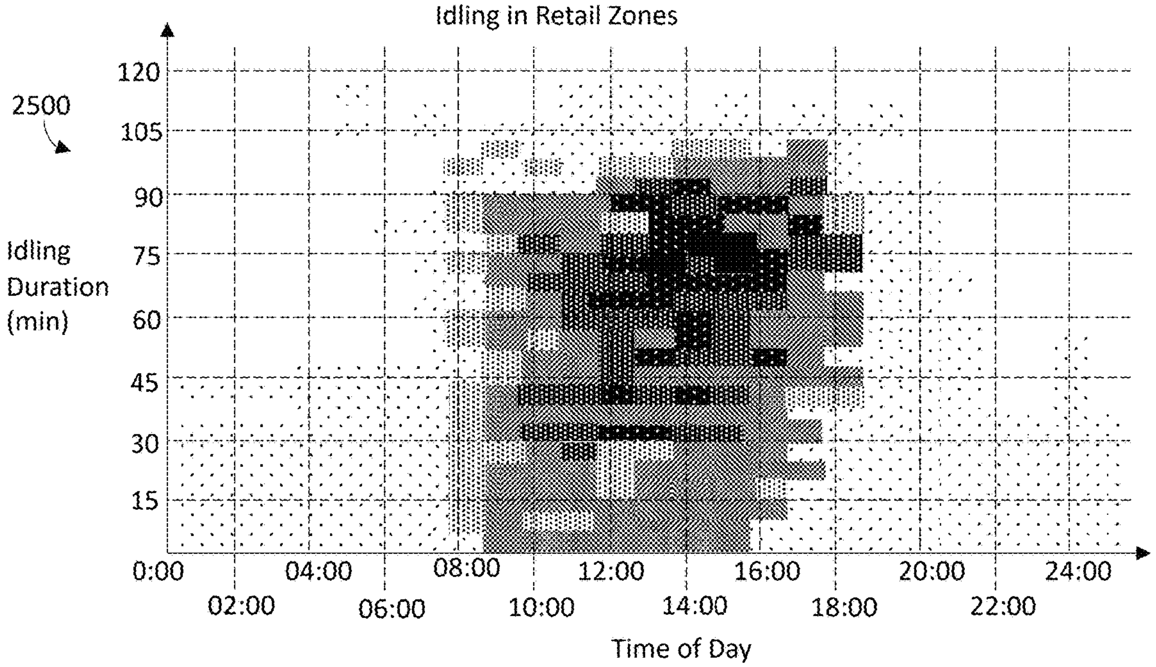

FIGS. 24 and 25 illustrate exemplary histograms generated based on land-use data. In these and similar example, location data (e.g. GPS data) is accessed for each vehicle and correlated to identified idling events. That is, a position of each vehicle is reported for each idling event. These vehicle positions can then be used in generation of heatmaps and concentration maps for specific geographic regions, zones, or areas.

FIG. 24 illustrates an exemplary histogram 2400 of identified idling events, specifically focusing on idling behaviors within "Industrial" land-use zones. This histogram is a specialized instance of the general histogram generation described in act 1508 of method 1500, which can correlate idling events with a respective type of geographic zone or land use. The vertical axis represents "Idling Duration (min)", and the horizontal axis represents "Time of Day". Like other histograms, varying shades within histogram 2400 indicate different concentrations of detected idling events (darker shading indicating higher concentration), allowing for visual identification of patterns and trends in idling behaviors specific to industrial areas. This specialized histogram can serve as a basis for generating a targeted concentration map for industrial zones. In the illustrated example, histogram 2400 is based on the same idling event data upon which histogram 1600 is based, but histogram 2400 is restricted to idling events within "industrial" land-use areas.

FIG. 25 illustrates another exemplary histogram 2500 of identified idling events, focused on idling behaviors within "Retail" land-use zones. Similar to histogram 2400, this histogram is a specialized instance generated as part of act 1508 of method 1500, correlating idling events with a specific type of land use or geographic zone. It presents "Idling Duration (min)" on the vertical axis and "Time of Day" on the horizontal axis, with shading indicating concentrations of idling events within retail environments (darker shading indicating higher concentration). This histogram provides specific insights into idling patterns prevalent in retail areas, useful as a foundation for a corresponding concentration map for retail land-use zones.

Figure 26:
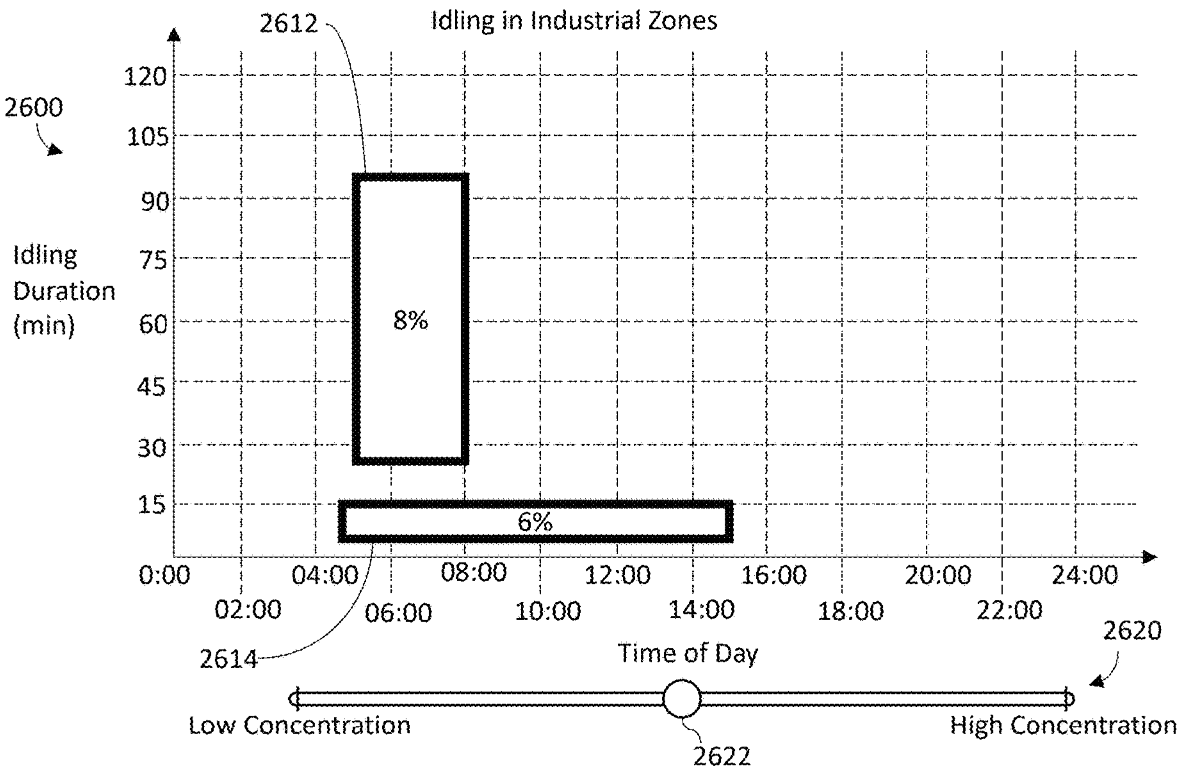
FIGS. 26 and 27 illustrate exemplary concentration maps for specific land-use.

FIG. 26 illustrates an exemplary concentration map 2600 for Idling in Industrial Zones, which can be presented to a fleet manager or user as part of act 1512 of method 1500. This concentration map is generated in act 1510 by the at least one processor (e.g., processor 114, processor 134, or processor 712) based on a histogram of identified idling events. In the illustrated example, concentration map 2600 is generated based on histogram 2400 for idling in industrial land-use zones. Concentration map 2600 identifies concentrated idling scenarios within industrial land-use areas, where the number of detected idling events exceeds a defined concentration threshold. Region 2612 highlights a specific concentrated idling scenario, indicating that 8% of the detected idling events fall within the specified idling duration and time of day encompassed by this region, in industrial zones. Additionally, region 2614 indicates that 6% of idling events fall within its boundaries. The user interface includes a slider 2620 with a slider knob 2622, allowing the user to adjust the concentration threshold as discussed earlier. Adjusting this threshold enables the fleet manager to refine their view, focusing on the most intense idling patterns in industrial zones to enact targeted policies and reduce problematic idling. This directly supports the generation of concentration maps correlated with land-use types and the ability to adjust the concentration threshold via user input.

Figure 27:
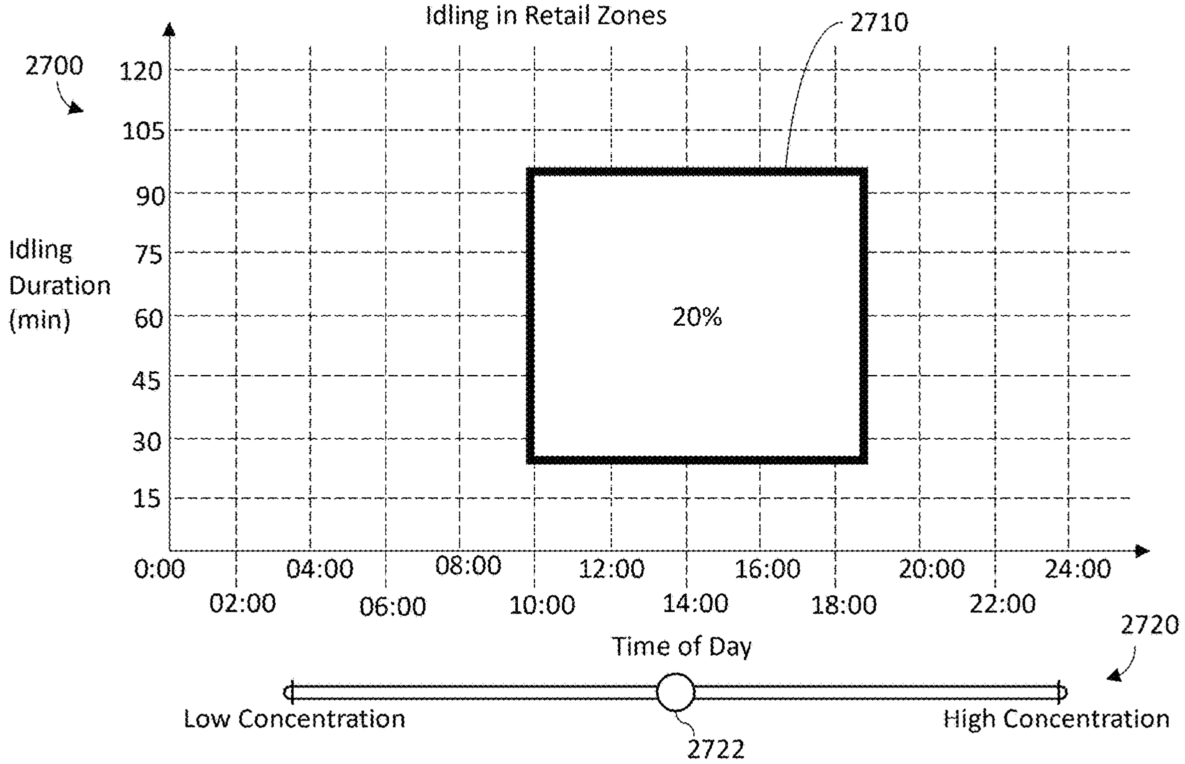

FIG. 27 illustrates an exemplary concentration map 2700 for Idling in Retail Zones, also presentable to a fleet manager or user as part of act 1512 of method 1500. This concentration map 2700 is generated in act 1510 based on idling events identified within retail land-use areas. In the illustrated example, concentration map 2700 is generated based on histogram 2500 for idling in retail land-use zones. Region 2710 identifies a concentrated idling scenario in retail zones, representing 20% of the detected idling events within its specified idling duration and time of day. Similar to FIG. 26, the interface includes a slider 2720 with a slider knob 2722, providing a mechanism for the user to adjust the concentration threshold for retail-specific idling data. This feature helps fleet managers pinpoint significant idling issues in retail areas, facilitating targeted interventions to improve fuel efficiency and reduce emissions.

Figure 28:
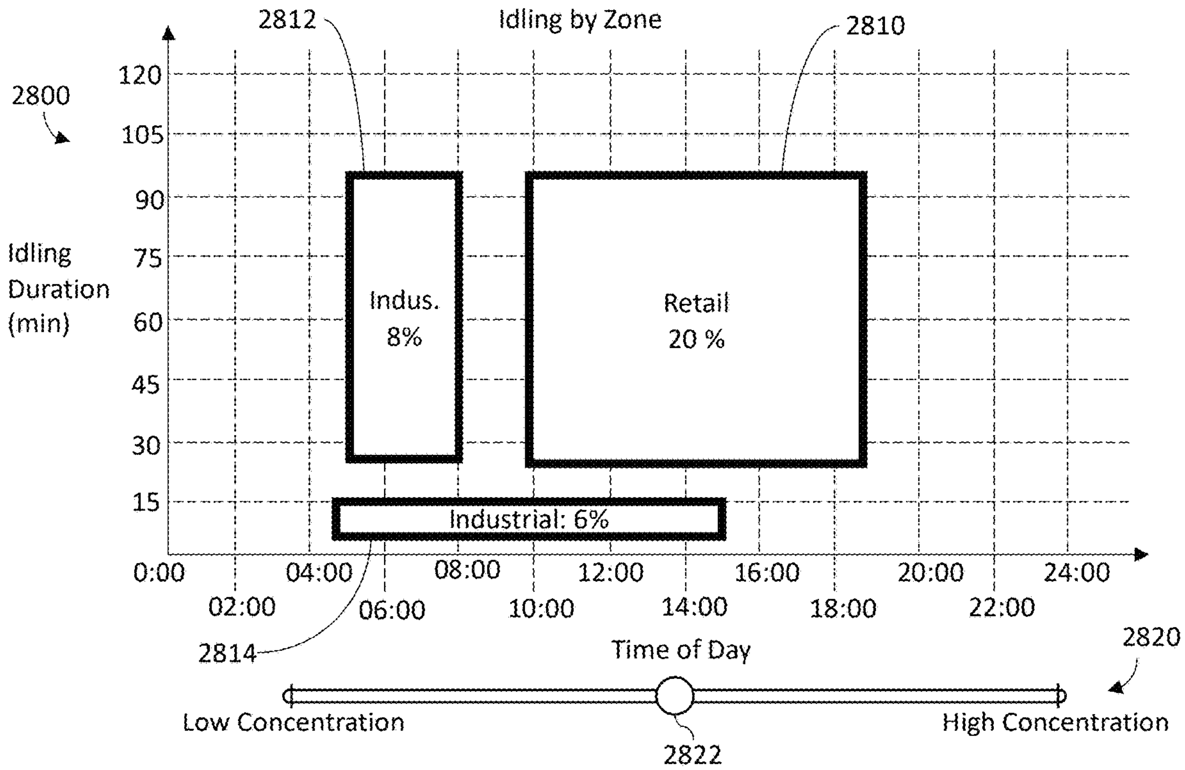
FIG. 28 illustrates an exemplary concentration map showing idling events labeled by land-use.

FIG. 28 illustrates an exemplary concentration map 2800 showing idling events labelled by land-use zone. This map provides an aggregated view of concentrated idling scenarios across different geographic zones or land-use types, presented as part of act 1512 of method 1500. Region 2810 represents concentrated idling in "retail" zones, accounting for 20% of the identified idling events. Region 2812 represents idling in "Industrial" zones, accounting for 8% of idling events, suggesting a concentrated pattern within industrial areas. Region 2814 highlights concentrated idling in "Industrial" zones, making up 6% of idling events. The map includes a slider 2820 and slider knob 2822 for adjusting the overall concentration threshold, allowing fleet managers to analyze and compare significant idling trends across various operational areas. This map demonstrates the system's ability to generate concentration maps that correlate idling events with different types of zones or land use, and present the same via a unified interface.

Land-use based information such as in FIGS. 24-28 (or more broadly, any specific criteria for idling events) enables a fleet manager to take even more specific action or enact targeted policies (e.g. focused on certain types of facility).

FIGS. 24-28 are generally directed towards correlating idling events with land-use type where the idling events occur. But this concept can be broadened to any form of geographical delineation. In an example, a particular fleet can have defined "zones" of any appropriate type, and idling events can be classified according to these zones. For example, in FIG. 8 a truck 890 goes on a journey, making stops in regions 810, 820, 830, and 840, as discussed earlier. In the example, regions 810 and 840 are respective warehouses, and can be classified as "warehouse" zones. Further, region 820 is a truck stop, and can be classified as a "rest" zone or similar. Further still region 830 is a gas station, and can be classified as a "service" zone or similar. These zones and classifications are merely exemplary, and can be modified as appropriate for a given application.

With reference to the above example, instead of (or in some cases in addition to) land-use criteria, idling events can be correlated to different zone types.

Zones and classifications can be defined in any appropriate manner. In some cases, a user or plurality of users may manually define zones, for example by defining zone boundaries and inputting zone labels on a map. In some cases, zones can be automatically defined (e.g. a location where many fleet vehicles commonly return to and park at for extended periods of time may be automatically identified as a "warehouse" zone).

Figure 29:
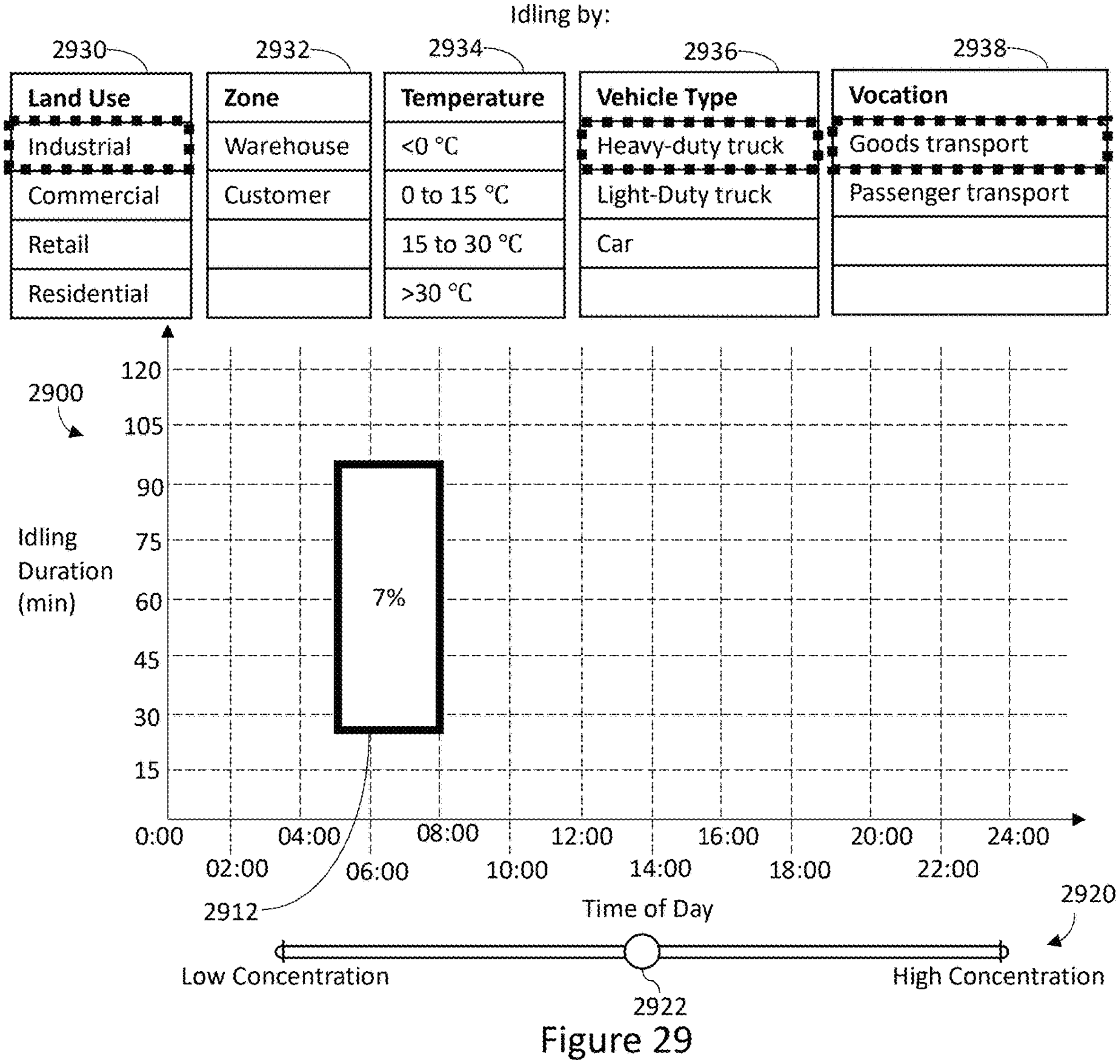
FIG. 29 illustrates an exemplary customizable concentration map based on various selectable criteria.

FIG. 29 illustrates an exemplary concentration map 2900 that allows for highly customizable analysis of idling behaviors based on various criteria, as presented in accordance with act 1512 of method 1500. A slider 2920 with a slider knob 2922 enables the user to adjust the concentration threshold, as discussed earlier. The interface of FIG. 29 illustrates an exemplary set of criteria that allow for segmenting idling event data. Each criteria field 2930, 2932, 2934, 2936, and 2938 can be user-selectable, with the concentration map 2900 being adjusted according to the selected criteria. The illustrated criteria are merely exemplary. More, fewer, and/or other criteria could be included as appropriate for a given application. Any appropriate combination of criteria could be displayed and/or selected.

FIG. 29 shows land-use criteria 2930, where a user can select Industrial, Commercial, Retail, or Residential.

FIG. 29 also shows zone criteria 2932, which can include any appropriate type of zone (e.g. the fleet-defined zones discussed earlier). In the illustrated example, the available zones are Warehouse and Customer (e.g. drop off zones for shipments to customers), but other zones could be included as appropriate for a given application.

FIG. 29 also shows temperature criteria 2934. In the example, the temperature criteria are broken down into selectable ranges: <0° C., 0 to 15° C., 15 to 30° C., and >30° C. However, alternate ranges, or alternate selections mechanisms are possible (e.g. a temperature dial or slider with a range window), as appropriate for a given application.

FIG. 29 also shows vehicle type criteria 2936, which includes Heavy-duty truck, Light-Duty truck, and Car in the illustrated example. Other or different vehicle types could be included as appropriate for a given application.

FIG. 29 also shows a vocation criteria 2938, which includes Goods transport and Passenger transport in the illustrated example. Other or different vocations could be included as appropriate for a given application.

Selection of different criteria as in FIG. 29 enables the generation of multiple histograms and concentration maps correlating idling events with the specific criteria, providing granular insights for targeted interventions. While FIG. 29 only illustrates the concentration map to reduce clutter, the selected criteria can be applied in generation of an underlying histogram, which carries through to a concentration map generated based on the histogram in accordance with method 1500. In the example of FIG. 29, not every criteria field includes a particular selection (i.e. no selection is made for zone 2932 or temperature 2934). For the fields where a particular criteria is not selected, the exemplary concentration map is not restricted by such criteria. In the example of FIG. 29, industrial land-use is selected at 2930, Heavy-Duty truck is selected at 2936, and Goods transport is select at 2938. A resulting concentration map 2900 is shown which includes an exemplary region 2912, showing a concentrated idling scenario that accounts for 7% of identified idling events. In the particular example, region 2912 represents idling events between 20-95 minutes in duration between 5:00 and 8:00, in industrial land-use areas, by heavy-duty trucks, used for goods transport. Concentration map 2900 and region 2912 illustrate one possible example; in other examples any other appropriate combination of criteria could be selected, resulting in any appropriately dimensioned region in the concentration map.

Data for the various criteria shown in FIG. 29 can be accessed from any appropriate sensor or database. For example, land-use data can be accessed from a land-use database as discussed earlier. As another example, zone data (e.g. data representing fleet-specific or user-defined zones) can be accessed from a zone database. Vehicle type or vocation data can be accessed from a vehicle database, and/or included as metadata with the vehicle data accessed at 1510.

As yet another example, temperature data representing an outside temperature of an environment for each vehicle can be captured by a respective temperature sensor at each vehicle. That is, a temperature sensor can be positioned at each vehicle which collects outside temperature for an environment of the vehicle. Such a temperature sensor can be built into the vehicle with temperature data communicated over port 202, or could be implemented as sensor 292 of peripheral device 290, for subsequent communication over communication interface 226.

As yet another example, vehicle type data and/or vehicle vocation data can be accessed from a vehicle database. Such a database could include a database of vehicle attributes, which can be populated when new vehicles are initialized into the fleet, or serviced or reconfigured. In some implementations, vehicle type and/or vehicle vocation can be determined automatically, such as described in U.S. Pat. No. 10,928,277, the entirety of which is incorporated by reference herein.

Based on a concentration map generated as shown in FIG. 29, a fleet manager can implement highly specific actions. As one example, the fleet manager can enact targeted idling reduction policies specifically focused on mornings in industrial zones. In the particular example, the fleet manager could implement a policy for turning of vehicle engines while being loaded with goods in the morning (since the identified idling events correspond to events in industrial areas, for heavy-duty trucks, used for goods transport).

Based on particular concentration maps, a fleet manager can also choose to be lenient for certain types of idling. For example, if a significant portion of idling events are under ten minutes long when the temperature is below 0° C., these idling events may be deemed as acceptable, because they likely correspond to cases where a driver is idling their vehicle to bring the vehicle temperature up to operating temperature.

Figure 30:
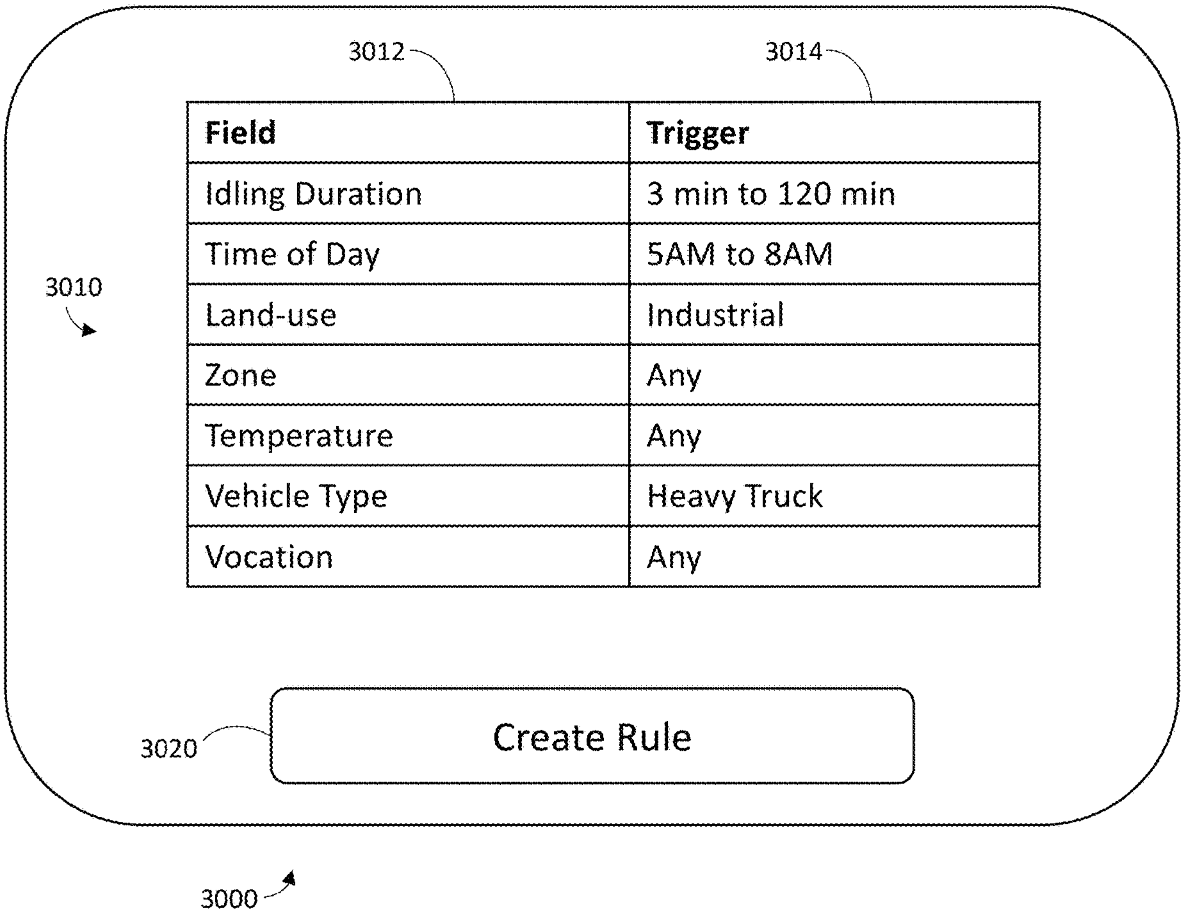
FIG. 30 illustrates an exemplary user interface for manually defining a rule or trigger condition for detecting idling exceptions.

FIG. 30 illustrates an exemplary user interface 3000 through which a fleet manager or user can define a rule or trigger condition for identifying specific idling events as exceptions. This user interface 3000 supports the system's ability to facilitate actionable steps to reduce problematic idling.

The user interface 3000 features a table 3010 which includes at least two columns: column 3012, labeled "Field," and column 3014, labeled "Trigger". This table allows the user to specify various criteria that, when met by a vehicle's operation, will trigger an exception. The fields presented in column 3012 represent different parameters of an idling event that can be used to define a rule, such as those discussed previously with reference to FIG. 29:

Idling Duration: This allows setting a specific duration range for an idling event (e.g., "3 min to 120 min").

Time of Day: This enables defining a time window during which the rule applies (e.g., "5 AM to 8 AM").

Land-use: This can specify the type of land-use zone where the idling occurs (e.g., "Industrial").

Zone: This allows for rules based on predefined geographic zones (e.g., fleet-defined zones like "Warehouse" or "Customer").

Temperature: This permits setting temperature ranges (e.g., ranges like "<0° C.").

Vehicle Type: Rules can be tailored to specific vehicle types (e.g., "Heavy Truck").

Vocation: This allows for criteria based on the vehicle's operational vocation (e.g., "Goods transport").

In defining a rule or trigger condition, various fields can be omitted or set as "any", meaning that said field is not a requirement for the trigger condition (e.g. a temperature of "any" means that the trigger condition can be satisfied for idling events at any temperature).

The corresponding entries in column 3014 ("Trigger") specify the precise conditions for each selected field. For example, as shown in FIG. 30, a rule can be defined for "Idling Duration 3 min to 120 min", "Time of Day 5 AM to 8 AM", "Land-use Industrial", and "Vehicle Type Heavy Truck". In alternative examples, any appropriate combination of conditions can be set for any appropriate fields.

Once the desired criteria are set in the table 3010, the user can activate the rule by selecting the "Create Rule" button 3020. This action defines a trigger condition based on the concentration map. Such rules can be manually defined by a fleet manager after reviewing the insights provided by concentration maps. Alternatively, these trigger conditions can also be automatically defined based on identified concentrated idling scenarios. For example, based on the settings in an interface shown in FIG. 29, Fields 3012 and triggers 3014 can be auto-filled. That is, each selected criteria in FIG. 29 (or similar), and/or the idling duration and idling time of day shown in concentration map 2900 (or similar) can be used to generate a rule for the interface shown in FIG. 30. As another example, fields can be automatically determined by the at least on processor for time periods and idling durations where number of idling events exceeds a defined concentration threshold (as a non-limiting example, a rule or trigger condition could be auto-generated based on regions 1710, 1810, 1910, 1912, 1914, 2010, 2012, 2014, 2110, or 2112 discussed previously). Alternatively, in some implementations interface 3000 can be omitted, and a rule can be created automatically based on a concentration map interface such as shown in FIG. 29.

When a driver's vehicle operation subsequently meets the criteria defined by such a rule or trigger condition, an "exception" is detected by the telematics system. For example, for each detected idling event, at least one processor of the telematics system (e.g. any of processors 114, 134, 124, 222, or 294) can determine whether the idling event satisfies the particular criteria specified in any defined rule or trigger condition.

Detected exceptions can then be utilized in several ways to manage and reduce preventable idling:

Notifications: The system can transmit a notification to a device accessible to the driver (e.g., their smartphone or the vehicle's infotainment system), informing them of the exception or instructing them to turn off the engine. Fuel consumption or other information could also be presented. An example is shown in FIG. 14 discussed earlier.

Driver Analysis, Coaching, or Incentive Systems: Detected exceptions can be fed into a driver analysis, coaching, or incentive pipeline. This enables flagging drivers with many exceptions for coaching or penalization, while drivers with few exceptions or significant improvement can be incentivized with rewards (e.g., monetary rewards, coupons, extra time off). Examples are discussed later with reference to FIGS. 31, 32, and 33.

Automatic Vehicle Turn-Off: In situations where it is safe and the vehicle hardware supports it, the telematics system could issue a "turn-off" instruction to an idling vehicle to automatically turn it off when its operation meets the criteria defined by the trigger condition. An example is discussed later with reference to FIG. 34.

This mechanism allows fleet managers to implement automatic remedial actions to address the most significant idling trends identified within their specific fleet's operational data. For instance, if analysis reveals significant idling by heavy-duty trucks in industrial areas during morning hours for goods transport, a rule can be set to specifically address such scenarios. Such a rule can automatically direct behaviors to reduce excessive idling. Conversely, the system also allows for leniency, enabling managers to define acceptable idling based on conditions like low temperatures, where idling might be necessary for vehicle warm-up.

FIGS. 31 and 32 illustrate exemplary interfaces for driver analysis and rewards. While discussed with reference to exceptions identified in the context of method 1500, the implementations of FIGS. 31 and 32 are also fully applicable to select idling events identified in the context of method 300 discussed earlier (e.g. similar points systems, credits system, or other rewards or analysis systems can be implemented for identified select idling events).

FIG. 31 illustrates an exemplary table 3100 within a user interface, providing a driver analysis system where drivers are assigned point values indicative of their performance. The table 3100 can be presented for example to a fleet manager or other user via a user interface. Performance can be scored across many categories (e.g. safe driving etc.) in addition to idling events, or performance can be scored specifically with respect to idling events. This system forms part of the broader functionality to facilitate actionable steps to reduce problematic idling, moving beyond analytical insights by directly influencing driver behavior.

The table 3100 includes several columns designed to provide a comprehensive overview of driver performance:

Column 3110, "Vehicle," lists vehicle identifiers (e.g., license plate numbers represented as "XXX-XXX," "YYY-YYY," "ZZZ-ZZZ").

Column 3120, "Driver," lists driver identifiers (e.g., names "John Smith," "Jane Doe," "Gary Bear", but could be other identifiers such as employee number or driver's license number), with each driver associated with a corresponding vehicle. The association between drivers and vehicles for each select idling event can be determined by various means, such as driver identification devices in vehicles (e.g. NFC or tap cards), maintained schedules at a server, or vehicle check-out procedures.

Column 3130, "Idling Exceptions," quantifies the number of "select idling events" or "exceptions" detected for each driver/vehicle. As discussed with reference to FIG. 30, an "exception" is detected when a driver's vehicle operation meets the criteria defined by a trigger condition or rule.

Column 3140, "Preventable Fuel Consumption," indicates the accumulated preventable fuel consumption associated with each driver's idling exceptions. This preventable fuel consumption is determined for idling events or portions of idling events that are outside of the acceptability criteria.

Column 3150, "Preventable Emissions ($CO_2$)," shows the accumulated preventable carbon emissions for each driver. This can be derived from the preventable fuel consumption by applying a carbon emissions factor.

FIG. 31 includes columns 3160, "Score Modifier (Points)," and 3170, "Total Score (Points)," which implement a scoring system for driver performance. This system allows for inputting driver performance against detected exceptions into a driver analysis, coaching, or incentive system. Specifically:

A score is allocated for each driver. The score is decreased in the presence of detected exceptions, as exemplified by "John Smith" who has 16 idling exceptions and receives a "−11" score modifier, leading to a "−35" total score. This reflects a penalization for frequent problematic idling.

The score is increased in the absence of detected exceptions, as shown by "Gary Bear" who has 0 idling exceptions and receives a "+5" score modifier, resulting in a "+45" total score. This incentivizes good behavior.

Some allowance can be incorporated for idling, such that driver are rewarded when they have a low idling amount (not necessarily). For instance, "Jane Doe" has 3 idling exceptions but receives a "+2" score modifier, indicating potential improvement or a more acceptable level of idling compared to thresholds, leading to a "+14" total score.

In the example, points are allocated based on number of idling exceptions. In alternative examples, points could be allocated based on preventable fuel consumption and or preventable emissions due to idling. Such a system would apply higher weight to fewer, longer idling exceptions.

In some implementations, a score could be allocated to reflect driver behaviour over time. For example, a previously problematic driver (with a low total score) could be assigned more points for a reduction in idling events over time (relative to their history), to reward positive improvement.

This scoring system can be used to allocate a reward to at least one driver based on their score. Drivers with many exceptions could be flagged for coaching or penalization, while drivers with few exceptions or significant improvement in exception count over time could be incentivized with rewards such as monetary rewards, coupons, or extra time off. This provides fleet managers with a tangible tool to manage and encourage efficient driving practices within their fleet, directly addressing wasteful idling behavior.

FIG. 32 illustrates an exemplary table 3200 within a user interface similar to as discussed with reference to FIG. 31, representing a driver analysis system that focuses on positive reinforcement by providing "credits" to users with low idling exceptions. This system is a part of the broader functionality designed to facilitate actionable steps to reduce problematic idling, influencing driver behavior through incentives.

The table 3200 features several columns providing an overview of driver performance:

Columns 3210, 3220, 3230, 3240, and 3250 are similar to columns 3110, 3120, 3130, 3140, and 3150, respectively. Descriptions of the columns in FIG. 31 are fully applicable to the similar columns in FIG. 32, and are not repeated for brevity.

Column 3260, "Reward (Credits)" demonstrates the allocation of a reward, such as credits, to drivers based on their performance. This is particularly evident for drivers with low or zero idling exceptions:

"Gary Bear," with 0 idling exceptions, receives "+10" credits, indicating a reward for excellent performance.

"Jane Doe," with 3 idling exceptions, receives "+5" credits, indicating a reward for maintaining a low number of exceptions or showing improvement over time.

"John Smith," with 16 idling exceptions, receives "0" credits, indicating no reward due to a higher number of exceptions.

This system directly supports the concept of inputting driver performance of detected exceptions into a driver analysis, coaching, or incentive system. The credits provided can be exchangeable for various rewards (e.g., monetary rewards, coupons, extra time off), which can be redeemed, for instance, via an online shop or similar mechanism. This approach incentivizes desirable driver behavior by providing tangible benefits for efficient operation and reduced unnecessary idling. By emphasizing rewards, fleet managers are provided with a tool to foster a positive culture around fuel efficiency and environmental responsibility within their fleet.

Figure 33:
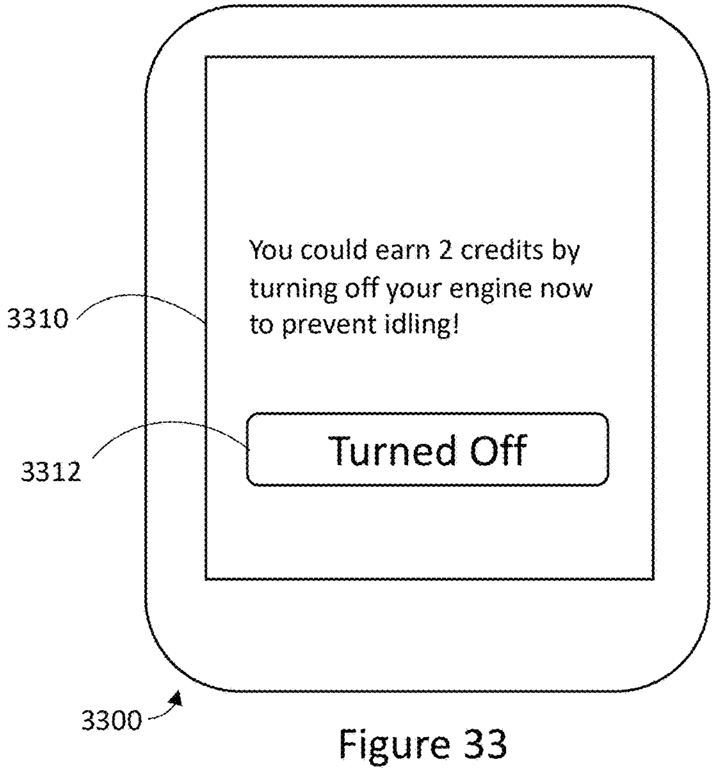
FIG. 33 illustrates an exemplary device displaying a notification of incentives.

In some implementations, drivers can be prompted directly to turn off their engine (like in FIG. 14 discussed earlier), with an incentive or other reward. In this regard, FIG. 33 shows a device 3300, which includes a display 3310. In the example of FIG. 33, an alert can be received by the device 3300 which could be sent in response to an idling event or exception identified for example as discussed with reference to FIG. 30. Display 3310 presents an incentive to the driver (an offer of 2 credits) to turn off the engine promptly. Based on this information, the driver can turn off the engine, thereby avoiding additional fuel consumption and emissions that would have been incurred absent the notification.

In the illustrated implementation, a button 3312 is shown on display 3312 which the driver can press, indicating that they have turned off the engine. A message can be transmitted from the vehicle (e.g. via communication interface 128 of 226) to the management server 110 or optional device 130 (via communication interfaces 118 or 138) indicating that the engine has been shut off, and the driver is allocated the promised reward (2 credits in the example).

The above system uses the "honor system", whereby drivers are trusted to actually turn off the vehicle when they click button 3312. This will commonly be sufficient, as most drivers will choose to act honestly to receive the promised reward.

In alternative implementations, for greater certainty vehicle data could be used to determine whether the vehicle is actually turned off (either in addition to button 3312, or instead of using button 3312). In particular, vehicle data is captured at the vehicle by devices 122, 204 or 290 as discussed earlier, and can be assessed (either at any of these devices at the vehicle or at management device 110 or optional device 130) to determine whether the vehicle engine is active or not. When the vehicle engine is determined to not be active, the reward is issued.

In the example of FIG. 33, the notification may be presented to the driver at a threshold lower than what would otherwise be deemed an idling "exception" as discussed earlier. For example, if the threshold for identifying an idling event as an exception is 3 minutes, the notification could be sent at two minutes. This allows the driver an opportunity to act and receive rewards prior to an excessive idling event being identified.

Figure 34:
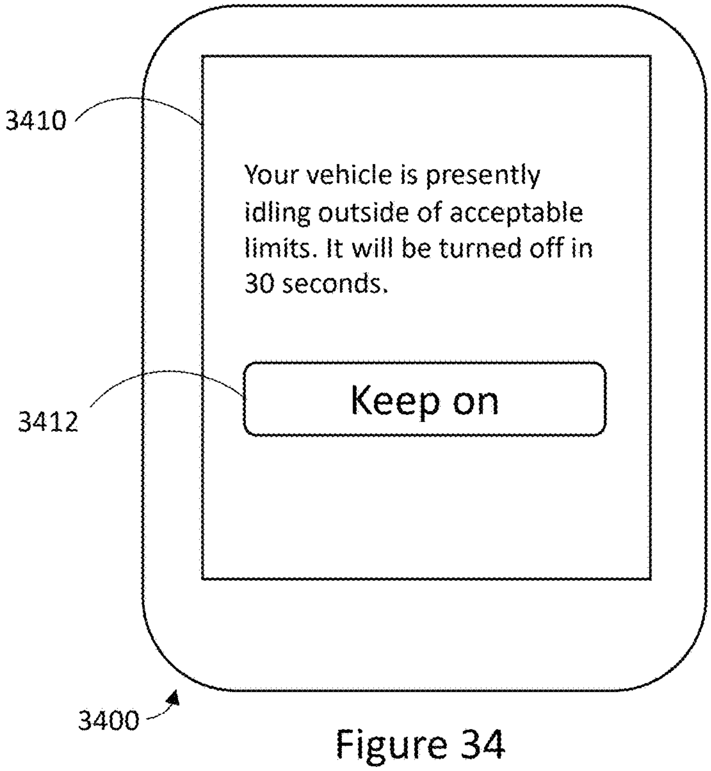
FIG. 34 illustrates an exemplary device displaying a notification for automatic vehicle turn-off.

FIG. 34 illustrates an exemplary device 3400 (e.g. a personal device such as a smartphone of the driver, or a device positioned at a vehicle such as an infotainment device) displaying a user interface on its display 3410, presenting a notification or instruction related to automatic vehicle turn-off when idling outside acceptable limits. This feature is one means to facilitate actionable steps to reduce problematic idling.

For example, when an idling exception is detected (e.g. at management device 110 or optional device 130), a turn-off instruction can be transmitted to the idling vehicle (e.g. via communication interfaces 118, 128, 226, and/or 138). An "exception" is detected when a vehicle's operation meets specific criteria defined by a trigger condition, such as described previously with reference to FIG. 30. These trigger conditions can be manually defined by a fleet manager or automatically generated. Where safe and possible, the vehicle ignition can deactivated in response to receiving the turn-off instruction.

In this context, "safe" refers to a situation where deactivating the vehicle will not cause harm or damage, or otherwise impede an environment of the vehicle. For example, prior to deactivating the vehicle, accelerometer data, speed data, or position data for the vehicle can be accessed to ensure that the vehicle has not started moving. As another example, prior to deactivating the vehicle, a position of the vehicle can be compared to a zone or geographic region classification, the determine that the vehicle is in an acceptable location to turn off (e.g. in a parking lot).

In this context, "possible" refers to the vehicle supporting remote ignition control (i.e. the ability for the vehicle to receive ignition and/or turn-off instructions and act accordingly. In some cases this functionality is natively built into a vehicle. In other cases a retrofit device can be installed which enables or disables ignition signals in response to remote instructions.

In FIG. 34, in addition to (or prior to) sending the turn-off instruction, an optional notification is provided to a device 3400 accessible to the user (e.g. a user's smartphone or personal device, or an infotainment system or other device installed at the vehicle). Display 3410 of device 3400 shows a message presented to the driver indicating that the vehicle is "presently idling outside of acceptable limits" and will be "turned off in 30 seconds". This provides a warning for the driver prior to turning off the vehicle.

In some implementations, the notification is a dedicated notification transmitted by a communication interface of a central device (e.g. communication interfaces 118 or 138 of management device 110 or optional device 130) to the device 3400 in response to a detected exception. That is, in some implementations the notification is an additional or separate message from the turn-off instruction. In other implementations, the turn-off instruction is sent to the vehicle, which in turn presents the interface of FIG. 34 to the user prior to acting on the turn-off instruction.

In the example of FIG. 34, the user interface includes an optional "Keep on" button 3412. This button allows the driver to override the automatic turn-off instruction if there is a legitimate reason for the vehicle to continue idling. The "Keep on" button 3412 may lead to, or be associated with, and input field where a driver can input a reason for the idling. A legitimate reason for idling could result in the idling event being removed from consideration as an "excessive" idling event, and thus removed from driver behavior analysis which would reflect negatively on the driver.

In some implementations, the turn-off instruction can be sent promptly in response to an idling event being detected which exceeds a rule or trigger condition. In other implementations, the turn-off instruction may be sent only where the idling event is in particular excess of the rule or trigger condition. For example, if a trigger condition is established which identifies an exception when an idling event is over 3 minutes in duration, this may not result in a turn-off instruction being sent immediately. A prompt to the driver, such as shown in FIG. 14, could first be sent to give the driver an opportunity to turn off the engine themselves. If the driver fails to turn off the engine (or start moving) for a period of time, the turn-off instruction can be sent (e.g. after 10 minutes of idling). This can be useful for handling scenarios where the driver has become unavailable after turning on the vehicle (e.g. they were pulled away for another task, are distracted, or are no longer in the vehicle).

Figure 35:
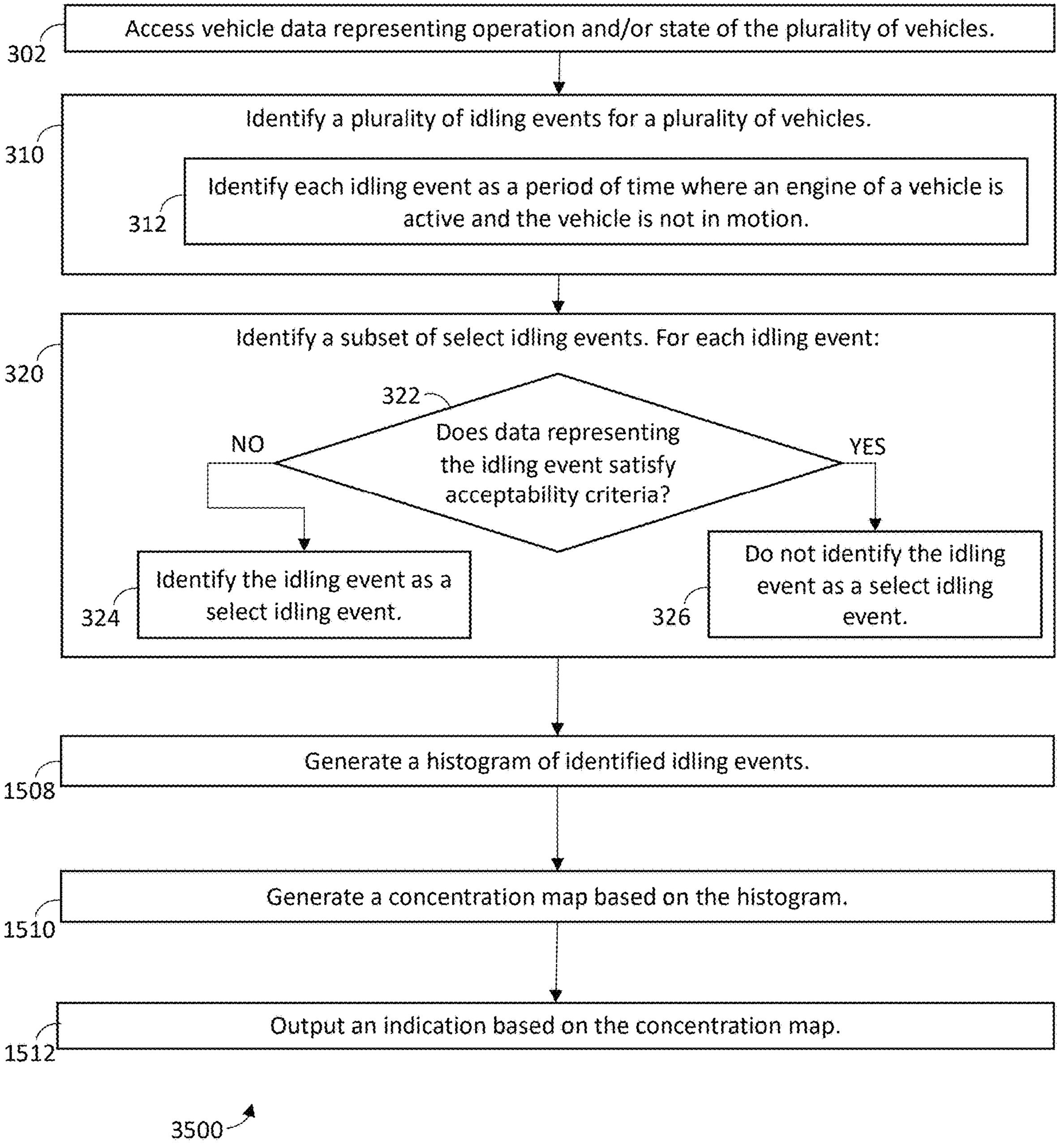
FIG. 35 is a flowchart diagram which illustrates another exemplary method for identifying vehicle idling behaviors.

FIG. 35 illustrates an exemplary method 3500 for identifying vehicle idling behaviors. The method 3500 can be performed by a system such as system 100 or system 200, and its acts can be implemented as processor-executable instructions or data (e.g. a computer program product) stored on at least one non-transitory processor-readable storage medium (e.g. the at least one non-transitory processor-readable storage medium 116, 126, 136, 224, or 296). These instructions, when executed by at least one processor (e.g., at least one processor 114 of management device 110, at least one processor 124 of vehicle device 122, at least one processor 134 of optional device 130, at least one processor 222 of telematics device 204, or at least one processor 294 of peripheral device 290), cause the system to perform the described acts.

Method 3500 is an exemplary implementation comprising a combination of method 300 in FIG. 3 and method 1500 in FIG. 15. As such, unless context requires otherwise, description of methods 300 and 1500 is fully applicable to method 3500.

Method 3500 includes acts 302, 310, 312, 320, 322, 324, and 326, similar to as discussed with reference to method 300 in FIG. 3 and not repeated for brevity. Method 3500 also includes acts 1508, 1510, and 1512, similar to as discussed with reference to method 1500 in FIG. 15 and not repeated for brevity. One difference between method 3500 in FIG. 35, compared to methods 300 and 1500, is that in method 3500, the histogram generated at 1508 is based on idling events identified as select idling events based on acceptability criteria. That is, the histogram generated in method 3500 (and the concentration map based thereon) is essentially based on filtered data (i.e. based on select idling events which do not satisfy acceptability criteria). In act 1512 of method 3500, similar outputs to those shown in FIGS. 14, 31, 32, 33, and 34 and discussed earlier can be output.

In the example of method 3500, generated histograms and concentration maps specifically focus on idling events outside of acceptability criteria. As a result, the resulting output is highly targeted to problematic idling, and thus provides even more specific information for addressing and target idling to reduce fuel consumption and emissions.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processor can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware.

What is claimed is:

1. A system comprising:

at least one processor;

at least one output device; and at least one non-transitory processor-readable storage medium communicatively coupled to the at least one processor, the at least one non-transitory processor-readable storage medium storing processor-executable instructions which, when executed by the at least one processor, cause the system to:

identify a plurality of idling events for a plurality of vehicles, comprising:

identifying, by the at least one processor, each idling event of the plurality of idling events as a period of time where an engine of a respective vehicle of the plurality of vehicles is active and the respective vehicle is not in motion;

identify a subset of select idling events of the plurality of idling events comprising, for each idling event of the plurality of idling events:

determine a duration of the idling event as a difference between a timestamp indicating an end of the idling event and a timestamp indicating a start of the idling event;

comparing, by the at least one processor, data representing the idling event to acceptability criteria, the acceptability criteria including at least a first temporal threshold and a second temporal threshold higher than the first temporal threshold, where the acceptability criteria define acceptability for the idling event as at least a duration of the idling event being less than the first temporal threshold or greater than the second temporal threshold; and identifying, by the at least one processor, the idling event as a select idling event if the data representing the idling event does not satisfy the acceptability criteria when a duration of the idling event is between the first temporal threshold and the second temporal threshold;

determine, by the at least one processor, a fuel consumption for the subset of select idling events; and output, by the output device, an indication based on the fuel consumption and the subset of select idling events.

2. The system of claim 1, wherein the processor-executable instructions which cause the system to identify a period of time where an engine of the vehicle is activated and the vehicle is not in motion cause the system to:

identify the vehicle as activated when an ignition of the vehicle is on; and identify the vehicle as not being in motion when operation data for the vehicle indicates a speed of the vehicle is less than a speed threshold.

3. The system of claim 2, wherein the operation data comprises at least one of:

location data captured by a location sensor at the vehicle, the location data indicative of a speed of the vehicle based on differences between successive points of the location data; and speed data collected via a communication port of the vehicle.

4. The system of claim 1, wherein the processor-executable instructions further cause the at least one processor to identify at least one of the first temporal threshold and the second temporal threshold based on a location classification for a zone where the respective vehicle is located during the idling event.

5. The system of claim 1, wherein the processor-executable instructions further cause the at least one processor to identify at least one of the first temporal threshold and the second temporal threshold based on idling data for other vehicles in a region where the respective vehicle is located during the idling event.

6. The system of claim 1, wherein the processor-executable instructions further cause the at least one processor to identify the at least one of the first temporal threshold and the second temporal threshold based on a temperature for a location of the respective vehicle for the idling event.

7. The system of claim 1, further comprising an operator device, wherein the processor-executable instructions further cause the system to receive, via the operator device, an operator input which defines at least one of the first temporal threshold and the second temporal threshold.

8. The system of claim 1, wherein:

the processor-executable instructions which cause the system to identify a plurality of idling events by a plurality of vehicles cause the system to identify, by at least one respective processor at each vehicle of the plurality of vehicles, at least one idling event for each vehicle; and the processor-executable instructions further cause the system to:

transmit, by a respective communication interface at each vehicle of the plurality of vehicles, a respective indication of the at least one idling event at each vehicle; and receive, by a server communication interface at a server separate from each vehicle of the plurality of vehicles, each respective indication of the at least one idling event at each vehicle.

9. The system of claim 1, wherein the processor-executable instructions which cause the system to identify a plurality of idling events by a plurality of vehicles cause the system to:

identify, by at least one processor at a server separate from each vehicle of the plurality of vehicles, each idling event of the plurality of idling events.

10. The system of claim 1, wherein:

the processor-executable instructions further cause the system to, for each select idling event of the subset of select idling events, access an idle fuel consumption rate corresponding to the vehicle where the select idling event occurs; and wherein the processor executable instructions which cause the system to determine a fuel consumption for the subset of select idling events cause the at least one processor to determine the fuel consumption of each select idling event, comprising determining a product of a duration of each respective select idling event and the idle fuel consumption rate.

11. The system of claim 1, wherein:

the processor-executable instructions further cause the system to, for each select idling event of the subset of select idling events: access fuel data corresponding to the vehicle where the select idling event occurs; and wherein the processor executable instructions which cause the system to determine a fuel consumption for the subset of select idling events cause the at least one processor to determine a respective fuel consumption for each select idling event based on the fuel data.

12. The system of claim 11, wherein for each select idling event of the subset of select idling events:

the fuel data comprises fuel level data which indicates a fuel level of the vehicle where the select idling event occurs; and the processor-executable instructions which cause the at least one processor to determine a fuel consumption for the select idling event based on the fuel data cause the at least one processor to determine the fuel consumption for the select idling event as a difference between an end fuel level for the vehicle at an end of the select idling event and a starting fuel level for the vehicle at the start of the select idling event.

13. The system of claim 11, wherein for each select idling event of the subset of select idling events:

the fuel data comprises fuel consumption data which indicates a measured fuel consumption rate of the vehicle where the select idling event occurs; and the processor executable instructions which cause the at least one processor to determine a fuel consumption for the select idling event based on the fuel data cause the at least one processor to determine the fuel consumption for the select idling event as an accumulation of the measured fuel consumption rate over the select idling event.

14. The system of claim 1, wherein the processor-executable instructions which cause the system to determine a fuel consumption over the subset of select idling events cause the system to:

determine the fuel consumption of each select idling event; and determine an accumulation of the determined fuel consumption over each select idling event in the subset of select idling events.

15. The system of claim 1, wherein the processor-executable instructions further cause the system to, for each select idling event of the subset of select idling events:

determine a difference by which the duration of the idling event exceeds the first temporal threshold; and determine a preventable fuel consumption for the select idling event based on the difference by which the duration of the idling event exceeds the first temporal threshold.

16. The system of claim 1, wherein the processor-executable instructions further cause the system to, for each select idling event of the subset of select idling events:

determine a driver associated with the vehicle where select idling event occurs; and output an indication of the select idling event to the driver associated with the vehicle.

17. The system of claim 1, wherein the processor-executable instructions further cause the system to:

determine a respective driver associated with each select idling event of the subset of select idling events;

determine an accumulation of select idling events for each respective driver; and output, a respective indication of select idling events associated with each driver to the respective driver.

18. The system of claim 1, wherein the processor-executable instructions further cause the system to:

determine a respective driver associated with each select idling event of the subset of select idling events; and determine a respective accumulation of select idling events for each respective driver;

compare the respective accumulation of select idling events for each respective driver to an idling threshold; and output, a respective indication of drivers for which the respective accumulation of select idling events exceeds the idling threshold.

19. The system of claim 1, wherein the processor-executable instructions may further cause the system to:

determine a respective accumulation of select idling events for each respective vehicle;

compare the respective accumulation of select idling events for each respective vehicle to an idling threshold; and output, a respective indication of vehicles for which the respective accumulation of select idling events exceeds the idling threshold.

20. The system of claim 1, wherein the processor-executable instructions further cause the at least one processor to:

identify at least one of the first temporal threshold and the second temporal threshold as a function of: a location classification for a zone where the respective vehicle is located during the idling event; idling data for other vehicles in a region where the respective vehicle is located during the idling event; and a temperature for a location of the respective vehicle for the idling event.

* * * * *